United States Patent [19]
Tate et al.

[11] Patent Number: 5,933,607
[45] Date of Patent: Aug. 3, 1999

[54] DIGITAL COMMUNICATION SYSTEM FOR SIMULTANEOUS TRANSMISSION OF DATA FROM CONSTANT AND VARIABLE RATE SOURCES

[75] Inventors: Duncan Hartley Tate, Blackburn; Robert Palmer, North Clayton; Garry Colin Heinze, Frankston; Mourad Christopher Manoug Shahbaz, Rosanna East; Peter Ian Mikelaitis, Boronia; Peter Alexander Ernest Gorog, Prahran, all of Australia

[73] Assignee: Telstra Corporation Limited, Melbourne, Australia

[21] Appl. No.: 08/557,185

[22] PCT Filed: Jun. 7, 1994

[86] PCT No.: PCT/AU94/00309

§ 371 Date: Mar. 12, 1996

§ 102(e) Date: Mar. 12, 1996

[87] PCT Pub. No.: WO94/29987

PCT Pub. Date: Dec. 22, 1994

[30] Foreign Application Priority Data

| | | | |
|---|---|---|---|
| Jun. 7, 1993 | [AU] | Australia | PL 9209 |
| Jun. 16, 1993 | [AU] | Australia | PL 9392 |
| Jul. 28, 1993 | [AU] | Australia | PM 0221 |
| Jul. 28, 1993 | [AU] | Australia | PM 0222 |
| Jul. 28, 1993 | [AU] | Australia | PM 0223 |
| Jul. 28, 1993 | [AU] | Australia | PM 0224 |
| Jul. 29, 1993 | [AU] | Australia | PM 0244 |
| Jul. 29, 1993 | [AU] | Australia | PM 0245 |
| Aug. 5, 1993 | [AU] | Australia | PM 0411 |
| Aug. 5, 1993 | [AU] | Australia | PM 0412 |
| Sep. 1, 1993 | [AU] | Australia | PM 0976 |

[51] Int. Cl.$^6$ .............................. G06F 13/00; H04J 3/16
[52] U.S. Cl. ................... 395/200.7; 370/395; 370/468
[58] Field of Search ........................ 395/200.48, 200.5, 395/200.62, 200.68, 200.75, 200.66, 200.76, 200.8, 200.3, 200.53, 200.54, 200.55, 200.6, 200.7; 370/229, 230, 235, 359, 360, 394, 395, 353, 355, 356, 468

[56] References Cited

U.S. PATENT DOCUMENTS

| | | | |
|---|---|---|---|
| 4,503,533 | 3/1985 | Tobagi et al. | 370/445 |
| 4,539,676 | 9/1985 | Lucas | 370/354 |
| 4,763,122 | 8/1988 | Franaszek | 340/825.51 |
| 4,956,836 | 9/1990 | Boatwright | 370/222 |
| 4,980,886 | 12/1990 | Bernstein | 370/433 |
| 5,130,984 | 7/1992 | Cisneros | 370/399 |
| 5,231,633 | 7/1993 | Hluchyj et al. | 370/429 |
| 5,258,979 | 11/1993 | Oomuro et al. | 370/232 |
| 5,274,642 | 12/1993 | Widjaja et al. | 370/411 |
| 5,280,483 | 1/1994 | Kamoi et al. | 370/234 |
| 5,313,467 | 5/1994 | Varahese et al. | 370/468 |
| 5,327,421 | 7/1994 | Hiller et al. | 370/395 |
| 5,359,592 | 10/1994 | Corbalis et al. | 370/233 |
| 5,463,620 | 10/1995 | Sriram | 370/412 |

FOREIGN PATENT DOCUMENTS

| | | |
|---|---|---|
| 0119105 | 9/1984 | European Pat. Off. . |
| 0468813 | 1/1991 | European Pat. Off. . |
| 0443782 | 8/1991 | European Pat. Off. . |
| 0452223 | 10/1991 | European Pat. Off. . |
| 0473330 | 3/1992 | European Pat. Off. . |
| 0485971 | 5/1992 | European Pat. Off. . |
| 0525845 | 2/1993 | European Pat. Off. . |
| WO90/00841 | 1/1990 | WIPO . |
| WO91/05426 | 4/1991 | WIPO . |
| WO91/08629 | 6/1991 | WIPO . |

OTHER PUBLICATIONS

IEEE Transactions in Communications, vol. 35, No. 6, issued Jun. 1987, John Daigle, "Message Delays with Prioritized HOLP and Robin Round Packet Servicing", pp. 609–619.

M. De Prycker, "Asynchronous Transfer Mode Solution for Broadband ISDN", published 1991, by Ellis Howrood Limited (England).

C. Dhas, V. Konangi, M. Streetharan, "Broadband Switching, Architectures, Protocols, Design, and Analysis", published 1991, by IEEE Computer Society Press (USA).

*Primary Examiner*—Krisna Lim
*Assistant Examiner*—Viet Vu
*Attorney, Agent, or Firm*—Baker & Daniels

[57] ABSTRACT

The present invention relates to a communication system, protocol and method designed to facilitate information transfer including user and control information from CBR (Continuous Bit Rate) and/or non-CBR signal sources. Such a system, for example, is a CSS (Customer Switching System), a LAN network, a Key System, LAN hub, PABX or PBX. A number of aspects are disclosed in this specification. These include: A) a key system and/or LAN which utilizes ATM technology for the trafficking of CBR, non-CBR, or a combination thereof, B) a round robin feature which facilitates the operation of i. above, C) a cell format which facilitates the operation of i. above, D) an open and closed system architecture for i. above, E) and ATM-TP which serves as an interface for CBR to the architecture and an ATM-HP which serves as an interface for non-CBR to the architecture, F) partial cell filling for system efficiency and/or echo control, G) a staggering feature to facilitate system efficiency, H) a channel aggregation feature to reduce the requirement for external adaptor equipment, I) a by-pass feature to enhance system reliability and serviceability. An example of CBR is voice, video and "non-bursty" data. An example of non-CBR or "bursty" data is LAN data.

17 Claims, 46 Drawing Sheets

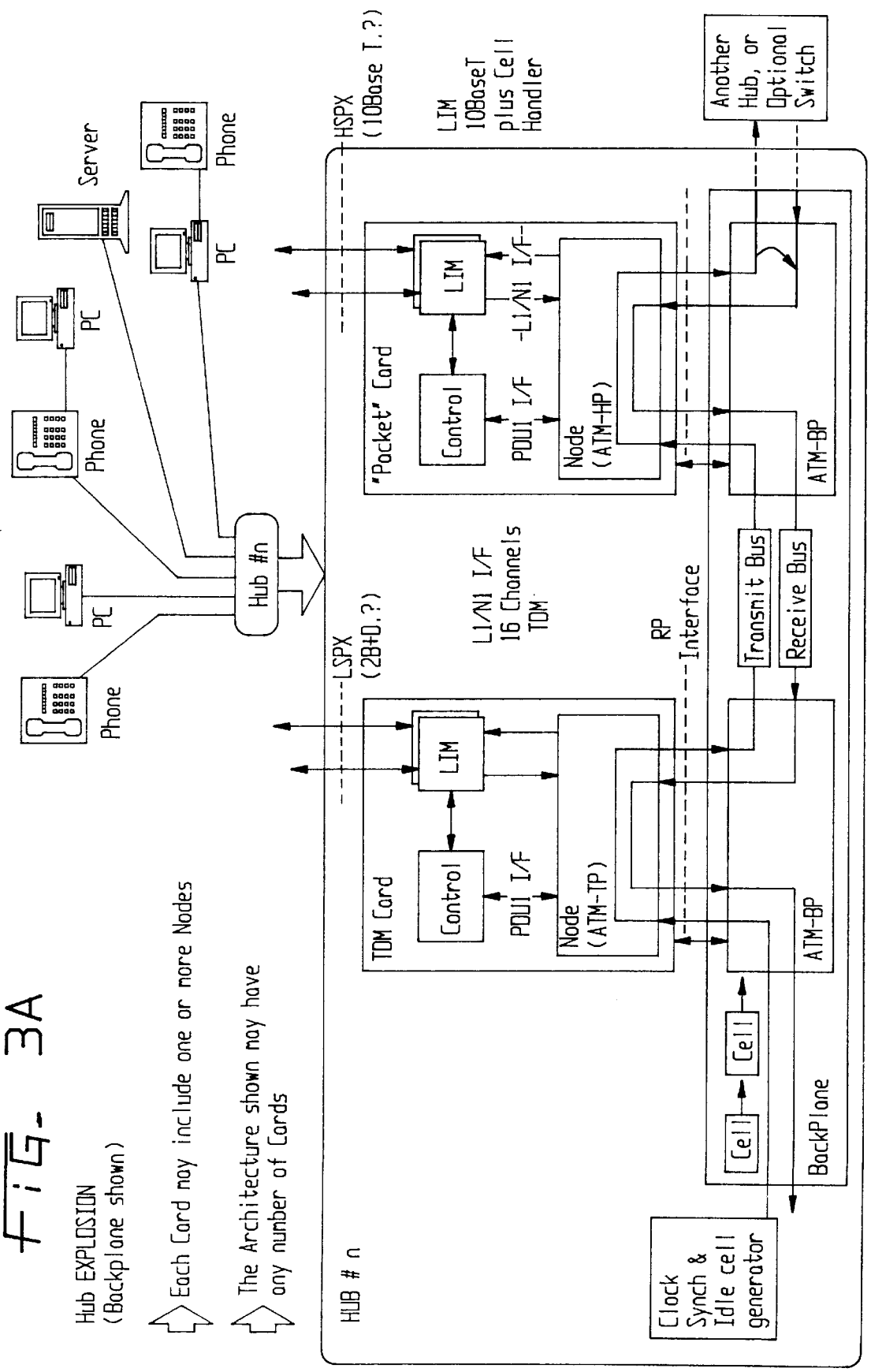

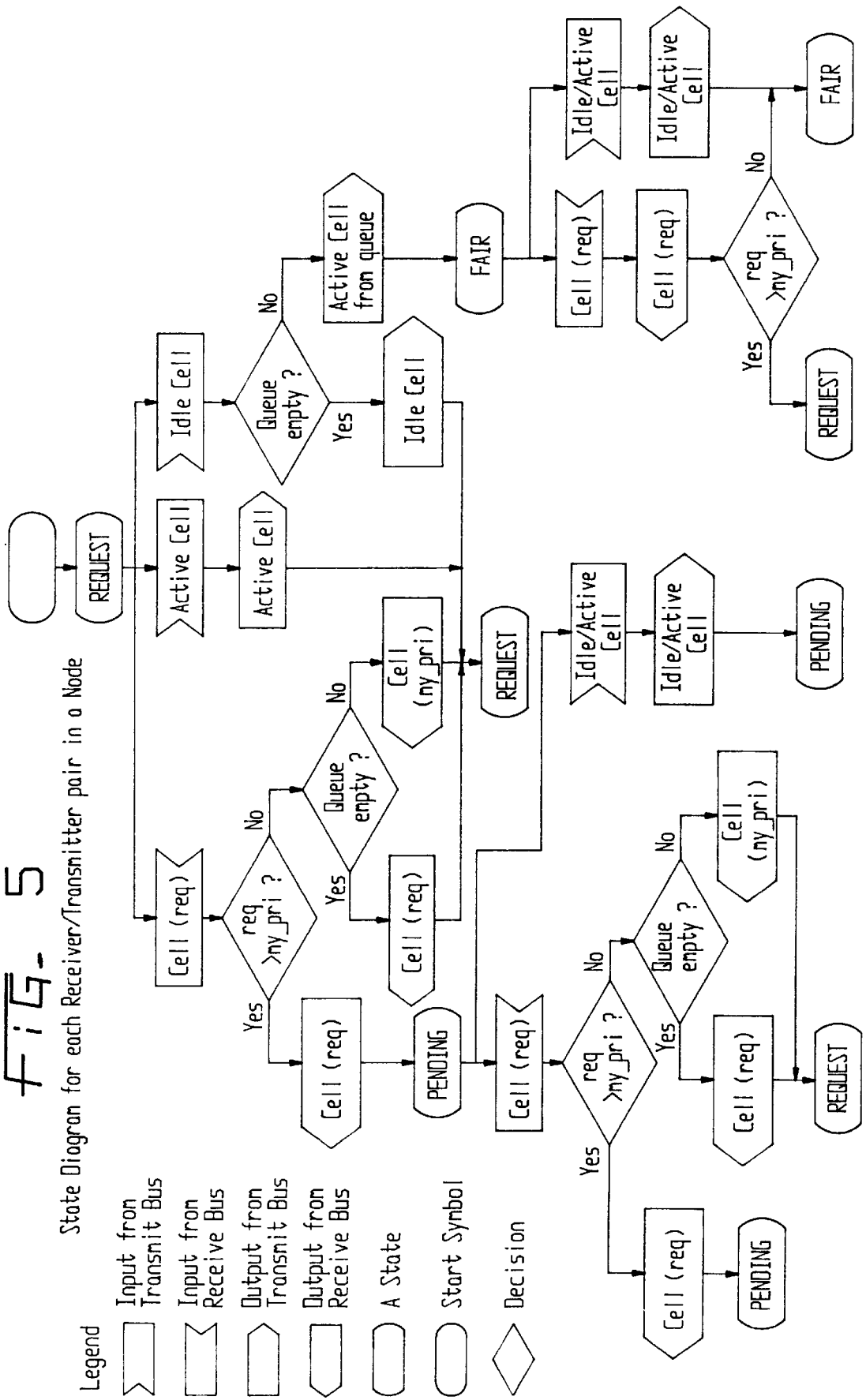
FIG. 5 State Diagram for each Receiver/Transmitter pair in a Node

Simplified State Diagram for Receiver/Transmitter Pair behavior when handling CBR traffic which has also been assigned the highest Priority Level FIG. 7  Functional Diagram of Broadcasting/Multicasting Operation Competition between local and remote traffic in closed chain architectures Partial solution to the competition problem FIG. 11 Alternative live insertion stratergy using open chain architecture Flow diagram for the request bus protocol CCITT UNI ATM Cell
(I.361 May 1990)

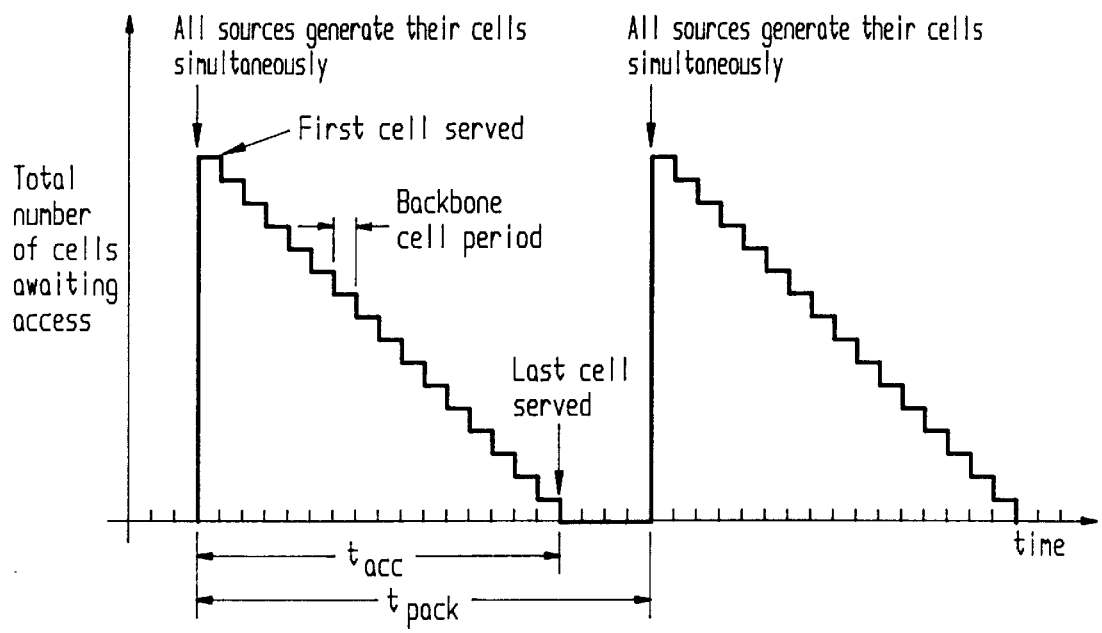
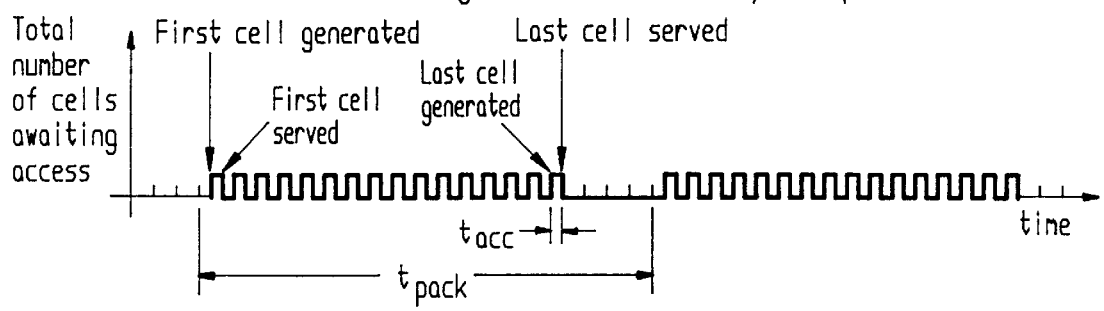
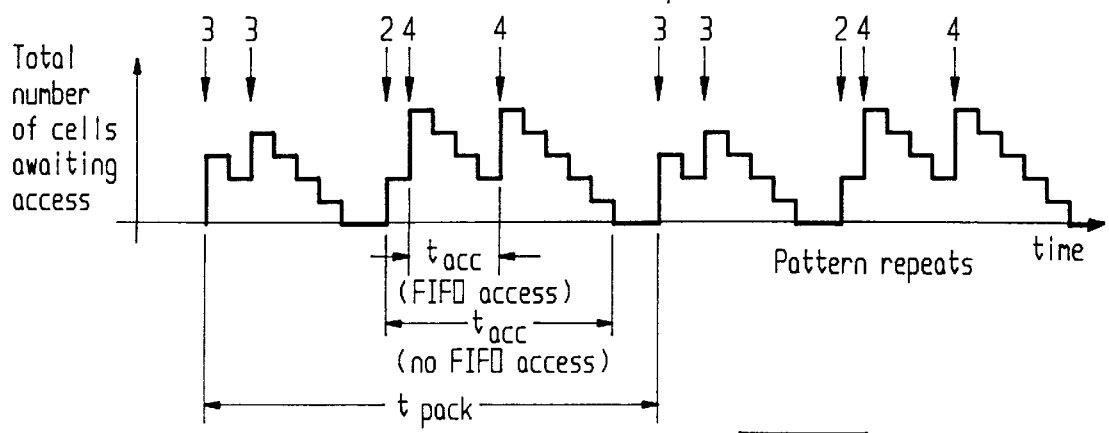
FIG. 16

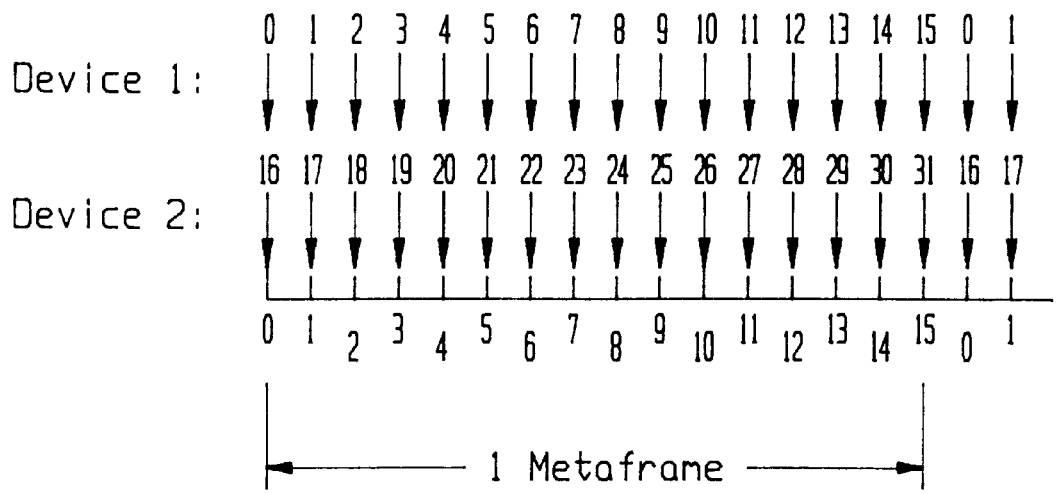
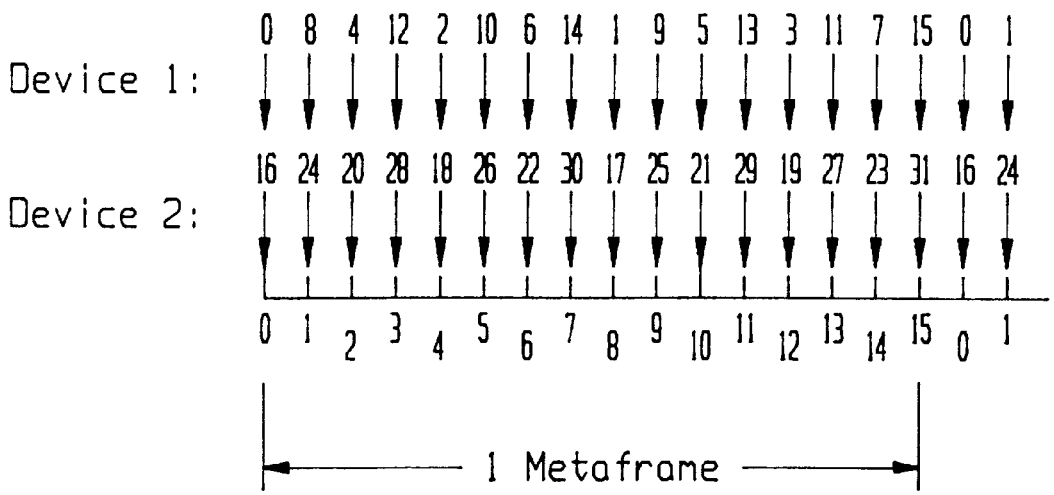
FIG. 23

| Type | ATM-TDM modules | Channels Per Module | Channels (64kbit/s) | Extensions/ Lines |
|---|---|---|---|---|
| Low speed extensions | 9 | 16 | 144 (3x3x8x2) | 72 (9x8) |
| Primary rate ISDN | 3 | 32 | 96 (3x32) | 3 |
| Basic Rate ISDN | 3 | 8 | 24 (3x4x2) | 12 (3x4) |
| PSTN | 3 | 8 | 24 (3x8) | 24 (3x8) |
| Conferencing card | 3 | 12 | 36 (3x12) | |
| Voice compression | 3 | 5 | 15 (3x5) | |
| Modem control | 3 | 2 | 6 (3x2) | |
| Total | 27 | | 345 | |

Table 2. Fully loaded system configuration

FIG. 43

DIGITAL COMMUNICATION SYSTEM FOR SIMULTANEOUS TRANSMISSION OF DATA FROM CONSTANT AND VARIABLE RATE SOURCES

FIELD OF INVENTION

The present invention relates to a communication system, protocol and method designed to facilitate information transfer including user and control information from CBR (Continuous Bit Rate) and/or non-CBR signal sources. Such a system, for example is a CSS (Customer Switching System), a LAN network, a Key System, LAN hub, PABX or PBX.

The words "system" or "communication system" throughout this document encompasses CSS, LAN, network, Key System, Hub, PABX, PBX, or other relatively localised data, voice, and/or video apparatus or medium.

PRIOR ART

Prior art communication systems have difficulty in carrying CBR and non-CBR signals in the one system without degradation to one type of signal and generally suffer from at least one of the following perceived disadvantages:

(i) bandwidth constraints,
(ii) media access control mechanisms,
(iii) no priority possible, (some only),
(iv) in respect of some systems, where a number of sources desire simultaneous access, the higher address gets priority. This does not enable fair access by lower addressed sources,
(v) with STDM, bandwidth may be unused,
(vi) a perceived lack of flexibility and cost-effective support of a wide range of services, including some CBR, real-time services,
(vii) different transport mechanism for user and control information,
(ix) the use of CCITT UNI CELL (as developed by ITU-TSS SG-13) format,
(x) control of echo,
(xi) distinction between internally and externally sourced cells,
(xii) connection of internal and external cell sources.

In relation to "staggering", other problems may exist in prior art communication systems in respect of end to end delay of CBR channels, a significant component of which is caused by cell access delay.

Prior art systems which use fixed-length packet techniques to transport CBR signals may suffer increased end to end delay when all CBR sources are in phase with each other. Cell access delay is longest when cells are generated in phase and the problem is most prevalent in the absence of non-CBR sources. This results in relatively high packet access delay. Thus, even though the average bandwidth of the system may be sufficient, instantaneous shortfalls can result in access delays, which delays may be nearly as large as the packetisation delay.

Prior art systems presently address this problem by providing surplus system bandwidth or by providing partial filling of cells (also requiring extra unusable bandwidth). This is considered to be inefficient and undesirable as it impacts on system performance and cost.

Particularly in relation to "channel aggregation", a problem also is perceived to exist where a number of bit streams are placed onto a first interface of a communication system e.g. a TDM based L1/N1 interface. The bit streams can emerge from a second system interface with a relative delay between separate streams. Currently expensive adaptor equipment is required in addition to the system to cater for such bit streams.

In relation to system reliability and serviceability, a problem has been identified in prior art architectures used in a number of communication systems. The problem identified is in the area of system maintenance and/or reliability, and in particular the probability of complete system failure caused as a result of a part of the system failing.

Consideration of the cost effective provision of services in a communication system tend to inhibit the adoption of auxiliary communication 'back-up' system(s). System down time may be even further prolonged while the cause of the system failure is located, isolated and repaired.

OBJECT

An object of the present invention is to alleviate at least one of the disadvantages noted above in providing a system, protocol and/or method which facilitates the trafficking of CBR and/or non-CBR.

SUMMARY OF INVENTION

A number of aspects are disclosed in this specification. These include:

A. A key system and/or LAN which utilizes ATM technology for the trafficking of CBR, non-CBR, or a combination thereof,
B. A round robin feature which facilitates the operation of i. above,
C. A cell format which facilitates the operation of i. above,
D. An open and closed system architecture for i. above,
E. An ATM-TP which serves as an interface for CBR to the architecture and an ATM-HP which serves as an interface for non-CBR to the architecture,
F. Partial cell filling for system efficiency and/or echo control,
G. A staggering feature to facilitate system efficiency,
H. A channel aggregation feature to reduce the requirement for external adaptor equipment,
I. A by-pass feature to enhance system reliability and serviceability.

An example of CBR is voice, video and 'non-bursty' data.
An example of non-CBR or 'bursty' data is LAN data.

One problem addressed by the present invention is the development of system technology which provides flexible and cost-effective support of a wide range of services (e.g. constant bit rate (CBR) such as voice, and non-CBR such as LAN data, etc.) applicable to business customers now and in the future.

The "now" services were the traditional ones which have to be supported as cost-effectively as possible. These are classified as Basic Mandatory services—voice and data$\leq$= 64 kbit/s. As market needs are anticipated to be changing it is desired to support Optional services which have vastly different data rates (e.g. high speed data and telemetry applications). Still more developing market needs are foreseen, resulting in Advanced services. Table 1 shows some of the services which are to be supported by the present system.

A. SYSTEM/ATM

The present invention provides system technology for CBR and/or non-CBR traffic which includes, inter alia, the following 3 characteristics:

1. GROUP CONTENTION RESOLUTION

If a number of Nodes or CBR and/or non-CBR sources within the same service priority attempt to access the transmission medium simultaneously, then Group Contention is said to have occurred. The present invention may allow each "member" of the contending group orderly access to the transmission medium using two mechanisms which apply as required and in accordance with the bandwidth control mechanisms described below:

a) Node Priority Basis

Where a high priority request is not present in the system, nodes of the same group have a natural priority order in the system due to their relative proximity to the cell source.

b) Fairness Basis

When more than one contending node has more than one cell to send, the system may allow each contending node to monitor the requirement of other contending nodes. The first contending node can gain access and will, after transmitting a cell, not transmit any further cells until each contending node has had an opportunity (fair chance) to gain access before the first contending node again may access the backbone. This also accords with a round robin feature which has been found to be advantageous in the present system.

2. PRIORITY

Access to the system is provided in accordance with a ranking of priority. Higher priority nodes gain access in precedence to lower priority nodes.

3. BANDWIDTH ALLOCATION

The following bandwidth control mechanisms operate within the system a) Across service Classes The system provides flexible bandwidth allocation in accordance with system demand for CBR and/or non-CBR services. The bandwidth of the present system can thus be said to be dynamic. CBR services due to their 'real time' nature is preferably but not exclusively allocated highest priority, and is thus allocated as much bandwidth, as required at any instant, up to the full capacity of the system, whereas other services such as non-CBR services are allocated any remaining system bandwidth. In order to provide a relative high quality of service, the present invention in addition may provide:

b) Within Service Classes

Due to the effect of the Fairness Basis of Group Contention Resolution described above competing nodes of the same service priority will have access to any remaining system bandwidth, not used by members of any group belonging to a higher priority service class, divided in predetermined (equal or unequal) proportions between them.

Surprisingly, it has been discovered that, by implementing the use of empty or idle cells in a communication system and allowing signal sources to compete for those empty or idle cells, a system is provided which has the capability of both CBR and/or non-CBR information transfer substantially without perceived or real substantial degradation of quality of service.

Implementation of the use of empty or idle cells is preferably in accordance with the characteristics of group contention, priority and bandwidth allocation noted above.

B. ROUND ROBIN

Yet a further feature may be optionally provided in addition to the present invention as disclosed above and is predicated on the discovery that by providing access via a "round robin" feature, in the present system, CBR and non-CBR sources can be mixed and integrated into a single system without substantial degradation of services.

In one form, the round robin feature may be implemented by a protocol or sequence to enable access to the system's bus by a number of CBR and non-CBR sources by providing cyclical access rights from one transmitter to the next, preferably skipping inactive transmitters. The length of time allocated for access may also be determined by the source or be predetermined by the system characteristics or specifications.

C. CELL FORMAT

The cell format aspect relates to a communication protocol. The present aspect sees an external cell as a group of data that is sourced external to the backbone, from external network and/or user equipment. An external cell may also be a prior art protocol type, for example the CCITT UNI CELL. The present aspect sees an internal cell as a medium or cell that may travel on the backbone.

The present aspect is predicated on the realization that a cell format can be utilized which enables prior art type cell formats to be at least partially incorporated in the present cell format and substantially reconstructed upon emergence from a backbone. This facilitates the ability of the present protocol to enable the provision of a communication system, which includes CBR and/or non-CBR, whether in an external or internal format.

The present format, in one form, alters or overwrites a portion of an external cell in order to facilitate CBR and/or non-CBR traffic in the communication system.

Importantly, to one aspect, the present format utilizes a Req_Pri field for the trafficking of CBR and/or non-CBR. This field provides one source of priority indication. A further field A may provide further assistance in the trafficking of CBR and non-CBR. This field provides one source of cell activity.

The present format is further predicated on an assignment of a predetermined range of values to particular fields within the cell format, the values serving to substantially distinguish between internally and externally generated or sourced cells. Furthermore, a number of fields in the protocol of the present invention have been assigned different uses or outcomes. In some fields, numeric values may be assigned to provoke a predetermined outcome.

D. ARCHITECTURE

In particular, a new 'hub' applicable to LAN networks or systems may be provided in accordance with one aspect of the present invention. The 'hub' may be incorporated into existing LAN networks or systems to facilitate the modification of a network to enable CBR and/or non-CBR traffic in the network.

This implementation is accomplished, preferably in accordance with the 3 characteristics above, in such a way that each source, node or hub is adapted to compete for access to idle cells. The present invention seeks to adopt ATM technology principles in the environment of the system. Cells enter the network, and flow through the network. CBR and/or non-CBR sources, nodes or hubs may utilise the cells as required, and thus the network is able to traffic either CBR and/or non-CBR signals. In a most preferred form, the use of empty or idle cells is implemented in conjunction with a closed chain architecture and/or an open chain architecture.

E. INTERFACES

In yet another aspect, a further invention provides a number of system configurations which enable flexibility and/or expandibility of the system, and in conjunction with the trafficking of CBR and/or non-CBR signals. Most particularly, the system of the present invention applies to a CSS Key System, a LAN network and/or hubs for the LAN network.

The further invention is predicated on the discovery that a communication system, particularly a CSS Key System, LAN network and/or LAN hub, lends itself to traffic CBR and/or non-CBR signals because the active cells (packets) of user and control information are able to flow through the system, i.e. from originator to designation, substantially in an original form. In a preferred form substantially only the header information may be modified.

The further invention is adapted to facilitate flow of a cell through the system, whether that cell is idle or active.

In another aspect, a further invention is also predicated on the realization that information from CBR and/or non-CBR services is capable of occupying cells in a manner which is not fixed in advance. Dynamic bandwidth is one exemplary outcome of the above realization.

The provision of dynamic bandwidth allocation facilitates the ability for user and control information to both use the same transmission medium.

Cell fill may be fixed, as is most preferred, or may vary from cell to cell.

F. CELL FILL

The protocol noted in C. above also enables full, mixed or partially filled cells. Partially filled cells or at least providing a degree of control over the fill of a cell(s) has been found to provide a degree of control over echo.

G. STAGGERING

The present aspect, in one form, provides a means and/or method of reducing access delay substantially without excessive increase in system bandwidth requirements. The present aspect, in this regard, provides 'staggering' between channels which have access to the system.

Staggering is predicated on the principle that it is possible to ensure that the sources of signals on a backbone system are not all in phase. In one form, the system forces a fixed phase difference between different sources. In this system, each node or module is preferably controlled to generate or fill cells at substantially even points of time.

Furthermore, another aspect there is provided bit reversal channel numbering in order to enable phases of each channel to be more evenly separated. It is contemplated to provide increased channel separation by providing and numbering each channel by a reversed binary number.

Furthermore, yet another aspect provides the use of partially filled cells and/or a mix of full and partially filled cells in order to reduce packetisation delay. Full cells, in a preferred form, are 47 octets. 48 octets may also be used. By allowing the use of 16 octet (partially full) cells, packetisation delay can be reduced.

It has been found that staggering the timing of CBR sources reduces the access delay variation of cells generated by CBR sources to the system backbone, thus reducing the source end to end delay and buffer memory requirements, cost and, as a further consequence, eliminates the need for more complex processing requirements (i.e. the generation of and the detection of sequence numbers in the header at the front of the cell Payload) to direct lost cells.

H. CHANNEL AGGERATION

The present aspect is directed to enable multiple bit streams to be placed onto a first interface and to have the bit streams emerge at a second interface without substantial, and preferably without any, relative delay between separate streams, and without the need for external adaptor equipment.

The present invention is predicated on the discovery that multiple bit streams can be accommodated by enabling more than one bit stream to be carried within a given cell. It is preferred that channels which are to be carried can be predetermined or nominated upon demand or request.

Each bit stream represents CBR and/or non-CBR signals.

In principle, the present invention substantially maintains a parallelism between bit streams passing to and from system interfaces. This parallelism enables the maintenance of the relative position in time of bits in one stream with respect to bits in other streams aggregated with the one stream.

In one form, the present invention provides a device and method for supporting n×64 channels by having constant delay between channels, where n is greater than 1. The present invention also enables the effective rate of input of bit streams to a backbone to be increased by a factor of n, where n is the number of channels being aggregated into a group.

I. BY-PASS

The solution posed to the reliability and serviceability problem stems from identification of the fact that system reliability can be increased relatively significantly (relative to existing backbone architectures) by utilizing a by-pass architecture.

The present invention therefore also contemplates in another form a 'self-heal' system adapted to alleviate or reduce communication system down time by controlling utilisation of the by-pass architecture. A self-heal system can automatically by-pass detective or system portions to be isolated without substantially inhibiting the performance of other portions of the system.

The present invention is predicated on the provision of a by-pass architecture in conjunction with a communication system. The by-pass architecture enables portions of a communication system to be isolated and passed by whilst other portions of the system continue to function. As a result, system reliability is considered as a whole to be increased and it also lends itself to ease of maintenance of the system.

The features and aspects disclosed herein are now more fully detailed with reference to the drawings, wherein:

BRIEF DESCRIPTION OF THE DRAWINGS

FIG. 3a outlines an exploded diagram of one form of hub,

FIG. 5 illustrates a node state diagram,

FIG. 16 shows the total number of cell attempting access to the backbone for different phase relationships between sources, FIG. 23 shows staggering schemes for 16 byte partially filled cells.

DETAILED DESCRIPTION

Various embodiments of the system implemented by way of an open or closed architecture are now to be disclosed particularly, but not exclusively with reference to the system's 3 characteristics. The following disclosure is merely a preferred implementation of the various aspects and inventions in accordance with two preferred architectures, although they should not be so limited.

A. System/ATM, and D. Architecture

Figure 1:
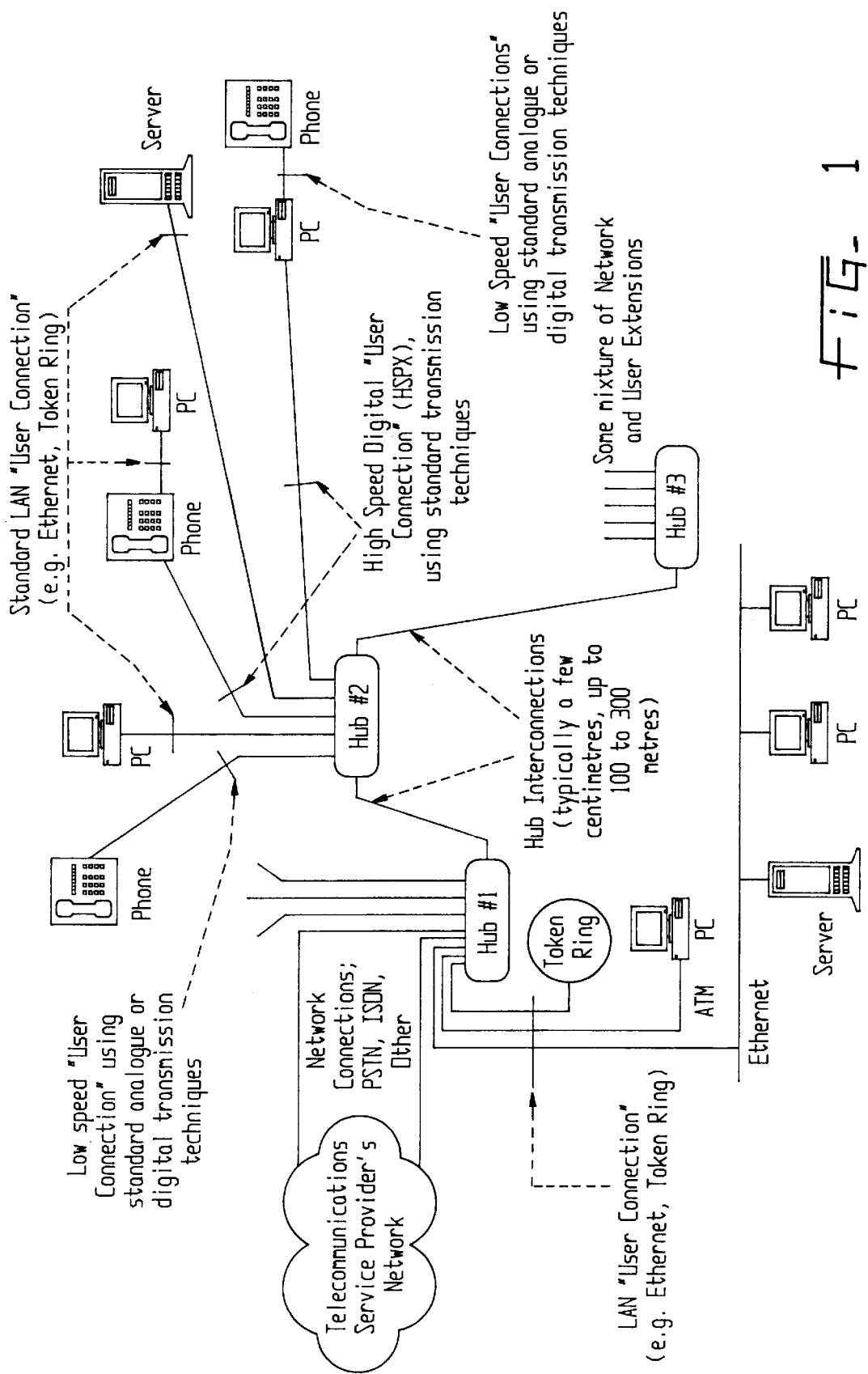
FIGS. 1, 2 and 3 illustrate system topology.
Figure 2:
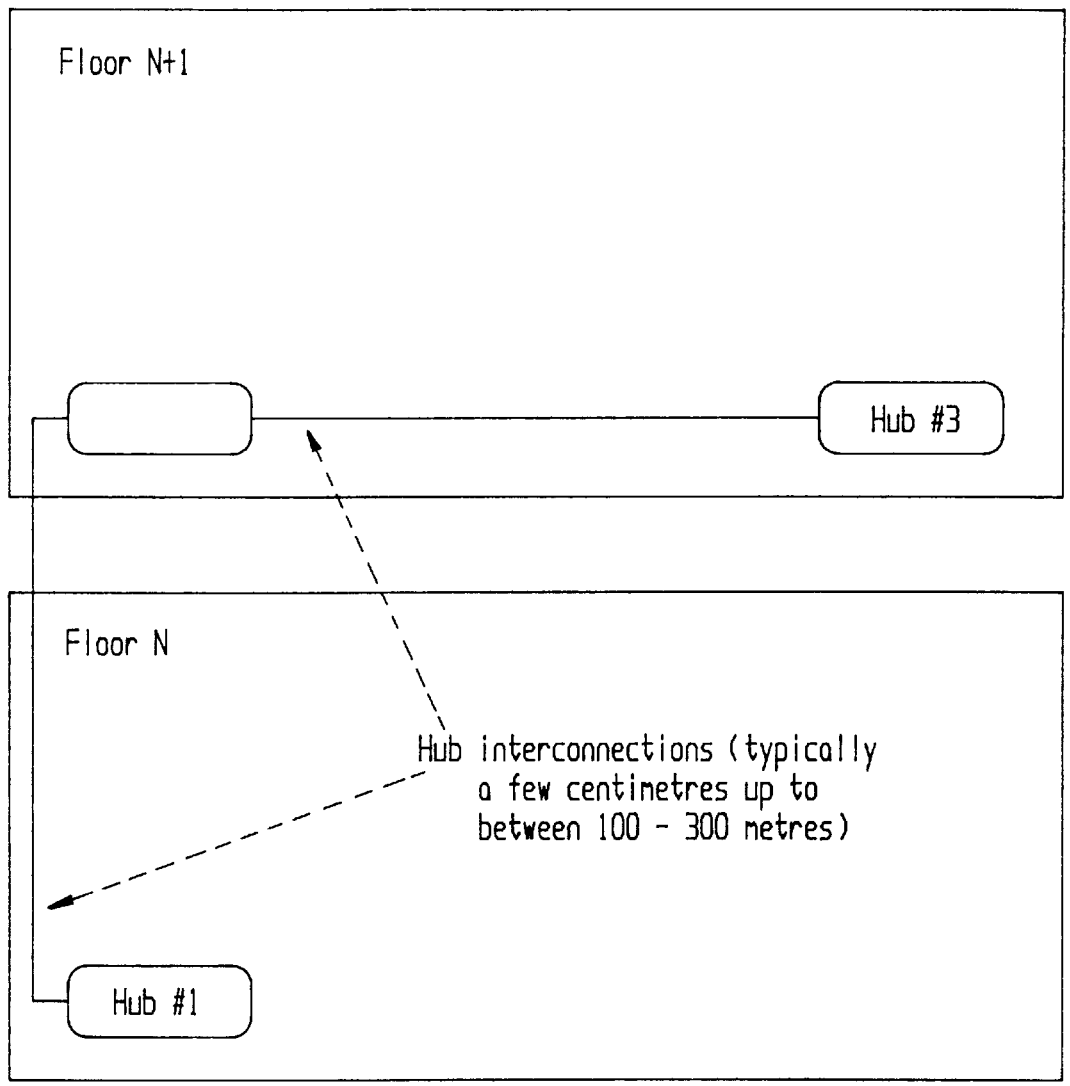
Figure 3:
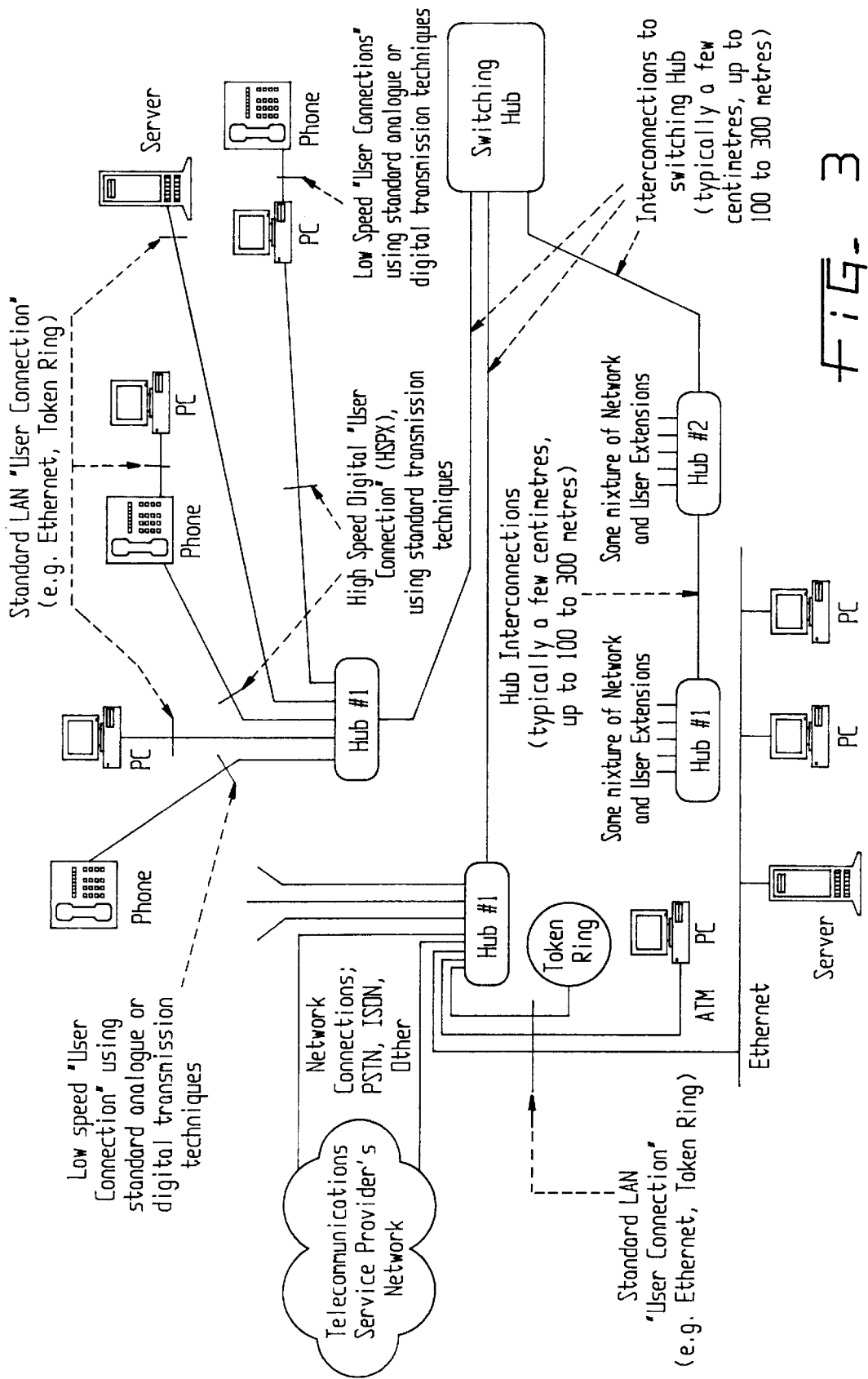

A sample of embodiments of system to which the present invention has application is shown in FIGS. 1, 2 and 3. Whilst the present invention has application to the embodiments shown, in one particular form, the invention may also have application to each 'hub' of the system. FIG. 3a provides an insight to an exemplary hub. A more preferred form of hub is shown in FIG. 4b and some other forms of hub are disclosed later in relation to FIGS. 4a and 10.

The system, in general, may have the following major "user terminal" features:

a Voice capability (e.g. as per current generation systems)

a LAN capability (Ethernet, Token Ring, ATM LAN)

system stations featuring an integrated voice and LAN (e.g. Ethernet, Token Ring, ATM) capability using non-proprietary transmission and proprietary signalling ability to support new generation ISDN terminals (e.g. videophones)

designed so as to enable the direct connection of ATM terminals such as those that might be produced as a result of the work of the CCITT and the ATM Forum and the following "network connection" features

PSTN

ISDN

QPSX via third party LAN bridges and the following "network connection" capability Broad Band ISDN Local Area Network CPE is already a global industry. This form of CPE is much more than a P.C. It includes bridges, frame relays, wiring systems etc. Medium to large scale businesses are, and will continue to be wired up for Local Area Networks. These businesses will also be wired for voice communications.

The present invention has been designed to support either or a mixture of the following two topologies:

Topology 1

The customer can purchase one or more Hubs, with up to three "Hubs" being preferred. Each Hub can be configured to support a number of Network connections (e.g. PSTN and ISDN) and/or user extensions.

Individual Hubs have an internal bus which can be connected together to expand the system, with interconnection being over distances of 0 to 300 m.

The user extensions can be a mix of 2B+D for the normal voice station with a simultaneous 64 kbps (low speed) data capability. And High Speed Extensions which directly support LAN workstations or a Voice Station/LAN Workstation combination.

The design target is to make the resources of one Hub accessible to other Hubs. Therefore, one Hub may have only Network connections which are utilised by all other connected Hubs.

FIG. 1 shows a plan view of the topology 1.

FIG. 2 illustrates "sideways" view of FIG. 1. The Hubs are either on different floors, or on different parts of the same floor.

With reference to FIG. 1, the basic system (also called Topology 1) is made up from a number of Hubs.

Each Hub can support a mixture of Network and User connections. A Network connection provides for a connection to a Telecommunications Service Providers Network. Another term for "Network Connection" is "Interface to Network Equipment".

A User Connection provides for a connection to User terminal equipment, also called "Customer Premises Equipment" (CPE). Another term for "User Connection" is "Interface to User Equipment".

For illustrative purposes, Hub #2 is shown connected to 5 typical CPE configurations from left to right:

Either a POTs service offered over a standard analogue "User Connection", or a SIT offering a service over an analogue or digital "User Connection". These are typically sources of CBR user traffic.

A Computer connected to the Hub via a standard LAN "User Connection e.g. Ethernet or Token Ring). This is typically a source of Non-CBR user traffic.

A phone/computer combination, where the phone provides a standard LAN interface to the computer. This combination provides the user with integrated LAN and phone capabilities. This combination is connected to the Hub via a System specific "User Connection". This is a source of mixed CBR and non-CBR user traffic.

A server is connected to the Hub via a standard LAN "User Connection". This scenario is identical to the previously described "Computer Connection".

Similar to the prior phone/computer combination except that the computer provides an interface for the phone.

Hub #1 is shown with typical "Network Connections".

Hub #1 also shows the use of the standard LAN "User Connections" for connecting to existing company Local Area Networks.

With reference to FIG. 2, when the Hub interconnections are of the order of 100 to 300 meters, the system can be distributed across floors.

Topology 2

This is a bussed/star, where the center of the Network is a switch, see FIG. 3. The bussed star approach is meant for larger systems and to introduce more reliability. The Hub may be an "Open Chain" "daisy chained" bus arrangement that is used by 53 octet ATM cells based upon (but not identical to) the CCITT UNI cell format.

Regarding FIG. 3, the System can be expanded by using a Switching Hub to interconnect a number of Topology 1 systems.

All other aspects are as per the Topology 1 "Communication System Notes" section.

Open Chain System

A preferred physical architecture of the system is based on an Open Loop Chain. A Closed Loop chain is also disclosed herein.

This Open Loop Chain resembles a Daisy Chain in which each Node is interconnected via a Transmit Bus and a Receive Bus.

The last Node in the chain has its Transmit Bus Output connected to its Receive Bus Input.

Information is transmitted and received in Cells (packets of a fixed size) consisting of 53 Bytes.

Cells are passed along the Transmit Bus and then along the Receive Bus.

In the case of the System, Nodes compete for an "Idle" or empty Cell.

A Cell is identified as "Idle" or In Use" by the state of bit(s) in the Cell.

A "Cell Generator" is used to generate Idle (empty) Cells. Cell use is dictated by the use characteristics noted above.

The relative priority of each Node requiring access to Idle Cells is indicated to other Nodes upstream (towards the Cell Generator) by using any Cell passed along the Receive Bus.

Figure 4A:
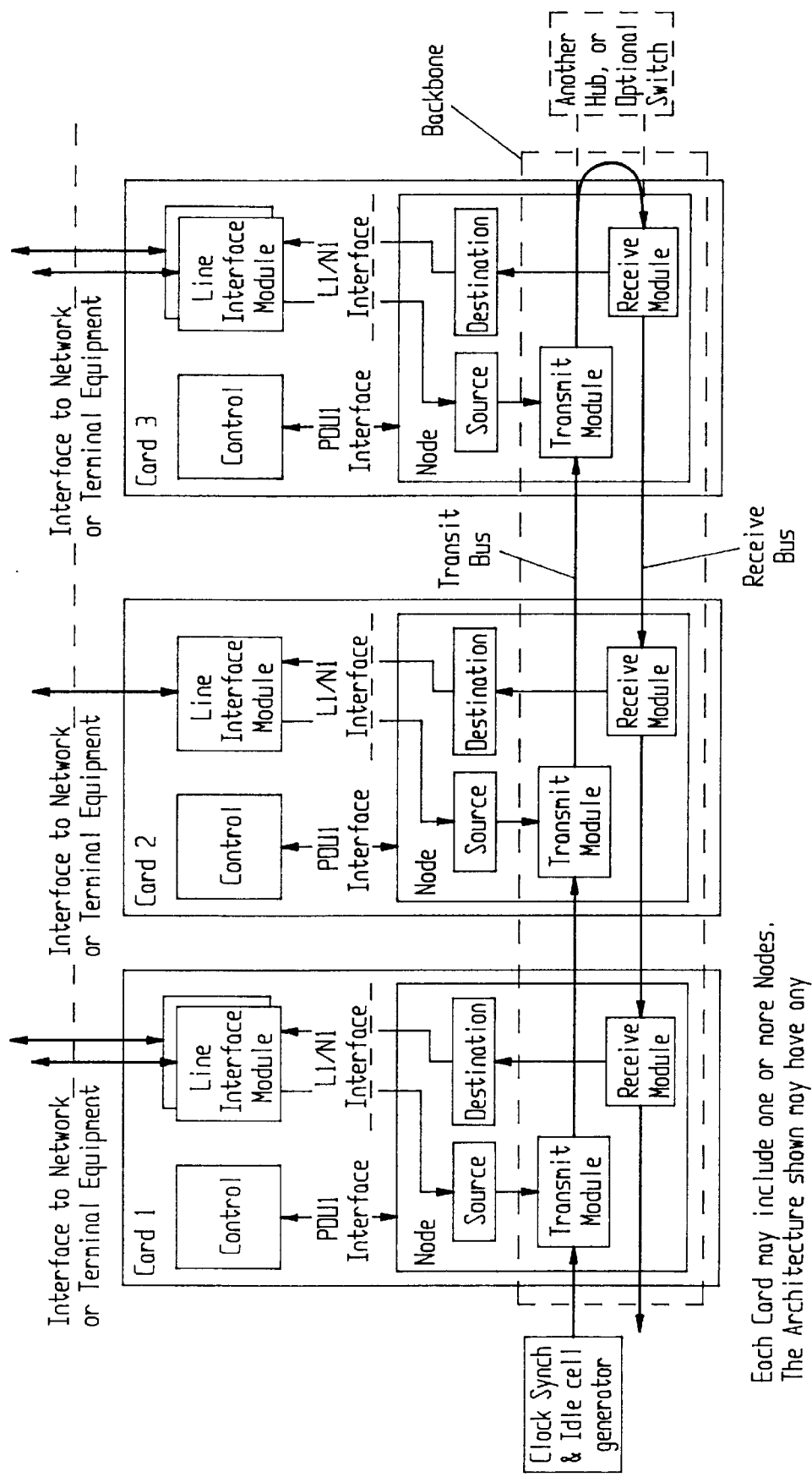
FIGS. 4a and 4b illustrates an open chain backbone architecture.
Figure 4B:
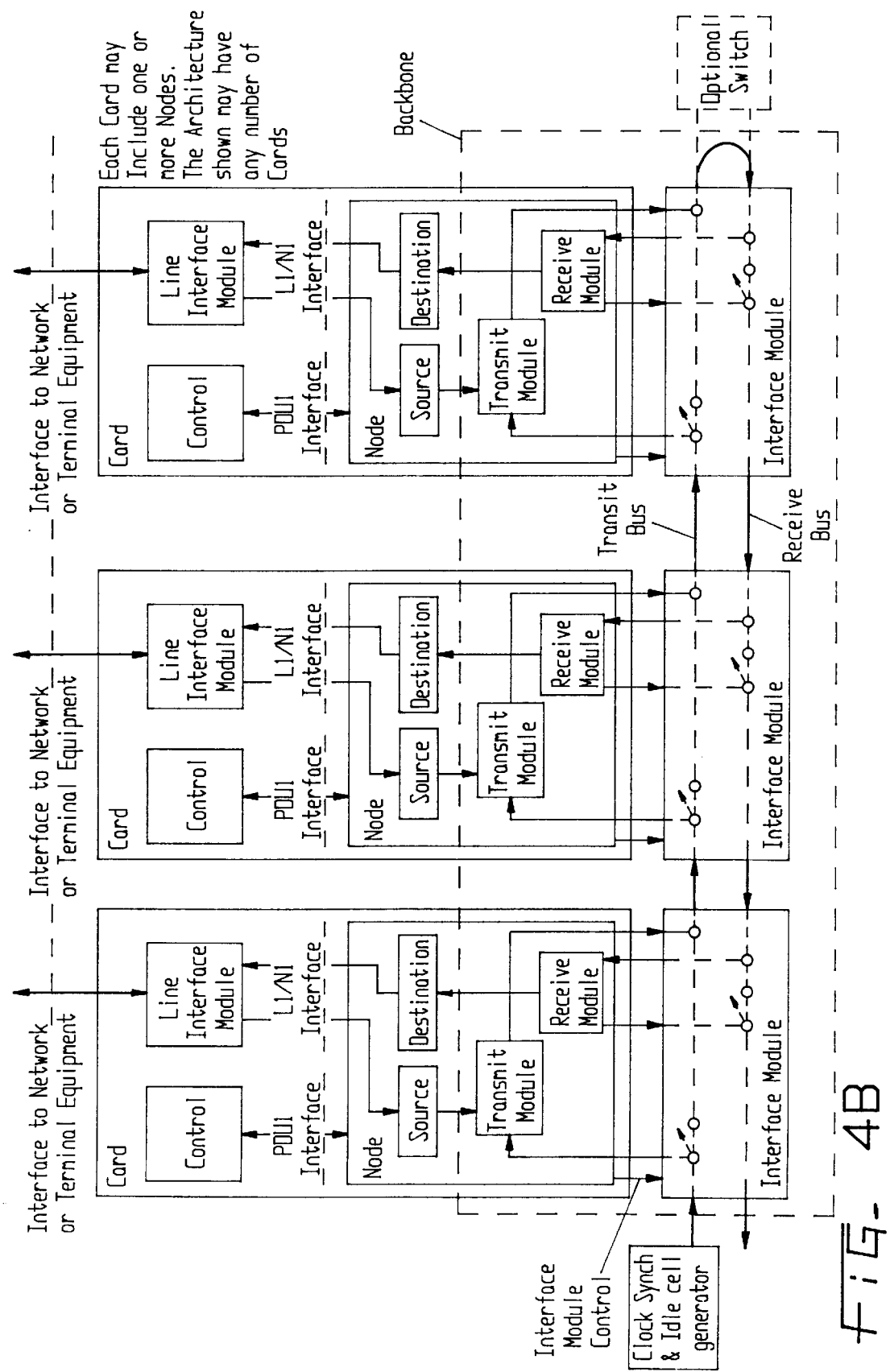

The System provides for the three of the characteristics noted above which enables "Real Time" services e.g. CBR as well as Data Communications e.g. CBR and/or non-CBR to be supported. The way in which this is achieved is explained in the following:

FIGS. 4a and 4b show, inter alia, the basic backbone architecture of the system in the open chain configuration. The switch is shown as optional. The system provides a means of multiplexing various traffic from CBR and/or non-CBR services.

The 'backbone', each 'card' or 'node' as shown in FIGS. 4a and 4b may represent a LAN network, hub or node of a communications system.

The idle cell generator in FIGS. 4a and 4b produces a continuous stream of fixed length idle cells. The transmitter modules multiplex active cells from their associated sources onto the backbone by replacing idle cells with active cells. Active cells arriving on the backbone inputs of the transmitter modules are relayed to their outputs, may be with an (implementation dependent) fixed delay. That is, a node in order not to overwrite data transmitted by other nodes, waits, until an idle cell arrives on its backbone input before writing over the idle cell to create an active cell.

A receiver module relays cells arriving on its backbone input to its output. Those cells passing through a receiver module which are addressed to that module are copied into an internal buffer as they pass through; the cell remains active as it moves along the backbone and thus can be received by many receiver modules.

In the absence of some access protocol, each transmitter module does not have equal access to the backbone in times of heavy load. The first transmitter directly after the idle cell generator is able to transmit at any time since it is always receiving idle cells on it's backbone input. However, subsequent transmitters must wait for all transmitters between them and the idle cell generator to stop transmitting before they can do so. Effectively a priority queue system operates with transmitters ordered in decreasing priority the further away they are placed from the idle cell generator. This implicit priority mechanism is not always desirable (especially for non-CBR sources).

Protocol

The request protocol further enhances the system of the present invention to traffic CBR and/or non-CBR signals because the protocol or a predetermined routine may be used to prioritise CBR and/or non-CBR traffic flow and access.

Request Protocol Description

Request Bit Protocol

The system may utilise a request bit protocol to grant active transmitter modules access to the backbone (those with cells waiting to be transmitted). The protocol behaves as if a token which bestows access rights was passed cyclically from one active transmitter to the next, skipping inactive ones. Therefore all active transmitters can obtain an equal fraction of the backbone bandwidth.

There is no actual token, but rather each transmitter module wishing to send a cell indicates this to the modules on the left of it (referring to FIGS. 4a and 4b) by sending a stream of piggy-backed requests in the cells passing through its corresponding receiver module. The requests are carried in a two bit field in the cell header. Once the transmitter module has sent one cell, it stops sending cells and instructs the receiver module to stop sending requests (even if there are more cells queued in the transmitter to send). Thus those transmitters with cells queued will each send one cell, starting with the left-most one and working to the right. They will then allow idle cells to pass by unused until the right-most module has transmitted and its corresponding receiver stops sending requests. After this, one null request field must pass through each receiver before they again start sending requests, and their corresponding transmitters attempt to send another cell. This effectively re-starts the cycle. In this way, each transmitter sends one cell per cycle in turn, waiting until the next cycle before sending another.

Priority Ordered Requests

In order to ensure small cell delay variation for CBR services, it is desirable that requests can be made on at least two priority levels. The desired effect is that the presence or absence of low priority traffic should not affect the access delay experienced by the high priority transmitters and that bandwidth be evenly shared among those active transmitters on a particular priority level. The CBR traffic (e.g. voice) may be assigned the highest priority and variable bit rate traffic a lower priority.

To achieve this, nodes may be assigned one of 4 priority values:
(0) No request
(1) Low priority variable bit rate data
(2) Signalling (high priority variable bit rate)
(3) Highest priority CBR Note that the distinction between priority levels (1) and (2) is of lesser importance than between (2) and (3). It represents no increase in complexity however. Nodes send requests equal to their assigned priority level and a higher priority node may replace a lower priority request by overwriting the value of a request field in the cell header but may not overwrite higher priority requests.

A high priority request passing along the receive bus (bus B) will cause all lower priority nodes to withhold from transmitting for one cell period in order to allow immediate access to the transmit bus (bus A) by the higher priority node. Conversely, low priority requests are ignored by higher priority nodes and are treated as null requests. Requests on the same priority level as a node's assigned priority are used as described in the last section to share bandwidth evenly among nodes of the same priority.

State Diagram for Each Node

FIG. 5 describes the behaviour of each node in detail. Each node is initially in the REQUEST state indicating that it is able to send requests if there are any cells queued to be transmitted. Nodes must also be in the REQUEST state if they are to transmit any of the cells queued, otherwise they must let idle cells pass through their transmitters unused. As shown in the legend, the right pointing signal boxes represent cells arriving from or going to bus A (the transmitter daisy chain) and the left pointing signals represent cells arriving from or going to bus B (the receiver daisy-chain).

In the REQUEST state, if an idle cell is received on bus A, the node will transmit one of its queued cells in place of the idle cell, if it has one waiting, and then enter the FAIR state. The FAIR state indicates that the module is now waiting for other nodes on the same priority level to transmit before it attempts to transmit another cell. It therefore allows both idle and active cells to pass along bus A unchanged until a null request is received from bus B (one with a lower priority than its assigned priority, my_pri) whereupon it returns to the REQUEST state. In the REQUEST state, if a cell with a null request is received from bus B and the node has cells queued for transmitting, then the node will make a request by overwriting the request field with its assigned priority. If the req field in the received cell is greater than the assigned priority, the node will enter a PENDING state in order to stop it transmitting a cell. In this case the node will not modify the req field.

The node will remain in the PENDING state until a request is received of the same or lower priority as my_pri, indicating that any higher priority nodes have stopped requesting. The node will then immediately return to the REQUEST state, using the same request field to make its own request if it has cells queued. Note that in the PENDING state, as in the FAIR state, transmission of queued cells is suppressed and both idle and active cells are passed along bus A unchanged.

It is necessary for the operation of the protocol that the request bits default to the no request value (0) at the beginning of the receiver chain (bus B)—i.e. upon exit from the switch or at the loop-back point in FIG. 4a. In order to achieve this, the transmitter modules may be designed in such a way that the request field of cells passing through them is always cleared to the value (0).

In all states, a received cell is copied for use by the node if the cell has one or more specified addresses.

Figure 6:
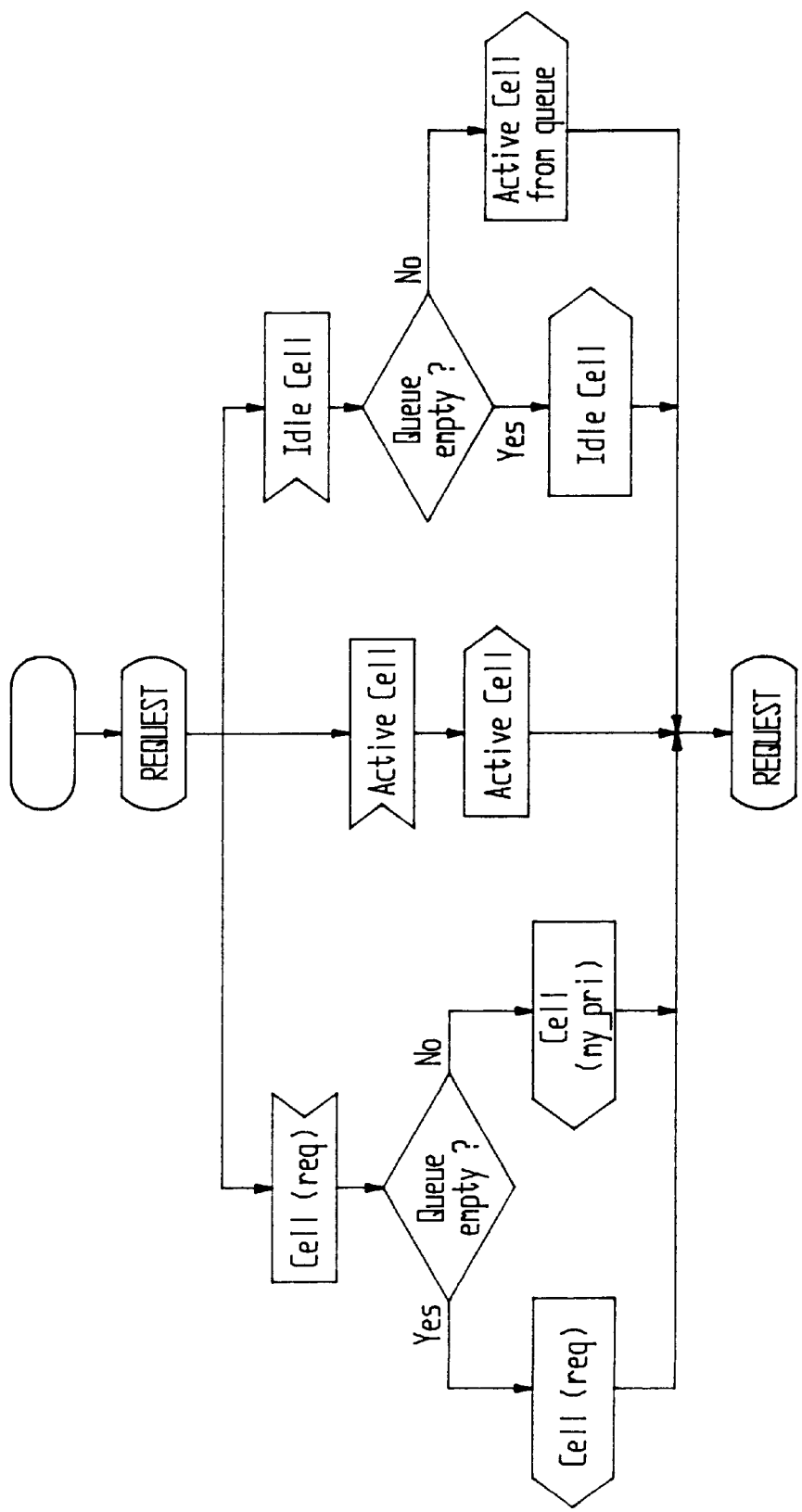
FIG. 6 illustrates a simplified state diagram.

In the case of CBR nodes assigned the highest priority, the state diagram can be simplified in two ways as shown in FIG. 6. First, the PENDING state can be deleted because there will be no higher priority requests since the nodes are assigned to top priority. Secondly, the FAIR state can be removed because there is not a requirement for bandwidth sharing among CBR sources since their bandwidth is naturally constrained. Nodes further to the right in FIGS. 4a, 4b can still be assured sufficient bandwidth provided the sum of the individual CBR bandwidths does not exceed the backbone capacity. Nodes still need to make requests even though others on this highest priority ignore them because the lower priority nodes must be forced into the PENDING state to prevent them transmitting when the CBR modules have cells to send.

Request Bus Protocol

Figure 12:
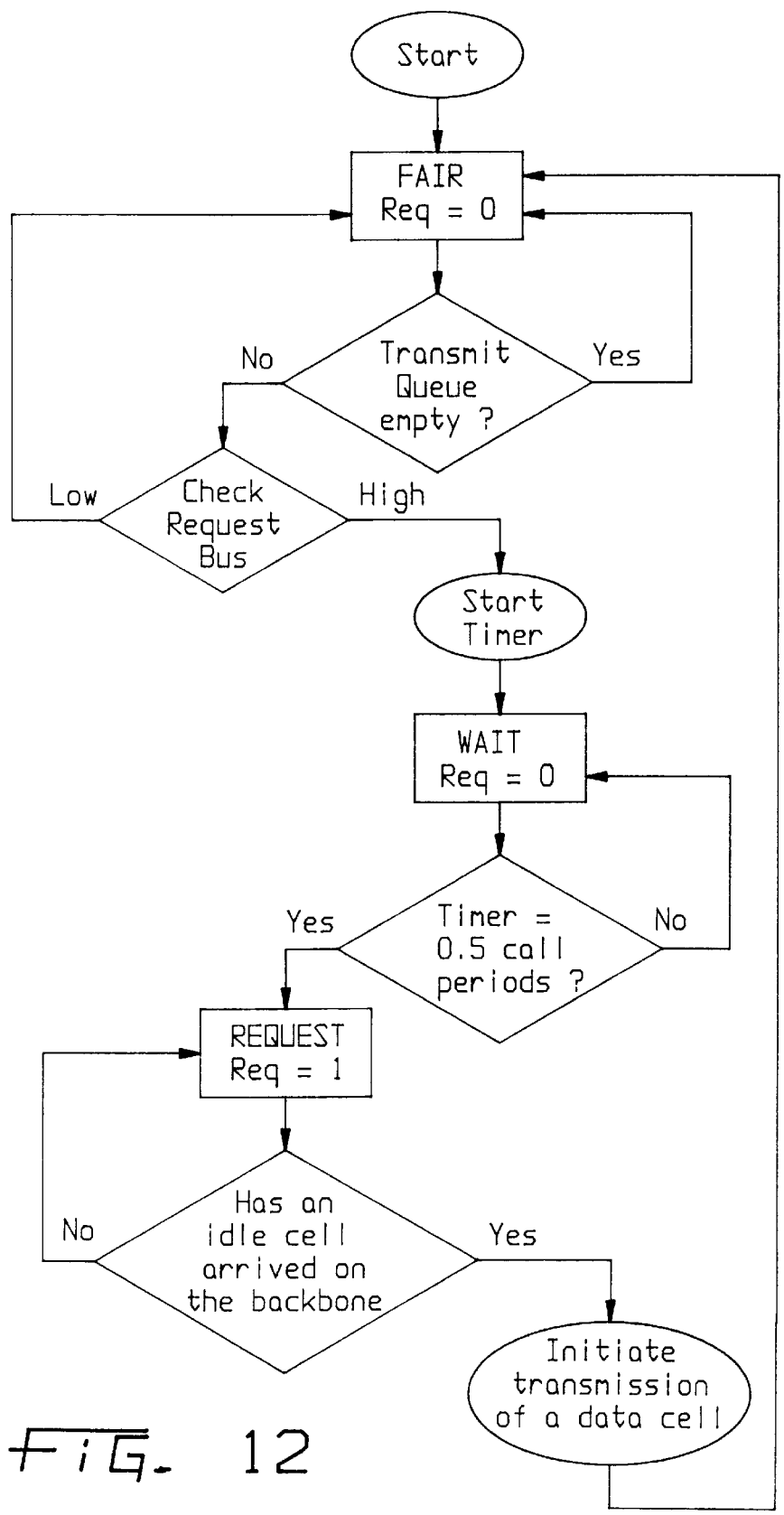
FIG. 12 illustrates a bus request state diagram.

The request bus protocol is an alternative to the request bit protocol described above. It places backbone access requests on a hardware bus instead of using request bits in the cell header. An example is shown in FIG. 12.

This protocol also behaves as if a token were passed cyclically from one active node to the next, skipping inactive ones. Therefore all active nodes enjoy an equal fraction of the backbone bandwidth.

There is no token but rather a bus on which each node broadcasts it's request to every other one that it wishes to send a cell. The request is a wired-or configuration which is pulled high with terminating resistors and each node makes a request by driving it low using an 'open drain' transistor. When a node has a cell to transmit, it drives the request bus low and waits for an idle cell to be passed to it from the previous node (or the idle cell generator if it is the first module in the chain). When it receives one, it immediately releases its request and transmits the cell. It then enters a 'fair' state, waiting until there are no more requests (i.e. for a rising edge on the request bus) before requesting to transmit any more cells it may have queued.

Initially, nodes closest to the idle cell generator transmit cells first, but then as each node transmits a cell and moves into the 'fair' state it waits for lower priority nodes to have a turn. Once all nodes with cells pending have transmitted, they will be in the 'fair' state and the request bus will go high letting all the nodes attempt to transmit a cell again. In the alternative, bus can be hardware configured to access nodes on a priority basis.

Advantages of Open Chain a) Request Bit Protocol

One advantage of the open chain approach is that it can implement the 'request bit' protocol for backbone load sharing. This has the advantage over the request bus protocol that it does not require a separate wire for the request bus. The open chain architecture requires 4 backbone connections per multiplexer device (each consisting of clock, sync and data wires) as opposed to two in the closed chain case.

The request bit protocol could be implemented on the closed chain by the introduction of a source-of-request MUX address field. this would be overwritten by every transmitter making a request and hence if a transmitter detected it's own address in this field it would clear the request bit. This protocol would in effect be very similar to the ATMR protocol with all window sizes set to 1. The cost of this option would be increased complexity in the transmitter modules, since they would have to process another field and would have to process the new field in the header in addition to the functions of the normal request bit protocol. Also there is a need for another address field in the header.

b) Simpler Access Logic

The receiver access logic is also simplified as there is no need to de-activate cells as they are received. Indeed, since a time slot is only ever used by one transmitter, the access need not be any more complex than an OR gate. In the closed chain case, when a cell is received, it must be converted into an inactive (idle) cell by resetting the activity bit in the header. Otherwise, the cell would circulate indefinitely around the loop. This simplification also means that there will be less delay through each receiver because, in order for the receiver to decide whether or not to de-activate a cell, it must examine the MUX port address in the header. Thus the activity bit cannot be sent out until the MUX port address field has been received.

c) Broadcasting and Multi-Casting

Broadcasting (transmission of cell to all modules of the system) is more simply implemented in the open chain architecture since, as stated above, receiver modules would not de-activate cells and hence information would pass through every receiver on a backbone anyway. If cell address matches one or more specified address, the node will copy the cell for its own use. To implement broadcasting in the closed chain case would require the broadcasting device to transmit to itself, causing a cell to pass all the way around the loop. A special broadcasting bit in the cell would have to be set to indicate to the other receivers that the cell was meant to be received by them as well. Multi-casting group (where a cell is transmitted to more than one, but not all, of the other receivers) would require additional bits (enough to provide a unique pattern for each group) in the header for the closed chain but could be simply achieved by using reserved addresses in the open chain case.

Figure 7:
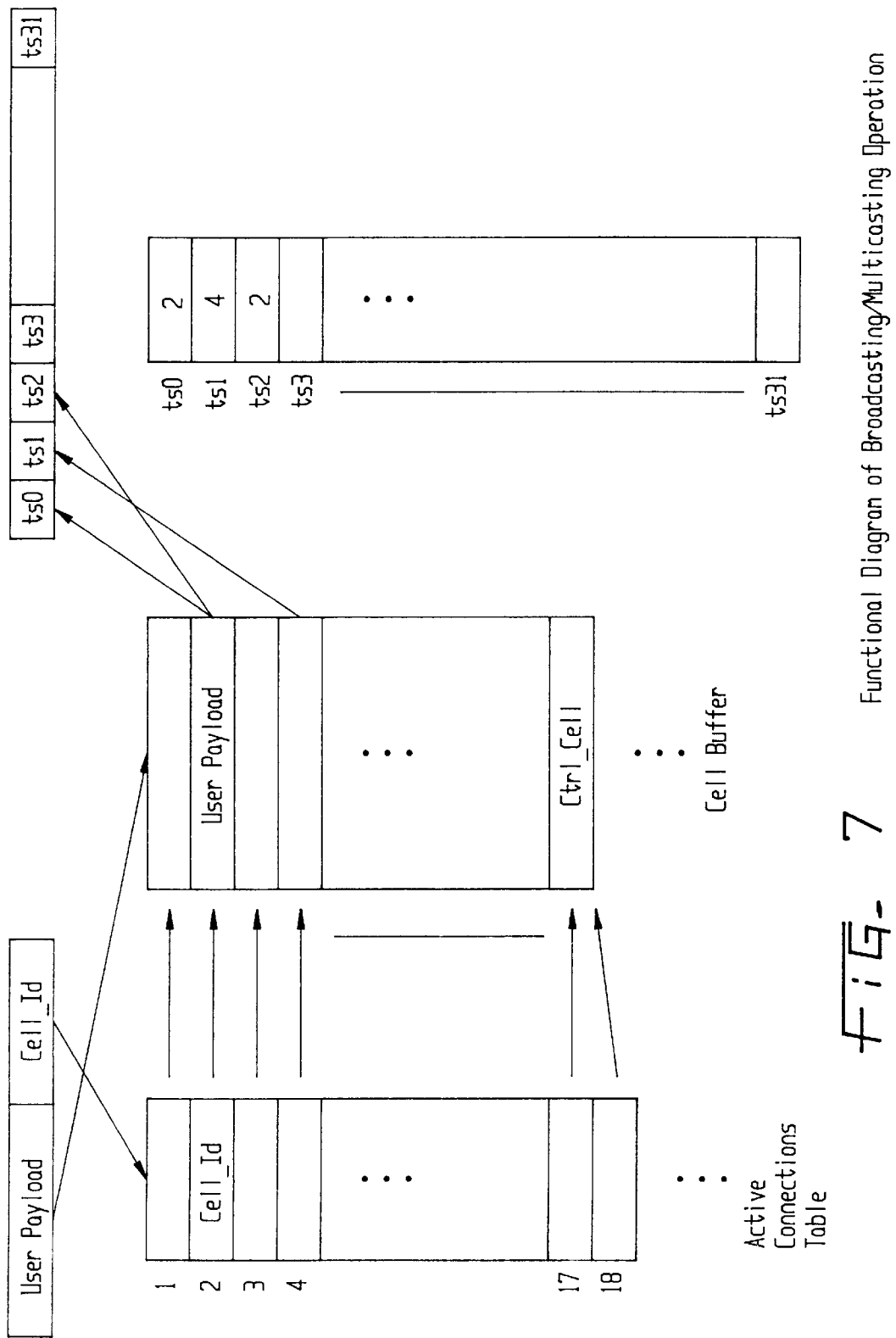
FIG. 7 illustrates cell mapping.

Duplication may be done at source or destination, and preferably the destination. In FIG. 7, we see that at the receiver a match has occurred between the incoming Cell_Id (Address) and the Cell_Id held in location 2 of a table, called the Active Connection Table, which holds specified addresses to be received. The index value, Buff_Id=2, from the Active Connections Table points to buffer 2 and the cell payload is thus stored there. This achieves the selecting and storing functions which are necessary to implement broadcasting and multicasting.

As applied to an ATM-TP device as an example of a node with a TDM interface at L1/N1 interface, the remaining operation is the mapping function which takes the user payload now stored in a buffer and writes this to the appropriate time-slot on the TDM highway. To do this requires a logical table which contains the Buff_Id values associated with each timeslot. A feature of the invention is the manner in which control (signalling) cells can be handled in the same way as information cells. Hence a control cell logical address to be matched also appears in the Active Connections Table of FIG. 7. FIG. 7 shows this output mapping where user information referenced by Buff_Id=2, in the example, is to be written to timeslots 0 and 2 in the TDM frame, thus achieving the multicasting function.

Note also that if the Cell_Id to be matched occurs in more than one entry of the Active Connections Table (corresponding to a time slot number in the TDM frame), then the output mapping logical table is no longer required, thus simplifying the implementation.

This approach to broadcasting with the preferred system is based on logical addressing and a process of duplication of cells at the latest possible stage; i.e. in the receiving devices. The solution developed has the following advantages:

a) There is no need for any special marking of broadcast/multicast cells on the ATM backbone. All cells are treated identically and there are no constraints on the number of broadcast classes, thus solving the multicast problem, b) The ATM cell receiver input functionality is simplified, c) Removes any constraints regarding channel numbering implied by schemes where the addressing has physical significance which could impact on the future flexibility of the ATM-TP device and the system, d) A more unified chip architecture resulting in reduced design time and cost, e) The chip architecture is scalable with no limitations on broadcast functionality.

d) Indefinite Cell Circulation

Another advantage of the open chain architecture is that there is no problem with cells circulating indefinitely around the loop with invalid MUX port addresses since there is no loop. Cells with invalid addresses would simply disappear at the end of the receiver chain.

e) Cell Alignment

Cell alignment not required in the open chain architecture because there is no need to close the loop.

If a switch is used in the system to expand the capacity, the open chain configuration could again avoid using cell alignment but there would have to be feedback to the idle cell generator on each transmitter chain in order to ensure alignment of cells entering the switch. This is because each chain may have a different number of transmitter modules in it and hence a different total delay. In this case it may be simpler to compensate for the variable delay by using cell alignment at each input to the switch anyway and thus allow the idle cell generators to operate at an arbitrary phase. Indeed clock and sync. may be fed back from the end of the receiver devices.

f) Local/Remote Traffic Competition

Figure 8:
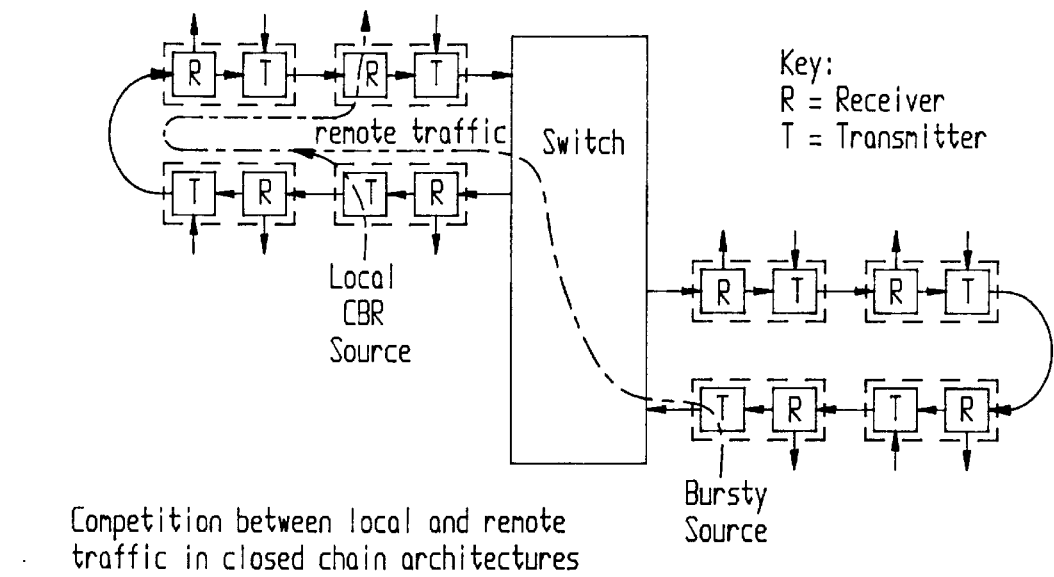
FIGS. 8 and 9 relate to a traffic problem.

A further advantage of the open chain arises when a switch is used because the switch introduces a problem for the closed chain. The problem, illustrated in FIG. 8, is that remote traffic from the switch output effectively has priority over local traffic because it doesn't have to request access to the backbone. This means that bursty remote traffic destined for receivers near the switch input can prevent transmitters near the switch output accessing the backbone. (Note that cell alignment has not been shown for clarity).

Figure 9:
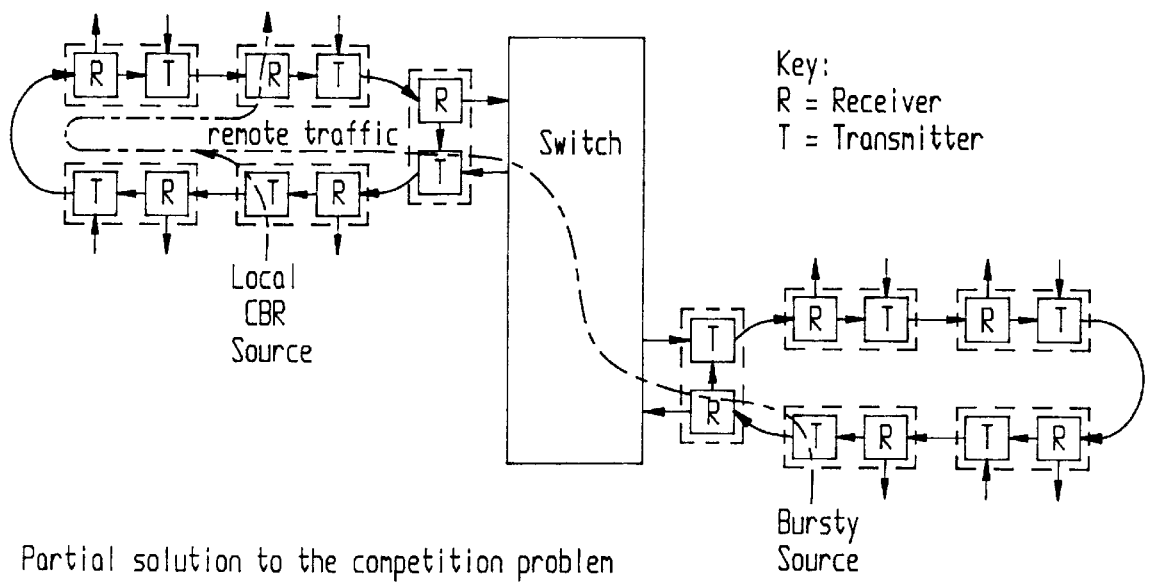

A possible solution, illustrated in FIG. 9, is to add a MUX module for each switch port and complete the loop outside the switch. This way remote traffic must access the backbone in exactly the same way as would any local source. It is possible that remote traffic would be a major proportion of the total on the backbone if the number of backbones is large, yet the remote traffic may be only granted equal access as the local traffic.

Closed Chain System

Figure 10:
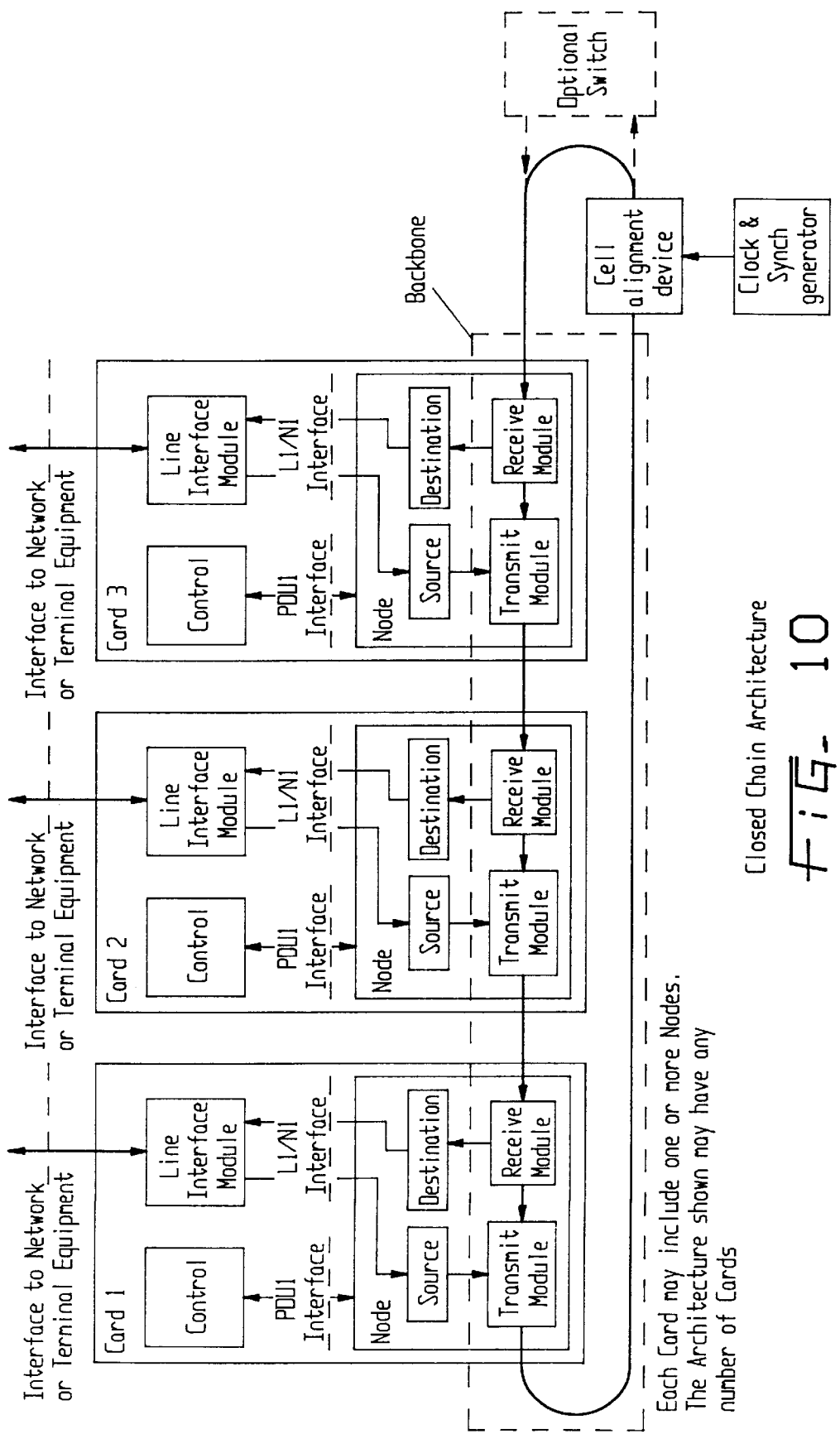
FIG. 10 illustrates a closed chain backbone architecture.

FIG. 10 shows a basic system closed chain configuration. In the closed chain, there may be no ordering in terms of priority as all transmitters are equivalent (there is no head position on a round table). The main characteristic of the closed chain approach is that receiver modules and transmitter modules are not divided into separate segments of the backbone and hence backbone wiring can be reduced because the connection between the transmitter and receiver in each module may be made on-chip. In order for cells to circulate around the loop, the total loop delay must be an integral multiple of a cell period, so there is a necessity for a cell alignment function at some point in the loop. As shown in the figure, the most suitable position when a switch is being used is at the input to the switch so that all cells arriving at the switch fabric can be aligned to the switch's clock and sync. timing. The switch, is optional, but nevertheless enables expandability.

Advantages of Closed Chain Reduced Backbone Usage

An advantage of the closed chain configuration is that, at least for full duplex CBR services, the contribution to the backbone bandwidth per connection is halved, because the forward and return paths occupy separate halves of the loop whereas in the open chain case, the forward and return paths both must pass along the same segment of the backbone. Also, with non-CBR, bursty data type transmissions, the average contribution to the backbone usage of every cell will only traverse half of the loop to reach its destination receiver whereas in the open chain case, it effectively travels to all receivers. This implies that to obtain the same performance, in both open and closed chain configurations, the closed chain configuration would need only half the backbone bandwidth.

In order to quantify this effect, consider the following table which estimates the required backbone capacity for a fully configured system (3 motherboards) assuming every CBR source is active and all traffic is outgoing.

| Type | # Extensions | # Channels (64 kbit/s) | # Transmitters |
|---|---|---|---|
| Low speed extensions | 3 × 3 × 8 | 144 (3 × 3 × 8 × 2) | 3 × 3 |
| Primary rate I/F | | 90 (3 × 30) | 3 |
| Basic Rate I/F | 3 × 4 | 24 (3 × 4 × 2) | 3 |
| PSTN | 3 × 8 | 24 (3 × 8) | 3 |
| Conferencing card | | 36 (3 × 12) | 3 |
| Voice compression | | | 3 |
| Modem control | | | 3 |

-continued

| Type | # Extensions | # Channels (64 kbit/s) | # Transmitters |
|---|---|---|---|
| Total | | 318 | 27 |

This number of active channels sums to a total of 20.4 Mbit/s for the open chain architecture but would only represent 10.2 Mbit/s on a closed chain architecture. Given that approximately 10–2 Mbit/s would be enough bandwidth to support at least the proposed 24 high speed data terminals, the open chain architecture would call for a backbone rate of 30–40 Mbit/s, where the closed chain architecture may only require perhaps 20–30 Mbit/s. Since a 50 Mbit/s backbone is quite feasible with current techniques, this implies that both open a and closed chain architectures are feasible.

If a switch is introduced, the difference between open and closed chain capacities no longer applies since in this situation, all of the transmitters on any backbone could be sending to receivers on other backbones, and hence both open and closed chain architectures would require capacity equal to the sum of the transmitter rates.

Reduced I/O and Backbone Wiring

An advantage of the closed chain is that fewer I/O pins are required for an implementation of the nodes and hence fewer backbone connector pins—particularly if the alternate input scheme is to be used to provide for live card insertion/removal. Fewer backbone connector pins is an advantage both because it reduces the cost of connectors and increases the reliability of the system. The following table lists the number of connections given various options. Note each backbone data connection requires 3 wires (clock, cell sync. and data), assuming clock recovery and cell delineation are used, and the request bus adds one extra pin.

| Type of backbone | Without alternate inputs | With alternate inputs |
|---|---|---|
| Open Chain without request bus | 4 × 2 = 12 | 6 × 3 = 18 |
| Closed Chain with request bus | 2 × 3 + 1 = 7 | 3 × 3 + 1 = 10 |
| Closed Chain without request bus | 2 × 3 = 6 | 3 × 3 = 9 |

Preferably, 4 wires are used for data, 1 for clock and 1 for cell sync.

Figure 11:
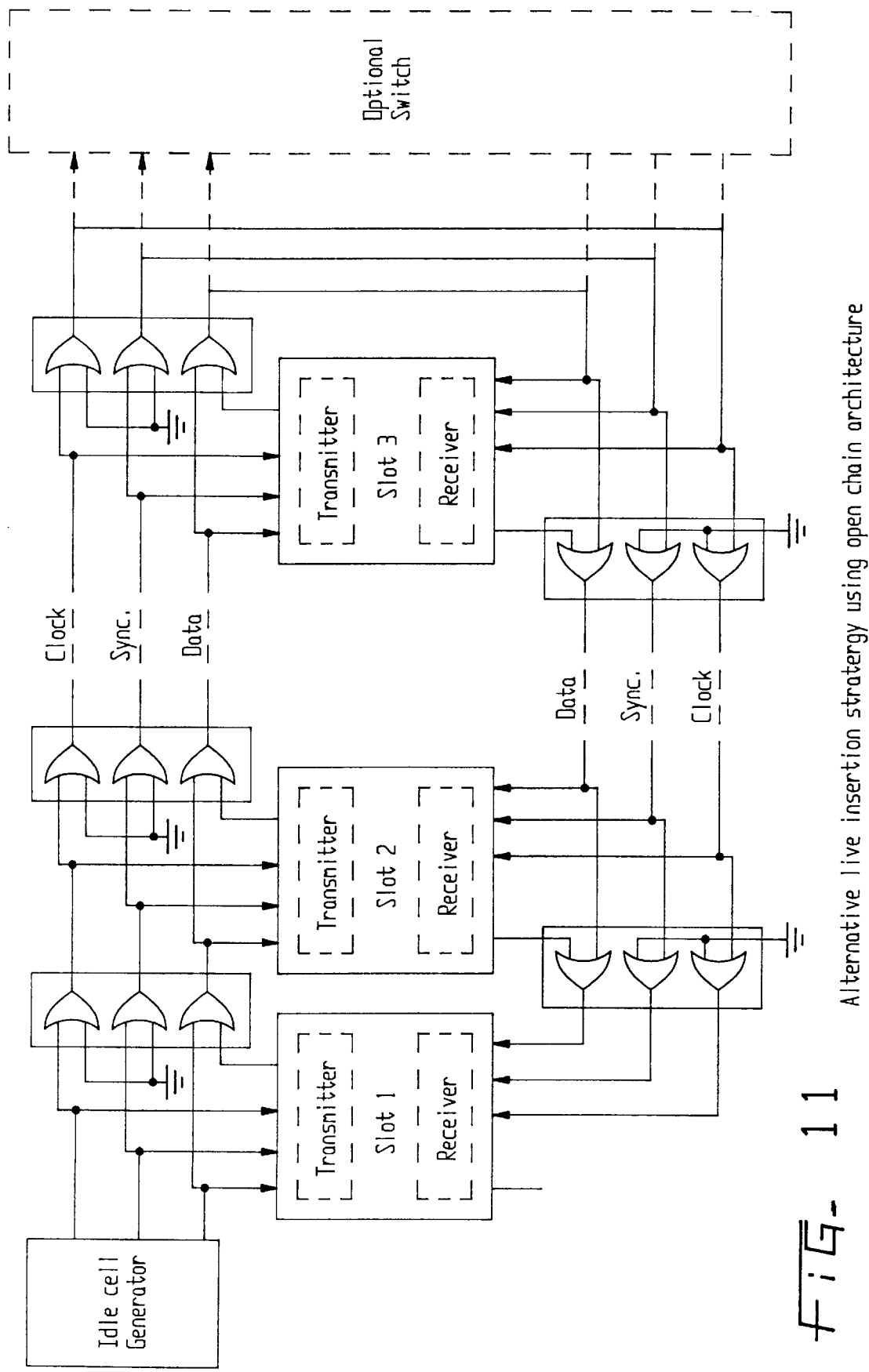
FIG. 11 relates to live card insertion.

Another possibility, not considered so far, is that live card insertion could be implemented by having some very simple active logic on the backbone as shown in FIG. 11. The purpose of the gates in the clock and sync. lines is to equalise the delay introduced by the or gate. This scheme would require 8 backbone connector pins while providing live insertion. Another advantage of this technique would be that jumpers would not be required in unused slots. Also, if a card were to fail, then provided that it always produced zeros on it's data output, it would not affect the operation of the rest of the system. Disadvantages of the scheme would be the need for 2 extra chips per slot and a requirement that the skew between delays on any of these chips be very small because the skew could accumulate along the chain. This requirement would be satisfied if ECL or perhaps FACT CMOS chips were used.

In summary, the advantageous implementation of idle cells and ATM to a communication system enables both CBR and/or non-CBR signals to be accommodated in the one system.

Indefinite Cell Circulation

Cells circulating in the system may be provided with an age bit in the header. By using an age bit in the header which is set each time it passes a specific point in the loop (probably the point where cell alignment is carried out), a Cell passing that point with the age bit already set—because it had passed that point before—would be discarded (deactivated).

B. Round Robin

In one particular form, "round robin" can be implemented in order to facilitate access to the system and in accordance with the characteristics noted above. In another particular form, the round robin feature may be implemented by a predetermined protocol to enable access to the system bus for a number of CBR and/or non-CBR sources. Cyclical access rights may be utilized from one transmitter to the next, preferably skipping inactive transmitters. This feature has been found applicable to the system embodiments disclosed in FIGS. 1 to 6 above.

C. Cell Format, and F. Partial Cell Fill

This aspect relates to a communication protocol. The protocol is suitable for, but not exclusive to, the communication system disclosed above.

The present aspect is predicated on the discovery of a new protocol. A protocol includes, without limitation, a predetermined sequence of events, instructions and/or methods, an exchange of 'tokens' (e.g. cells), an agreed set of standards for the transfer of data, signals, commands, in accordance with a particular transmission speed, format and synchronisation to facilitate the transfer. The protocol, in one form, facilitates at one of the following desirable features:

i) CBR and/or non-CBR without substantial degradation to the quality of service;
ii) control of echo;
iii) connection of interfaces to enable cell and/or packet traffic between a backbone structure and external devices;
iv) recognition of internally and externally sourced cells; and/or
v) connection of external cell sources, such as ATM terminals and ATM LANS, in particular, connection in a relatively cost effective manner.

The present invention sees an external cell as a group of data that is sourced external to the backbone, from external network and/or user equipment as exemplified in FIG. 1. The backbone to which the present protocol has application may be hub #2, for example. An external cell may also be a prior art protocol type, for example the CCITT UNI CELL of FIG. 13.

Figure 13:
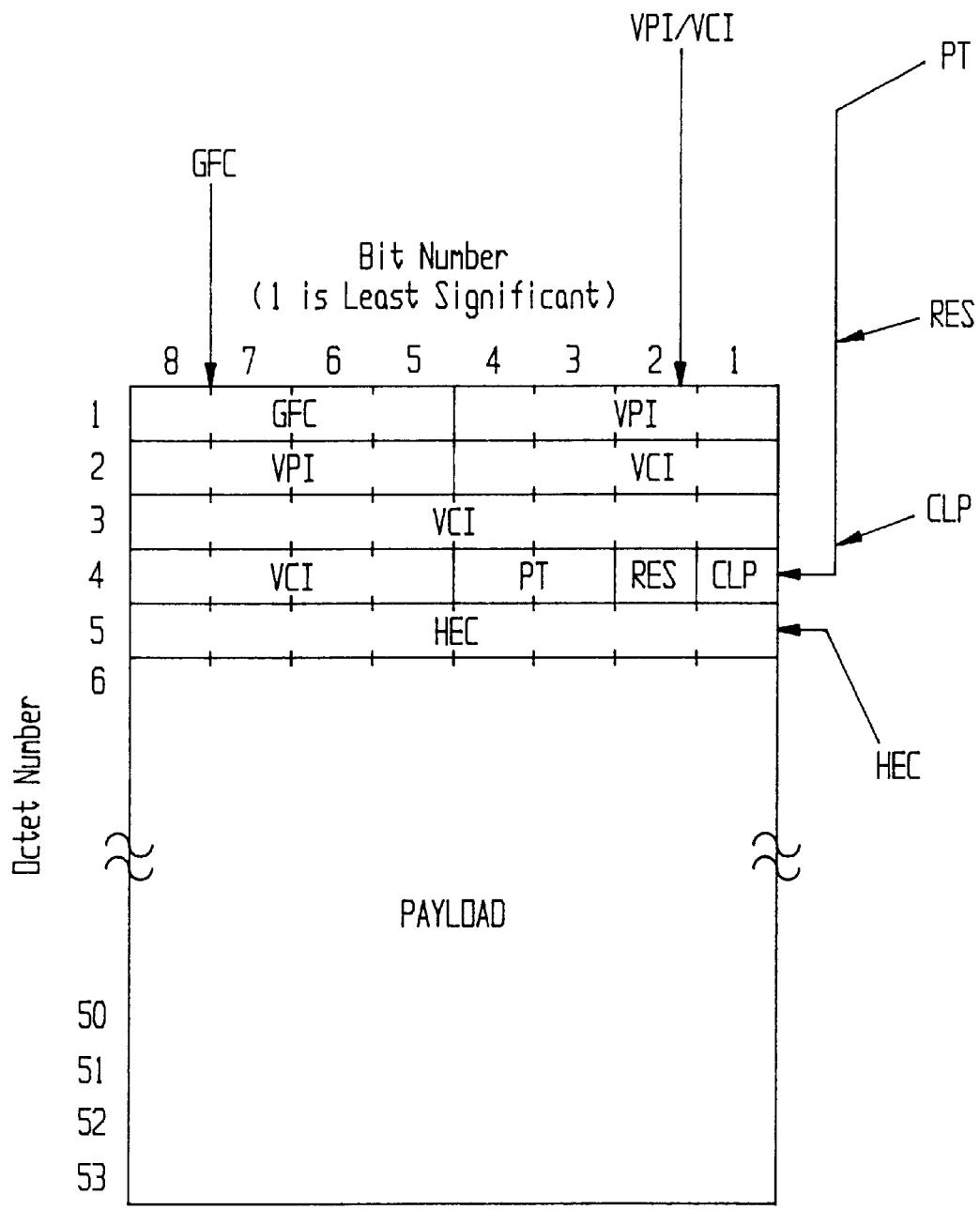
FIG. 13 shows a CCITT UNI ATM Cell.

In FIG. 13, at GFC, coding is for FS. It is to allow multiple terminals to share a single interface. VPI/VCI use is negotiated between network and terminal, or VPI is negotiated and VCI is treated transparently by the network. PT is payload type, with a default setting of 00 for user information. RES is reserved field, and has a default setting of 0. CLP is cell loss priority field. If this field is not set to 1, then the cell is subject to be discarded. HEC is header error control and is used to cover the entire header. It allows for single bit error correction and multi-bit error detection.

The present invention sees an internal cell as a medium or cell that can travel on the backbone.

The present invention utilizes a format which enables prior art type cell formats to be at least partially incorporated in the present cell format and substantially reconstructed upon emergence from a backbone. This facilitates the ability of the present protocol to enable the provision of a communication system as exemplified in FIG. 1, which includes CBR and/or non-CBR data, whether in an external or internal format. The present format, in one form, alters or overwrites a portion of an external cell in order to facilitate CBR and/or non-CBR traffic in the communication system.

Importantly, to one aspect, the present format utilizes a Req__Pri field for the trafficking of CBR and/or non-CBR.

In other fields of the cell, the provision of fresh fields enables the present system to support CBR and/or non-CBR traffic without substantial degradation to the quality of service. In one form, the provision of fields A, Req—Pri facilitates this.

The location of the fresh fields in the internal cell such that they can overwrite the GFC field of the CCITT UNI CELL also provides further cost effective connection of external cell sources, such as ATM terminals and ATM LANS.

The present protocol also enables fully filled, partially filled or a mixture of the two cells. Partially filled cells have been found to provide a degree of control over echo.

The present protocol facilitates communication within and between the communication system and external devices. FIG. 1 shows an exemplary system to which the present protocol is suited.

The following brief disclosure outlines one use of the present protocol with reference to FIGS. 4a and 4b where use of the protocol of the present invention facilitates interaction of a backbone with an externally sourced cell. The cell of the present aspect disclosed has many applications and thus should not, however, be so limited in its application.

An external cell having the format of the CCITT UNI CELL (for example) comes in the card via the interface to terminal and/or network equipment. The relevant information from the user and/or network equipment, including user and control information relevant to the externally coupled device(s), or connections that source the external cell(s), is passed to the node by the line interface module and the node dumps the user information into an internal cell, which then travels along the backbone to one or more designated nodes.

Meanwhile, additional information from the external cell, such as control information, header information relevant to the externally coupled devices or connections that sourced the external cell is passed to the cards control module via the line interface module where it may be sent, if necessary, as a part of the Communication System Control or signalling information, to the designated card(s) so that the external cell can be substantially completely reconstructed for re-emergence from the network or terminal interface, node or hub and continue onto its end destination.

When the node has dumped the relevant user information into the internal cell, that cell travels to the destination card(s) where a reconstruction process occurs, and in one form, the user information is joined to the relevant control information to complete the external cell reconstruction for its re-emergence. The reconstruction of the cell is undertaken to a level appropriate for use of the reconstructed cell by an external user and/or network equipment.

Knowledge of the type of external cell that has entered the interface and that must be reconstructed can be sent with the internal cell. Additionally, or alternatively, the destination card may have prior knowledge of what type of cell is to be reconstructed by having knowledge of the type of network or terminal equipment coupled to the designation card.

In the case of an internal cell, and for example where the card is presented with CBR data, the CBR data will come into the line interface module and in an appropriate form (such as digital form) the CBR data will be presented to the node. The node can then dump that form into an internal cell for carriage on the backbone. The cell may be partially or fully filled depending on the need for echo control.

In the case of an internal cell, and for example where the card is presented with non-CBR data, such as an Ethernet connection which uses packets. The packet comes into the line interface and depending on the amount or size of the packet, and where the packet is larger than a cell, the packet is segmented, the segments are placed into internal cell(s) and passed along the backbone. For example, an Ethernet packet may be 1000 octets long, it is then chopped into 47 octet lengths (for example) and put into internal cell(s) and sent along the backbone.

With regard to external cells and their headers, the present protocol may not use or may only partially use that header information, yet the header information must still re-emerge from the system to the external network or terminal equipment. Some of the header information or control information is passed along to the destination via our system of signalling channels and some of the header information is mapped to the present format and over written, if needed, in accordance with the protocol.

Figure 14:
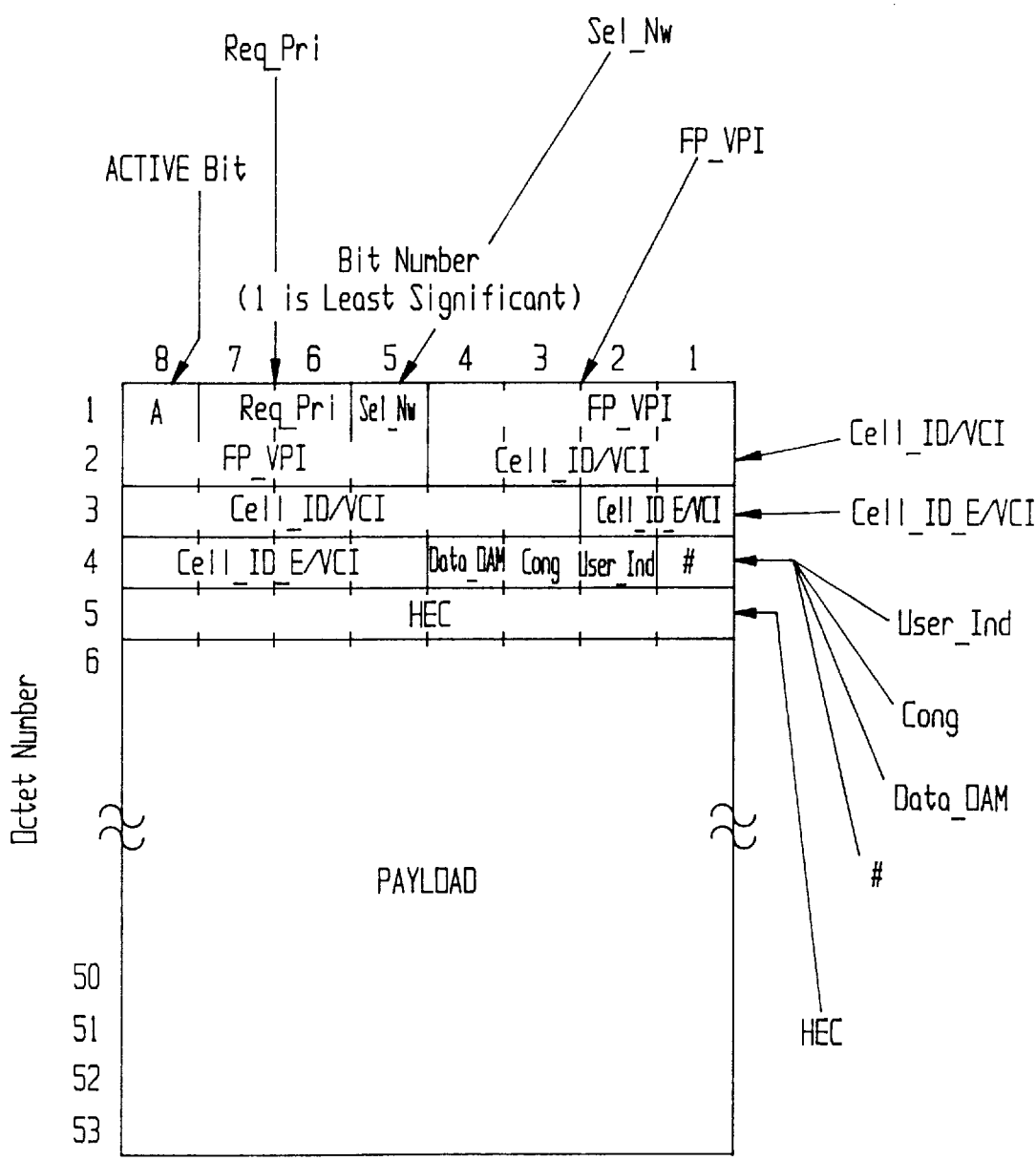
FIG. 14 shows one form of the Cell adapted for CBR and/or non-CBR.

A preferred embodiment of the present invention will now be disclosed with reference to FIG. 14, where Active Bit, if set to 0, the cell is then an Idle Cell. If it is set to 1, then the cell is an Active Cell. Req-Pri, if set to 00 is no request, if set to 01 is Burst_Pri, if set to 10 is not defined, and if set to 11 is CBR_Pri. Set_Nw, if set to 0, then the cell is a normal cell, and if set to 1, then the cell is a Select_Now_Cell. FP_VPI, if >=190, then the cell will be routed to a switch port. Note that to have a backbone looped back by a switch, this field is set to the value of the Switch Port to which the backbone is connected. If <190, then the cell is an ATM cell using VPI addressing and it will be accessed by any interface programmed to listen to a cell with this VPI. The values of 190 are arbitrarily chosen, but may be any other number if desired.

Further for Cell_ID/VCI, if the FP VPI >=190, then this field is interpreted as being a channel identifier. That is, for one Cell IDE value, there can be up to 1024 active channels per backbone. By way of example, an ATM-TP can have a maximum of 18 active channels. These being 2 signalling channels (one specific and one broadcast) and 16 CBR channels (each mapping to a CBR buffer). The output of a CBR buffer may be mapped to one or more timeslots. For Cell_ID_E/VCI, if the FP VPI>=190, then this field is used to extend addressing, if necessary. In one form, all ATM TP nodes will have a Cell IDE field set to one value, all ATM HP's will have another group of values, etc. If FP_VPI<189, then this field is assumed to be a VCI field being used between communicating ATM terminals and is transparent to the backbone. User_Ind, if set to 1 indicates that the last octets of the SAR PDU are carried in this cell, and only if the Data_OAM element is set to 0. Cong is generally not used. Data_OAM is used as noted above. # is generally not used. HEC is an ATM Header Check Sum.

Given the detail of information above in relation to FIG. 14, and the allocation of bits in the Cell, then the Cell as exemplarily disclosed allows for a. 32 backbones to a Switch and b. 1024 active channels per backbone per Cell_IDE value.

The embodiment is disclosed with reference to the prior art CCITT cell format of FIG. 13 to highlight the differences and advantages of the present cell format as disclosed in FIG. 14.

1. CELL SIZE

Choice of Cell size, Header size, Payload size.

1.1. Outline Of Problem

Need to have as some compatibility with "standard" ATM networks as possible in order to minimise cost of interfacing to external ATM networks.

1.2. Outline Of Solution

Cell size, Payload size and Header size conform to "standard".

1.3. Advantages Achieved

Compatibility with "Standard" ATM networks at minimum cost which could be incurred by:

Re-packaging the payload (Segmentation Assembly and Reassembly).

Re-packaging the Header 2.1. RE-USE OF GFC FIELD

Replacement of "Standard" GFC Field with other information, including activity bits.

2.1. Outline Of Problem

Need to have a place in the cell for proprietary fields which are used for backbone access and bandwidth sharing management information carried in the cell without:

Increasing the size of the cell.

Using parts of the cell which may be interpreted by ATM networks in some other way.

Effecting the payload format or amount of user data which can be carried in each cell.

2.2. Outline Of Solution

Replace "standard" Generic Flow Control field (except for the Active bit) with Request Priority bits and Select_Now bit.

2.2.1. Cross Impacts

Daisy Chain Architecture, Request Protocol.

2.3. Advantages Achieved

Possibility of connection to "standard" ATM networks at relatively lower cost than that which would otherwise result from putting proprietary LSP bits elsewhere in the cell.

The problem with placing the proprietary backbone access control bits in another part of the cell is that it would necessitate the extraction (i.e. as a cell enters our system from an external ATM network) and transportation through the system by some other mechanism, the replaced field, followed by its re-insertion into the cell (i.e. as it leaves our system) at the interface to another external ATM network.

Although the chosen mechanism necessitates the re-generation of the GFC field (in the above example where a cell enters an ATM network from the system), this does not represent any overhead since the GFC field is usually required to be re-generated in any case as a cell enters (or passes between) any ATM network sections.

3. USE OF ACTIVITY BIT

This entails multiple use of the Activity bit.

3.1. Outline Of Problem

Need to have an indicator of availability of the Transmit Bus at the beginning of each cell for the purpose of interfaces wanting to access the backbone (i.e. using the Load Sharing Protocol) while not conflicting with the intended use of the Active bit in "Standard" networks and without incurring the disadvantages of:

Increasing the size of the cell.

Using parts of the cell which may be interpreted by ATM networks in some other way.

Effecting the payload format or amount of user data which can be carried in each cell.

Adding an additional signal to the bus to indicate availability for transmission of a cell.

3.2. Outline Of Solution

Use the Active bit to indicate that the cell is used. This also tells interfaces to the system that bandwidth is available.

3.2.1. Cross Impacts

Daisy Chain Architecture, Request Protocol.

3.3. Advantages Achieved

Providing a "bandwidth available" indication to interfaces through standard use of the active bit. Also, A and Req-Pri fields mark each cell with its priority and activity and enable implementation of 3 characteristics as noted above in relation to A.

This implementation is accomplished by the utilisation of ATM technology in the system, in such a way that each node whether it is supporting CBR and/or non-CBR services is adapted to compete for idle cells. Cells enter the system, and flow through the system. CBR and/or non-CBR nodes may utilise the cells as required, and thus the system is able to traffic either CBR and/or non-CBR signals. In a most preferred form, the use of empty or idle cells is implemented in conjunction with an open chain architecture and/or a closed chain architecture.

The present invention is also predicated on the realization that information from CBR and/or non-CBR services is capable of occupying cells in a manner which is not fixed in advance. Dynamic bandwidth is one exemplary outcome of the above realization. The provision of dynamic bandwidth allocation facilitates the ability for user and control information to both use the same transmission medium.

The architectures to which the protocol of the present invention is particularly, but not exclusively, suitable for an open and/or closed chain systems. FIGS. 4a and 4b exemplify an open chain architecture and FIG. 10 exemplifies a closed chain architecture.

4. USE OF FP VPI FIELD

This entails in part the same use of the VPI field, other parts are interpreted differently. In the FP VPI field, if value=>190, it is an internal cell, if value <190, it is an external cell. Other values can be assigned for other purposes as required.

4.1. Outline Of Problem

"Standard" ATM network nodes use arbitrarily allocated assignments of the VPI fields and (if usual mode addressing is used) this also applies to the VCI field (which is then effectively an extension of the VPI field). IF "VPI addressing" is used in a "standard" ATM network then the VCI field is carried intact through the ATM network and completely disregarded from the purpose of routing.

In either case, there is a requirement that the intelligence at any ATM node, (including a switch) is involved in negotiation with adjacent nodes regarding the allocation of these arbitrarily assigned VPI and (if appropriate),VCI values. In the case of the system, this would have added the requirement for signalling to be performed between the switch controller and the source of cells and/or the controller of each backbone. This in turn has the following disadvantages:

A controller is necessary for each system switch (cost implications).

An appropriate protocol must be implemented to deal with addressing.

Because the switch is connected effectively as a series connection to our daisy chain at the loopback point, no information can be transferred between interfaces on any particular backbone until addresses of entities have been assigned. This impacts adversely on operation and maintenance strategies (eg fault self-diagnosis) of the system.

4.2. Outline Of Solution

Use the FP_VPI field in a dual mode. One mode assigns a separate fixed significance in terms of the intended destination switch port (i.e. destination backbone) to each value used. This means that for the routing of all cells within the system (except where the system is supporting more than one interface to external ATM networks and where such results in the requirement for transportation of "standard" VPI addressed cells from one ATM network interface to another) the FP_VPI field value preferably determines the destination backbone of any cells. The allocation of physical significance applies to a range of values of FP_VPI, which the system design reserves for this purpose.

If on the other hand, it is required to support more than one interface to ATM networks where such results in the requirement for transportation of "standard" VPI addressed cells from one ATM network interface to another, extension can be made to the system to accommodate it in the following manner:

The switch controller (which would now be required for this purpose) will be able to allocate (or have allocated) any previously unassigned FP_VPI values outside the range referred to above, to any required destination backbone (even though such a backbone could still otherwise be accessed using its "permanent" corresponding FP_VPI value).

Once such a cell reaches its destination backbone, it (or effectively a copy of it) can be routed via any required ATM external network interfaces to those networks with the cells' VCI fields intact. Such interfaces would identify the required cells by their VPI value only.

4.3. Advantages Achieved

Cost saving in system switch in all applications including those where the system has multiple interfaces to "standard" ATM networks which do not support "VPI Addressing".

This is achieved without adding to the complexity of the "standard" ATM network interface and also without additional complexity being required for the system Signalling (IMP) Protocol.

In spite of the above, it is possible to support (by adding a controller to the system Switch), if required, more than one interface to a "standard" ATM network where such interfaces are required to support VPI addressing.

5. USE OF FP VCI FIELD

This entails use of FP_VCI field alone for cell destination control within a backbone and the assignment of a "constant" value to one of the partitions for usage within the FPDX system for as many as possible of the commonly used applications.

5.1. Outline Of Problem

"standard" ATM network nodes use arbitrarily allocated assignments of the VCI field (effectively as an extension of the VPI field). If "VPI addressing" is used in a "standard" ATM network then the VCI field is carried intact through the ATM network.

In the case of the system, normally, as described above, the VPI field alone is used to designate the destination backbone and the FP_VCI field alone is used to designate the destination port(s) within a backbone. This implies that each receiving port must select cells on the basis of the full FP_VCI field, and given that this field is 16 bits long, there is an associated cost with this amount of programability for each port at each interface.

5.2. Outline Of Solution

The solution is to partition the field into two sub fields (<Cell_Id> and <Cell_Id_E>) and keep the value of <Cell_Id_E> constant for the most commonly occurring services (i.e. constant bit rate and signalling). The process of cell selection at each channel of each interface can then, after rejection of cells whose FP_VPI values and <Cell_Id_E> do not meet the required value for the backbone in question (and this can be performed once for all channels being serviced by each interface device), simply be that of selection on the basis of <Cell_Id> value.

5.3. Advantages Achieved

Reduction in the complexity of, and hardware cost associated with, cell addressing without any impact on the system's ability to support more than one interface to a "standard" ATM network where such interfaces are required to support VPI addressing.

6. CELL DELINEATION

This entails the avoidance of system attributes and provision of appropriate hardware which results in the avoidance of any requirements to use the Header Checksum Field (HEC) for cell delineation within the system.

6.1. Outline Of Problem

"standard" ATM Network nodes use the header checksum field for the following purposes:
Ensuring that the header field has not been corrupted by the network.
Cell delineation (i.e. finding the beginning of a cell when there is no specific separate signal which indicates this).
The hardware associated with this has some associated cost.

6.2. Outline Of Solution

This HEC is not necessarily used for internal cells. Thus, the solution is firstly to ensure that switching of paths in the system backplane (i.e. for O&M purposes) does not introduce errors into the header of any used cells. (This is where the Select_Now bit can be used to mark cells which may be corrupted by path switching so that they are never used.) This means that the probability of cell header corruption (or more the point, the possibility that a cell with a corrupted payload or length due to path switching will be used or accepted as valid by some interface) becomes insignificant.

The HEC field may be provided in external cells, but is not used in the present system open/closed architectures.

Secondly, the use of a separate signal on the backplane to mark the beginning of each cell eliminates the need to have a cell delineation circuit which identifies the beginning (and end of) each cell.

6.2.1. Cross Impacts

Using a motherboard as the "backbone" Medium.

6.3. Advantages Achieved

Reduction in the complexity, hardware cost associated with, the generation and checking of the Header Checksum.

7. CBR SAR PDU SIZES (Payload)

This entails the use of either of two selected SAR PDU's (i.e. formatted groups of user data bytes) for CBR services in the cell payload within the system.

7.1. Outline Of Problem

In relation to constant bit rate services only, "standard" ATM networks use SAR PDU's consisting of 47 bytes of user data (eg voice samples) plus a single octet SAR PDU header which contains a sequence number (which is used for detection of lost and misinserted cells. The problem with this are that:

The generation and checking of the sequence numbers has an associated cost. The cell delay variation in the system is bounded due to the LSP and, as a consequence, the occurrence of lost and misinserted cells are simply detectable by other means. However, if sequence number generation is to be reduced for all but connections via external ATM networks then it is desirable that it be made as easy as possible to insert sequence numbering at any standard ATM network interface and still gain some cost advantage.

The packetisation delays associated with the accumulation of 47 voice samples when packetisation occurs in both the send and receive directions within the system produces an unacceptable echo delay performance when voice calls are made over networks which have significant delay, or where regulatory requirements require a lower voice echo delay performance of the cpe in all and/or private network applications.

7.2. Outline Of Solution

The solutions are respectively as follows:
Position the SAR payload in the cell payload in a manner which leaves the SAR header octet in its required position unused. Also, the occurrence of lost cells and (most) misinserted cells can be detected by setting up the receive (reassembly) buffers (in terms of their length and set offset of the first arriving cell) in such a way that the occurrence of a lost or misinserted cell can be detected by the occurrence of buffer underflow or overflow respectively.
Support the generation and reception of partial cells, (16 octet SAR payload) allowing 1 octet at the front of it for convenience of interworking with external "standard" atm networks should they, some time in the future, standardise 16 octet SAR PDU's as they have previously standardised 47 octet SAR PDU's.

7.2.1. Cross Impacts

Bus/Daisy Chain nature of Architecture in addition to Load Sharing Protocol.

7.3. Advantages Achieved

The advantages achieved are respectively as follows:
Simplification of Reassembly hardware at each CBR channel receive end.
Improvement (by a factor of approximately 3) in echo delay performance for the system use of partial cells can enable control of echo.
Provision of full cells, partially filled cells, or a mixture of 47, 16 octet payloads. This facilitates accommodation of the 3 system characteristics noted above.
Hardware simplifications also result.
A more specific detail of one form of the present protocol is now disclosed:

1. LOGICAL CELL STRUCTURE DEFINITION

1.1. General

This section describes the functional attributes of a general Cell. §1.2 deals with an overview of a cell's composition while §1.3 describes the each element in functional detail.

2.2. Cell Composition

Below is a representation of the general Cell functional composition (irrespective of how it is coded) in terms of its various elements written in Backus-Naur form:

1.3 Element Detailed Functional Descriptions

The following section provides a functional description of each element.

1.3.1 <A> Active Functional Element

This element distinguishes active (information carrying) cells (when value is <Active_Cell>) from idle (empty) cells (when value is <Idle_Cell>).

1.3.2 <Req_Pri> Request Functional Element

The Request functional element is used by the system backbone access arbitration protocol as described above. Description of the function of the various options of this element is as follows:

1.3.2.1 <No_Req> No Request Option

<No_Req> is the default state of this element and indicates no Requests are being made.

1.3.2.2 <CBR_Pri> Request Option for CBR Traffic

<CBR_Pri> is the state of the Request element which indicates a request for Access for the purposes CBR payload transmission.

1.3.2.3 <Burst_Pri> Request Option for non-CBR Traffic

<Burst_Pri> is the state of the Request element which indicates a request for access the backbone for the purposes of transmission of non-CBR cells.

1.3.3 <Select_Now> Element

The <Select_Now> option of the <Control> element indicates, for the purposes of synchronisation of input switches at interface modules, that the input switch (if armed

```
<ATM_Cell> ::= <Header><Payload>
<Header>::= <Control><FP_VPI><FP_VCl><PT><HEC>
        <Control>            ::=<A><Req_Pri><Select_Now>
                             <A>          ::= <Idle_cell>|<Active_cell>
                             <Req_prl>    ::=<No_Req>|<CBR_Pri>|<Burst_Pri>
                             <Select_Now> ::=<Normal_Cell>|<Select_Now_Cell>
        <FP_VPI>             ::=<VPI>|<SP>
                             <VPI>        ::=<0>|. . .|<189>
                             <SP>         ::=<S_Port_ID> ::= <All_Ports>|<Port_0>|. . .|<Port_31>
                                          <S_Port_ID>::= <All_Ports>|<Port_0>|. . .|<Port_31>
                                          <Priority>  ::-<Normal/CBR>
        <FP_VCL>             ::=<<Cell_ID><Cell_ID_E>>|<VCI>
                             <Cell_ID>    ::=<0>|. . .|<1023>    for <FP_VPI>≧190
                             <Cell_ID_E>  ::=<0>|. . .|<63>      for <FP_VPI>≧190
                             <VCI>        ::=<0>|. . .|<65,535>  for <FP_VPI>≧189
        <PT>                 ::=<Data_OAM><Congestion><User_Ind>
                             <Data_OAm>   ::= Don't Care
                             <Congestion>::= Don't Care
                             <User_Ind>   ::= <Eom>|<Not_Eom> for Data_OAM=0
        <HEC>                ::=as per CCITT Standard
<PayLoad>::= <CBR_Payload>|<Ctrl_Payload>|<Other_Payload>
    <CBR_Payload>::=<<SAR_Hdr><SAR47_PayLoad>>|<<SAR_Hdr><SAR16_PayLoad>
                  <Fill>>
                        <SAR47_Payload>::= {<CBR_Byte>} (47 bytes)
                        <SAR16_Payload>::= {<CBR_Byte>} (16 bytes)
                            <CBR_Byte>   ::=<0>|. . .|<255>
                  <Fill>
    <Ctrl_Payload>::={<Ctrl_Byte>} (48 Bytes)
                  <Ctrl_Byte>  ::=<0>|. . .|<255>
    <Other_Payload> ::=e.g. non-CBR
``` and sees the arrival of a Cell carrying the Select_Now_Cell option of this element) is to change to the prescribed position during the arrival of the payload field of this cell.

1.3.4 <FP_VPI> Functional Element

This is an element which takes either of 2 meanings, depending on the numerical value. If the value is less than 190 this element takes the meaning of <VPI> (in which case it is reserved for use by external ATM terminals), otherwise it takes the meaning of <SP> (a combination of Switch Port and Priority indications). The value of this field also effects the meaning of the <FP_VCI> field (see §1.3.5).

1.3.4.1 <VPI> Option

<VPI> can be used (within the number range limitations described above) by the system for cells addressed using <VPI> only as the complete identification of the destination (i.e. system module or port as well as system Destination Switch Port and associated Priority). In this case the <FP_VCI> field (i.e. in this case <VCI> value) is not used for backbone or Switch Port destination identification but is reserved for use by the terminal endpoints.

1.3.4.2.1 <SP> Option

The <SP> element option defines the destination Switch Port and Priority of a cell as follows:

1.3.4.2.1 <S_Port ID> Element

This element defines the destination Switch Port of a cell. This is intended to be used as a form of "fixed" Switch Port designation.

One valid value is <All_Ports>, which indicates that the cell must be copied to all other ports.

1.3.4.2.2 <Priority> Element

This element designates with what Priority a Cell must be transported to the Switch Port designated by <S_Port_ID> in terms of either Normal Priority or CBR Priority.

1.3.5 <FP_VCI> Element

This is an element which takes either of 2 meanings, depending on the numerical value of the <FP_VPI> element (see §1.3.4). If the numerical value of <FP_VPI> is greater than 189 the <FP_VCI> element takes the meaning of <Cell_ID> concatenated with <Cell_Id_E>, otherwise it takes the meaning of <VCI>.

1.3.5.1 <Cell_Id> and <Cell_Id E> Elements

The combination of <Cell_Id> and <Cell_Id_E> together are used as a destination endpoint designator within a backbone. They are separated for ease of use (see §3.1.2.1 and §3.1.2.2).

1.3.5.2 <VCI> Element

This is provided for use by external ATM terminals wishing to pass cells through the system (i.e. CCITT or ATM Forum standard) when using VPI addressing. It is passed through the system unchanged.

1.3.6 <PT> Element

The Payload Type functional element contains three functional elements, including the <User_Id> element which is described below. It is used only in association with cells carrying a <Ctrl_Payload>, i.e. system IMP protocol signalling cells. Its use by the system for other purposes is not defined. The value of this element will not be changed for Cells passing through the system from one external ATM endpoint to another.

1.3.6.1 <Data OAM> Element

Used as described in §1.3.6.3. Otherwise use of this field internally by the system is not defined.

1.3.6.2 <Congestion> Element

Use of this field internally by the system is not defined.

1.3.6.3 <User_Ind> Element

This element is used as an indication (when set to 1) that the last bytes of the SAR SDU are carried by this Cell. It only has this meaning provided the <Data_OAM> element contained within the same <PT> element is 0. Use of this field for other purposes internally by the FPDX system is not defined. The value of this element will not be changed for Cells passing through the FPDX-2 system from one external ATM endpoint to another.

1.3.7 <HEC> Element

This element is an ATM Header Check Sum reserved for use by CCITT ATM terminals.

1.3.8 <Payload> Element

This element carries any required SAR PDU. There are at least 2 different types envisaged so far. These are the <CBR_Payload > and the <Ctrl_Payload>.

1.3.8.1 <CBR_Payload > Option

This is a SAR type 1 PDU which can take either of the following forms depending on how many user bytes (i.e. number of octets in the <Sar_Payload>) are carried in the cell payload. It consists always of a <SAR_Hdr > plus a <SAR_Payload > and (in the case of there being only 16 user bytes carried in the payload) the Cell payload also contains a <Fill > element.

1.3.8.1.1 <SAR_Hdr > Element

This is reserved for use by ATM terminals in a way defined by CCITT Recommendation 1.363.

1.3.8.1.2 <SAR47_Pld > and <SAR16_Pld > Elements

These are SAR type 1 PDU payloads for cell payload fill values of 47 and 16 CBR_Bytes respectively. They carry user bytes for Constant Bit Rate connections.

1.3.8.2 <Ctrl_Payload > Option

This consists of 48 bytes (i.e. one payload's worth) of signalling bytes.

2. CELL PHYSICAL STRUCTURE DEFINITION

2.1 General

The following section describes the system physical cell data structure and field coding (see FIG. 14). This is based on the CCITT UNI cell format (see FIG. 13) which is a 53 octet cell consisting of a 5 octet cell header and a 48 octet cell payload. However parts of the Cell header are used differently. The position of the various fields are depicted below; also see FIG. 2.

Table 1 Cell Data Structure

The header will be sent first followed by the information field and the following conventions shall apply:

a octets are sent in increasing order, starting with 1; for all fields, the first bit sent is the Most Significant Bit.

b bits within an octet are sent in decreasing order, starting with bit 8.

c Logic High corresponds to Logic 1 and vice versa.

2.2 Coding of Fields

The following defines in more detail (where required) the coding of the respective fields shown.

2.2.1 Control Field

This consists of a Activity, Req_Priority and a Select_Now fields.

| OCTET | \multicolumn{8}{c}{BIT POSITION} |||||||||
|---|---|---|---|---|---|---|---|---|
|  | 8 | 7 | 6 | 5 | 4 | 3 | 2 | 1 |
| 1 | A | Req_Pri | | Sel_Nw | | | | |

Table 2 Control Field Data Structure

2.2.1.1 Active (A) Bit

This is Bit 8 of Octet 1.

| ACTIVE | Indication |
|---|---|
| 0 | Idle_Cell. |
| 1 | Active_Cell. |

2.2.1.2 Request Field

The Request (Req_Pri) field consists of Octet 1, bits 7 and 6. The respective states are coded as follows:

| Bit 7 | Bit 6 | Priority Indicated | Protocol Spec [4] Level |
|---|---|---|---|
| 0 | 0 | No_Req | (0) |
| 0 | 1 | Burst_Pri | (1) |
| 1 | 0 | (not defined) | (3) |
| 1 | 1 | CBR_PRI | (4) |

2.2.1.3 Select_Now (Sel_Nw) Bit

This is Bit 8 of Octet 1.

| Select_Now | Indication |
|---|---|
| 0 | Normal_Cell. |
| 1 | Select_Now_Cell. |

2.2.2. FP_VPI Field

The FP_VPI field is carried by Octet 1 Bit 4 (most significant bit) to Octet 2 Bit 5.

| OCTET | \multicolumn{8}{c}{BIT POSITION} |||||||||
|---|---|---|---|---|---|---|---|---|
|  | 8 | 7 | 6 | 5 | 4 | 3 | 2 | 1 |
| 1 | | | | | FP_VPI | | | |
| 2 | FP_VPI | | | | | | | |
| 3 | | | | | | | | |

Table 3 VPI_Field Position

2.2.3 FP VCI Field

The FP_VCI field is carried by Octet 2 Bit 4 (most significant bit) to Octet 4 Bit 5 and comprises the following sub-fields.

| OCTET | \multicolumn{8}{c}{BIT POSITION} |||||||||
|---|---|---|---|---|---|---|---|---|
|  | 8 | 7 | 6 | 5 | 4 | 3 | 2 | 1 |
| 2 | | | | | Cell_ID/VCI | | | |
| 3 | | Cell_ID/VCI | | | | | Cell_ID_E/VCI | |
| 4 | Cell_ID_E/VCI | | | | | | | |

Table 4 FP_VCI FIELD STRUCTURE

2.2.3.1 Cell ID Field

The Cell_ID field is carried by Octet 2 Bit 4 (most significant bit) to Octet 3 Bit 3.

2.2.3.2 Cell_ID E Field

The Cell_ID_E field is carried by Octet 3 Bit 2 (most significant bit) to Octet 4 Bit 5.

2.2.4 PT Field

| OCTET | \multicolumn{8}{c}{BIT POSITION} |||||||||
|---|---|---|---|---|---|---|---|---|
|  | 8 | 7 | 6 | 5 | 4 | 3 | 2 | 1 |
| 4 | | | | | Data_OAM | Congestion | User_Ind | |

Table 5 Cell Data Structure

This consists of the following 3 Bits in Octet 4:

| Bit 4 | Data_OAM |
|---|---|
| Bit 3 | Congestion |
| Bit 2 | User_Ind |

For meaning see §1.3.6.

2.2.5 HEC Field

Octet 5 is reserved for this purpose. Coding is as per CCITT Standard.

2.2.6 Payload Field

This is the last 48 octets (Octets 6 to 53) in the Cell.

3. USE OF HEADER FIELDS BY SYSTEM

The Cell Header fields are described in the sections above. The following is a summary of the use of these fields by the system and should be read in conjunction with the Element Detailed Functional Descriptions §1.3. Note also that it is a requirement that the system software at every module must have full control over the contents of all of the cell header fields (except for Req_Pri and Active bits) for every Cell generated.

3.1 (Native) Layer 1 Addressing

The following section describes the use of address fields by the system Layer 1 when operating with only system equipment (i.e. interfaces and Switch). Safeguards are built in to facilitate easy interworking with CCITT (or other appropriate standard interfaces) terminals or networks. ATM network interworking operation modes are described in §3.2.

3.1.1 Port Addressing

When the FP_VPI value is $\geq 190$ (i.e. represents an SP value) the value of this field will (from system power up) have direct physical significance in terms of destination Switch Port and priority. i.e. The expected result of a cell arriving at an input port of an switch is that it will be routed to the switch port indicated in the 'S_Port_ID' column of the table below with the priority indicated in the 'Priority' column according to its FP_VPI field value indicated in the left hand column.

| FP_VPI | S_Port_ID | Priority | |
|---|---|---|---|
| 190 | All | Normal | |
| 191 | All | CBR | |
| 192 | 0 | Normal | |
| 193 | 0 | CBR | |
| 194 | 1 | Normal | Programmed into switch |
| 195 | 1 | CBR | |
| . | . | . | |
| . | . | . | |
| 254 | 31 | Normal | |
| 255 | 31 | CBR | |

Note that to cater for ATM cells with VPI addressing the switch would have to have additional intelligence which would allow it to map a VPI against a port as well.

A system switch will therefore have its default routing programmed accordingly above and it will not change the value of this field in cells emerging from it.

3.1.2 Backbone Channel Addressing

All interfaces on a backbone will expect that any Cells for destination end points connected to this backbone, other than external ATM terminals (see §3.2.2), will have one of the <FP_VPI> field values according to the table in §3.2.1 above and will not accept any others.

Logical channels are then differentiated by use of the <FP_VCI> field as described below. (Note that the <FP_VCI> field can be used to transport the CCITT <VCI> field as described in §3.2.1.)

3.1.2.1 Channel Addressing—Stage 1,2,& 3 Connectivity

Addressing (of Modules and their respective channels) within a backbone is achieved by use of the Cell_Id and Cell_Id_E fields. Stage 1,2 & 3 connectivity i.e. for CBR connections as well as all system signalling (i.e. for internal control) will use a globally constant value (eg 0) of Cell_Id_E while using the Cell_Id field in a programmable fashion.

3.1.2.2 Channel Addressing—Stage 4 Connectivity (i.e. for LAN connectivity)

This will be handled analogously to cells servicing the requirements of stages 1,2 & 3 connectivity. The only exceptions to this may be that the Cell_Id_E field may also be treated as a variable if there is a requirement for more logical channels than can easily be designated by the range of Cell_Id values. This remains the subject of further study.

3.1.2.3 Signalling

Each physical internal system signalling node will be programmed to accept Cells with Cell_Id values (i.e. Receiver Programability requirements) as follows:

a) 1 programmable, fully specified value to be used for specific (i.e. unique) endpoint addressing and is fixed from power up.

b) 1 programmable, partially specified (i.e. with bits being able to be allocated as "don't care") to be used for reception of broadcast signalling.

The values to be used are to be allocated by system software. For a) above the allocated Cell_Id values will be related to module physical location (card slot ID) and should not need to change after module power up initialisation.

3.1.2.4 User Data Logical Channel Addressing

Cell_ID values for logical channels are freely programmable for each connection at both the source module and at the respective destination modules. Because the receivers on one or more modules for one or more channels, can be programmed to the same Cell_ID value, broadcasting of user data channels and system resource data is simply achievable.

3.2 Interworking with ATM Networks

The envisaged normal method of connection of an ATM terminal or network to the system will be through an interface located either on a module plugged into the backbone or located at a switch port. It is assumed that there may be a number of such interfaces in a system. Operation can be summarised as falling into one of 2 classes described below.

3.2.1 Interworking with Virtual Channel Switching

In the case of an ATM network interface, where the connection requires Virtual Channel Switching, the interface will translate the ATM standard VPI.VCI address field of cells headed toward the system to a system Layer 1 <SP><Cell_Id ><Cell_Id_E > value.

The converse will apply for Cells headed in the opposite direction.

In the case of a connected ATM terminal, the terminal can be allocated a VPI and VCI value which is one or more valid <SP ><Cell_Id ><Cell_Id_E > value and no modification of this field will be required at the interface nor will the switch need to note the connection in its connection translation table.

3.2.2 Interworking with Virtual Path Switching

In the case of an ATM network interface, where the connection requires Virtual Path Switching, the interface will not necessarily translate the ATM standard VPI address field and will not modify the VCI field of cells passing through the interface. Since the transportation of such cells through the system is assumed to be servicing ATM terminal endpoints external to the system at both ends of the connection, the system ATM interface modules will need to have virtual path switching (filtering of cells based only on VPI field value) capability.

If such a connection is via a system switch, then the required VPI value and associated path through the switch will need to be set up in the switch's connection table. It is assumed that the VPI values used will not conflict with the range of values set aside for <SP>. If such a value was allocated by an ATM network interfaced to the system then the interface would need to translate the VPI field value so that an system switch unit would not incorrectly route the cells.

3.2.3 Use of GFC Field

Cells entering the system from an ATM terminal or network will have their GFC fields replaced by <Control> field values. The contents of the GFC field will be discarded. The converse will apply (where required) for Cells leaving the system toward an ATM network or terminal. These operations will be handled by the ATM interface.

E. Interfaces

A number of embodiments of interfaces will now be described with reference to the accompanying drawings.

Although one of the disclosures relates particularly to a type of node for CBR signals (ATM-TP node), the disclosure (in principle and also by way of embodiment) equally applies to a node for CBR and/or non-CBR signals (ATM-HP node). In the case of ATM-HP, CBR and/or non-CBR signals may be packetized internal or external of the node.

A number of benefits gained by the present node is the ability to provide a cost effective interface to a system or backbone.

With regard to the node of the present invention, the receiver module and transmitter module components enable the node to communicate with the backbone, whereas the other components of the node, in general, form source and destination modules and facilitate communication with external CBR and/or non-CBR services.

1. INTRODUCTION

The following text outlines the functional requiremets of th ATM-TDM Interface device (ATM-TP). The aim of this text is to provide an overview of the functional aspects of the ATM-TP, and in principle the ATM-HP.

2. ATM-TP FUNCTIONAL OVERVIEW

2.1 Functional Model of the ATM-TP

The functional model of the ATM-TP (see FIG. 15) provides Transmit and Receive interfaces to an ATM reticulator (reference RP) as well as a Microprocessor Bus interface (reference PDU1) and a multiplexed 64 Kbit Terminal Highway interface (reference L1/N1).

Essentially the ATM-TP provides the functions of the Physical Layer, ATM layer and the SAR and the CS sublayers of the AAL Layer of the B-ISDN Protocol Reference model (see CCITT Rec. I.321) at any interface module on the ATM backbone (with the possible exception of the Ethernet Interface). The model provides AAL type 1 function at the L1/N1 interface and ATM Layer functionality at the PDU1 interface.

The PDU1 interface is primarily intended for the following purposes:

i Configuring the device for such things as buffer control and testing.
ii Loading of information for Cell Header fields for outgoing Constant Bit Rate cells.
iii FPDX-1 inter-module signalling.

The Terminal Highway interface provides half of a 32×64K bit/s B-Channel (2.048 Mbit) output and input which is also be capable of transporting aggregated 64 Kbit channels. It is intended that this interface might connect to:

a An ISDN Primary Rate Layer 1 device.
b Multiple Basic Rate devices (B-Channel data only) for either BRA network access or LSPX Line Manager application.
c Multiple Codecs in PSTN Line Access Unit.
d Multiple voice conferencing devices

3. ATM-TP COMPONENT FUNCTIONS

3.1. General

Figure 15A:
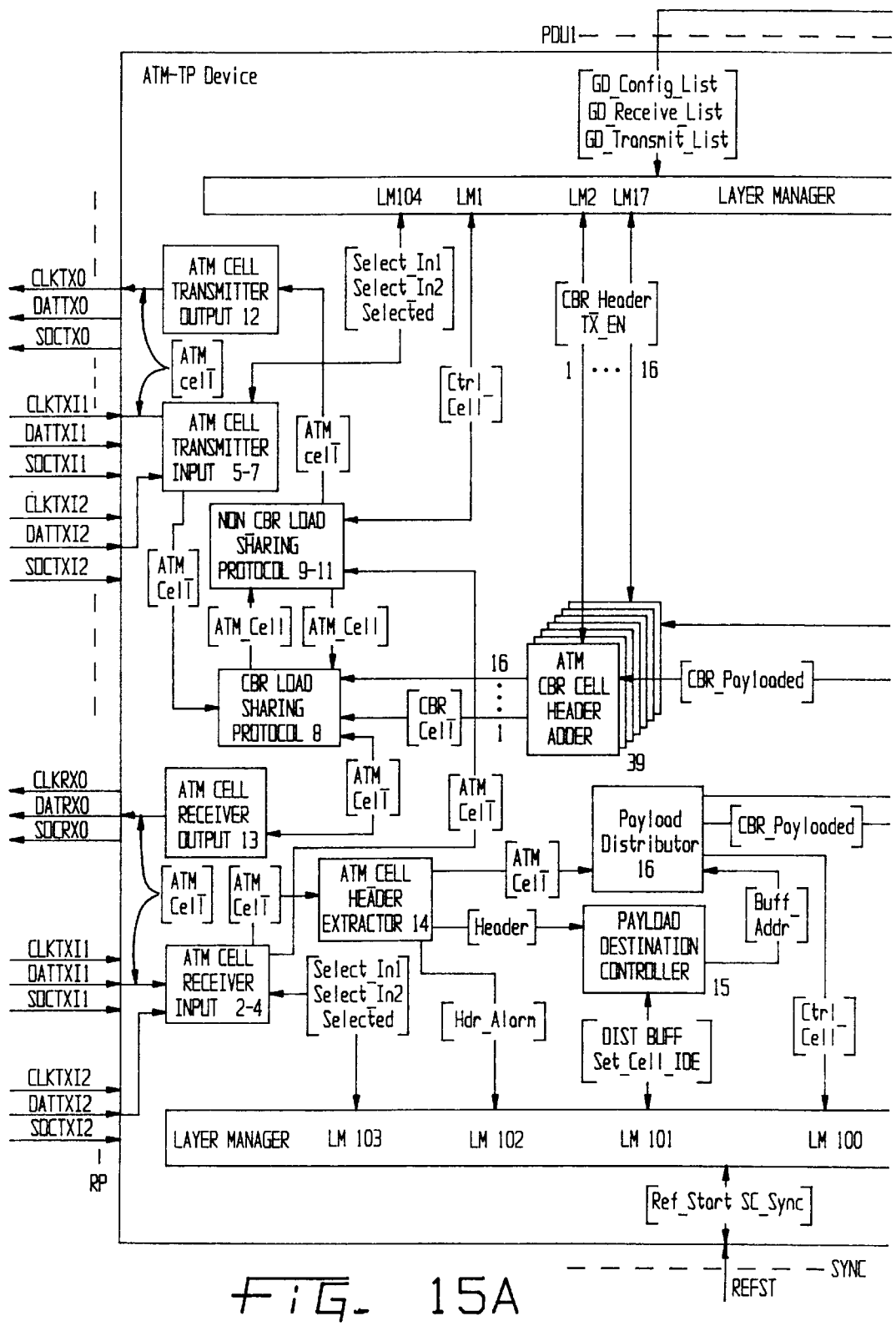
FIG. 15 shows a functional model of an ATM TP.
Figure 15B:
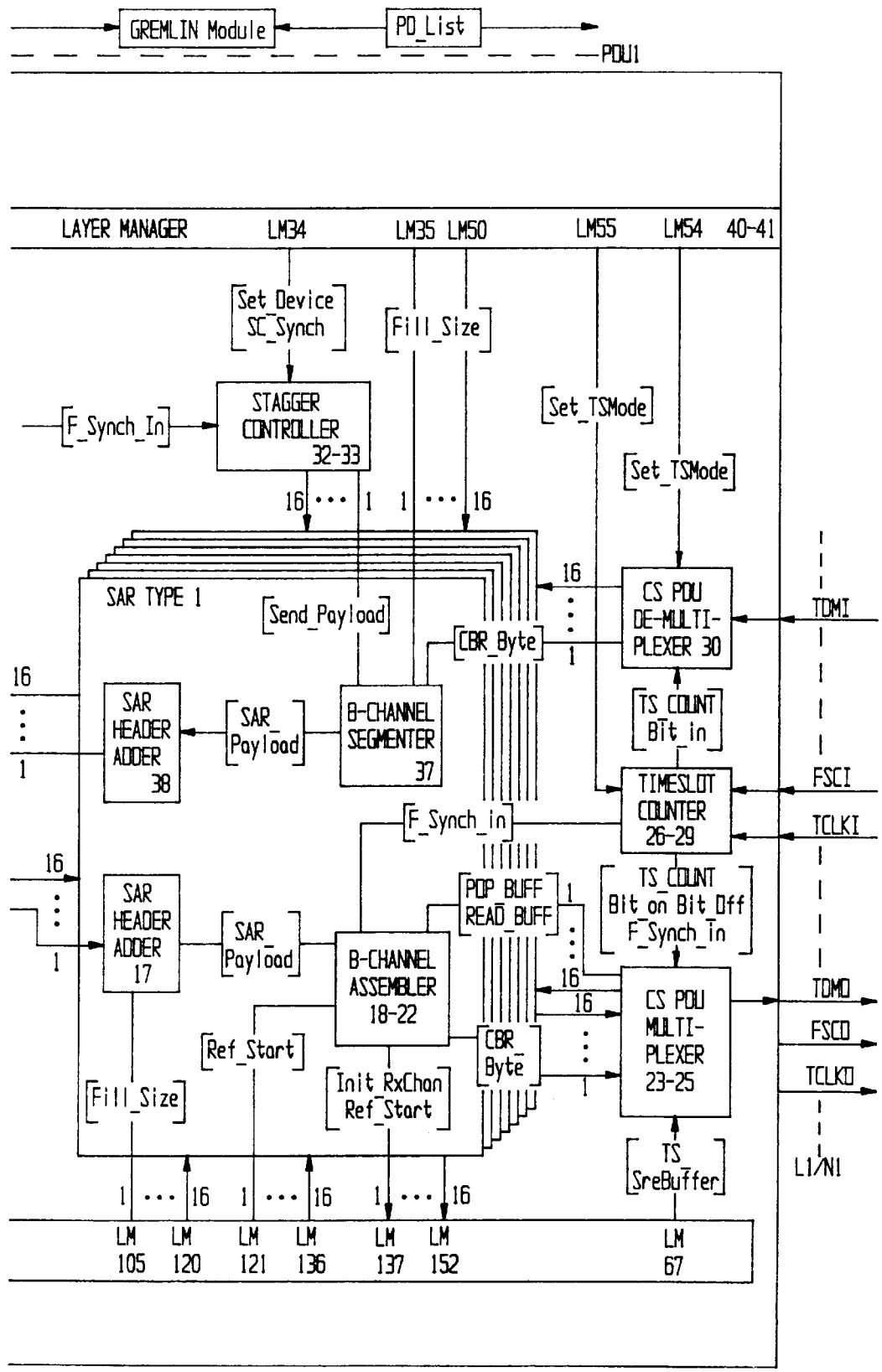

The following subsections describe the primary functions of each component shown on the functional model of the ATM-TP (see FIG. 15). The format of the descriptions for each component consists of a functional summary in text, followed by an explanation of the output signals generated by each block.

3.2. ATM Cell Receiver Input

This component is responsible for the following functions:

a) Cell Reception. The orderly reception of all cells (i.e. both active and idle cells) from the ATM backbone and the transfer of these cells to the Load Sharing Protocol and ATM Cell header Extractor components.
b) Checking of cell headers for corruption by computing the HEC and possibly checking the length of the SOC pulse. and marking any active cells found to have corrupted headers as inactive. Whenever a corrupted cell is detected a Hdr_Alarm message is generated.

3.2.1. Input From The ATM Backbone

The information received on the DATRXI inputs consists of a continuous stream of ATM cells structured in the format described in the section entitled Logical Cell Structure Definition.

3.2.2. Output To The Layer Manager

The Hdr_Alarm signal marks the occurrence of the detection of a corrupted cell header.

3.2.3. Output To The Load Sharing Protocol

All received ATM cells are forwarded to the Load Sharing Protocol.

3.2.4. Output To The ATM Cell Header Extractor

All received ATM cells are forwarded to the ATM Cell Header Extractor.

3.3. NON-CBR Load Sharing Protocol Component

The function of the NON-CBR LSP component is described in detail in the section entitled Request Protocol Description—Request Bit Protocol. Primarily, it provides bandwidth sharing on the ATM backbone by controlling the output of local signalling cells (i.e. Ctrl_Cells) onto the backbone. The built-in priority mechanism guarantees bandwidth for CBR traffic sources when bandwidth demand of both CBR and Non-CBR traffic sources exceeds the maximum bandwidth of the ATM backbone.

3.3.1. Ouptut to CBR Load Sharing Protocol

All ATM cells received from the ATM Cell Receiver Input component are output to the CBR LSP component, however the Req_pri field of the cell header may be modified depending on whether there are local signalling cells (i.e. Ctrl_Cells) awaiting transmission.

3.3.2. Ouptut to the Backbone

All ATM cells from the CBR LSP component are output to the RP Interface DATTXO outputs unchanged, except for the case where the NON-CBR LSP has requested and is awaitng an idle cell, in which case the idle cell is consumed and replaced by a local Ctrl_Cell.

3.4. CBR Load Sharing Protocol Component

The function of the CBR LSP component is described in detail in the section entitled Request Protocol Description—Request Bit Protocol. Primarily, it provides bandwidth sharing on the ATM backbone by controlling the output of local CBR cells onto the backbone. The built-in priority mechanism guarantees bandwidth for CBR traffic sources when bandwidth demand of both CBR and NON-CBR traffic sources exceeds the maximum bandwidth of the ATM backbone. From a system point of view the CBR LSP components ensure small cell delay variation for CBR services leading to smaller receive buffer queue sizes.

3.4.1. Ouptut to ATM Cell Receiver Output

All ATM cells received from the NON-CBR Load Sharing Protocol are forwarded to this component, however the Req_pri field of the cell header may be modified depending on whether there are local CBR cells awaiting transmission.

3.4.2. Ouptut to NON-CBR Load Sharing Protocol

All ATM cells from the ATM Cell Transmitter Input component are output to the NON-CBR LSP component unchanged except for the case where the CBR LSP has requested and is awaitng an idle cell, in which case the idle cell is consumed and replaced by a local CBR_Cell.

3.5. ATM Cell Receiver Output

The function of this component is to recompute and replace the header checksum (HEC) into the header of each cell and output to the ATM backbone all ATM cells received from the CBR Load Sharing Protocol component.

3.6. ATM Cell Header Extractor

For each active cell that it receives, the ATM Cell Header Extractor makes a copy of all the fields comprising the cell Header and forwards the header to the Payload Destination Controller component. Concurrently, it forwards the entire ATM cell to the Payload Distributor component.

3.6.1. Output to Payload Distributor

The received ATM cell is forwarded to the Payload Distributor.

3.6.2. Output to Payload Destination Controller

A five byte ATM cell Header is copied sent to the Payload Destination Controller.

3.7. Payload Destination Controller

All ATM cells belonging to a particular virtual channel contain a collection of field values within their Header which form a unique identifier. Part of this identifier is termed the FP_VPI.FP_VCI[1] and is the value used by the Payload Destination Controller (PDC) to command the Payload Distributor to either intercept or discard a cell.

This is the concatenation of the FP_VPI and FP_fields described in the ATM-TP Cell Definition document [2]

The PDC maintains a list (of 18) entries in a table called the Cell Address Table where each entry (referred to by its Index value) comprises a FP_VPI.FP_VCI value of a desired virtual channel and an associated Buff_Id value which identifies one of the 17 cell receiver buffers (i.e. 16 CBR buffers and 1 Control Channel buffer) internal to the ATM-TP into which the cell payload (or in the case of the Control Channel Buffer the entire cell) is to be loaded.

For each received cell whose FP_VPI.FP_VCI matches one of the FP_VPI.FP_VCI values in the list, the PDC outputs the corresponding Buffer_Id value to the Payload Distributor. Unmatched header address fields cause the PDC to generate a buffer identifier which results in the cell being discarded by the Payload Distributor.

3.7.1. Output to the Payload Distributor

The Buff_Addr signal carries the Buff_id value which identifies one of the 16 CBR buffers or the Control Channel Buffer. In the case where an ATM cell needs to be discarded it provides a default value indicating a null or dummy buffer.

3.7.2. Input from the Layer Manager

The Dist_Buff signal carries an entry of the Cell Address Table referred to above.

3.8. Payload Distributor

The primary role of the Payload Distributor (PD) is to route each cell it receives to one of the 17 recieve buffers or to discard it. Its action is dependent on the value of the Buffer_Id parameter generated by the Payload Destination Controller and consists of the following:

a) Saving CBR Payloads. In the case where the Buffer_Id value identifies one of the 16 receive buffers for CBR traffic the PD removes the ATM Cell Header and forwards the remaining 48 byte cell payload (i.e. CBR_Payload) to the selected CBR buffer.

b) Saving Control Cells. Where the Buffer_Id value identifies the Control Channel Buffer, the PD forwards the entire 53 byte ATM cell (i.e. Ctrl_Cell) to the Control Channel Buffer without removing the ATM Cell Header.

c) Discarding Cells. ATM Cells are discarded whenever the Buffer_Id value identifes the dummy buffer.

3.8.1. Output to SAR Type-1

CBR_Payloads are sent to the SAR type-1 components.

3.8.2. Output to Layer Manager

Ctrl_Cells associated with signalling are forwarded to the Layer Manager.

3.8.4. SAR Type-1 PDU Header Extractor

This component strips off the 1 byte SAR Type-1 header field (as defined in CCITT Rec. I..363, §2.3.1.2) from the CBR payload as well as any padding. The header contains Sequence Number and Sequence Number Protection fields and the need to process these (i.e. for CBR cell loss recovery procedures) is For Further Study (FFS).

3.8.5. Output to the B-Channel Assembler

A SAR-PDU-Payload (=SAR Type-1 PDU payload) consisting of either 16 or 47 bytes (depending on Fill_Size) of CBR information is output to the B-Channel Assembler component.

3.9. B-Channel Assembler

The main functions are:
a) Assembly of SAR Type-1 PDU payloads (which may be 47 bytes or 16 bytes long depending on the cell Fill_Size) into a single 64 Kbps CBR stream.
b) Buffering for cell latency.
c) Perform functions which ensure that there is something to transmit out to the L1/N1 interface in the case where the receive buffer underflows. For late cell arrivals, this may mean the injection of dummy payloads into the respective receive buffer and discarding the late payload on arrival.
d) As a reference channel of an aggregated group of channels, issue the necessary timing signals to the slave channels of the aggregation (which may reside locally or on a remote ATM-TP device) in order to synchronise reception of cells.
e) As a slave channel of an aggregated group of channels, perform a), b) and c) as defined above in synchronisation with the reference channel.

3.9.1. Output to the CS PDU Multiplexer

The CBR_Byte signal is used to transfer the Byte parameter whose value is the byte value at the head of the receive buffer (i.e. the oldest element in the FIFO).

3.9.2. Output to the Layer Manager

The Ref_Start signal is sent to the Layer Manager whenever the B-channel Assembler is configured to be a Reference Channel. Upon receiving the Ref_Start signal, the Layer Manager should repeat this signal to all the remaining B_channel Assemblers of this device and also generate a Ref_Start signal to the REFST circuit in order to activate the remaining slave channels.

3.10. CS PDU Multiplexer

The CS PDU Multiplexer has the ability to insert 8 bit timeslot information (i.e. Byte_Value) into up to 16 of the 32 timeslots of each frame of the TDM output. It directs (if the relevant B-Channel Assembler is enabled) the contents of the buffer in each B-Channel Assembler component to one of the timeslots one byte at a time. The set of timeslots (which 16 of the 32) serviced by the B-Channel Assemblers depends on the TS_Mode value similarly to that in the CS PDU De-Multiplexer.

Timeslot information for a particular timeslot is sourced from a receive buffer belonging to one of the 16 B-Channel Assembler components.

The Multiplexer maintains a table of 16 Enable values (refered to as the TS_Buffer Table in the SDL), one for each B-Channel Assembler. These Enable values determine whether or not information is to be fetched and inserted during the transmission period of the associated timeslot. In the case where insertion is required, the Buff_Id value identifies one of the receive buffers from which timeslot information is then sourced each time the timeslot becomes active. During reset conditions, all 16 Enable values are defined as Disabled so the output dduring the corresponding timeslots will be Tristate.

Each Enable value in the table may be altered during normal operation under software control.

3.10.1. Output to the B-Channel Assembler

The READ_BUFF signal is sent to a B-Channel Assembler to fetch a byte of timeslot information. The B-Channel Assembler returns a copy of the byte at the head of its buffer. This signal may be sent a maximum of 32 times per TDM frame period depending on the values in the mapping table.

The POP_BUFF signal is sent at the start of each new TDM frame to each of the 16 B-Channel Assemblers to pop the byte at the head of their respective buffers. This signal does not fetch timeslot information.

3.11. Timeslot Counter

The primary functions of the Timeslot Counter component are:
a) to generate a signal, at the start of each timeslot period, containing the timeslot number of the incoming TDM stream.
b) to generate a start of frame signal at the start of a new frame on the TDMI input.
c) to generate various bit synchronisation signals allowing the extraction/insertion of timeslot data at the TDM interface.

3.11.1. Output to the CS PDU Multiplexer

See FIG. 15.

3.11.2. Output to the CS PDU DeMultiplexer

See FIG. 15.

3.11.3. Output to the Stagger Controller

See FIG. 15.

3.11.4. Output to the B-Channel Assembler

See FIG. 15.

3.12. CS PDU De-Multiplexer

In order to cater for different modes of operation of the TDM input interface this component operates in one of three selectable modes namely Contig_1, Contig_2 and Spaced. In each mode, timeslot data from 16 of the 32 timeslots of each TDM frame is extracted and forwarded to the 16 B-Channel Segmenter components where it is stored. Predefined timeslot-to-segmenter mapping rules apply to each mode and these are as follows:

Contig_1:
  Timeslots 0 thru 15 are mapped to Segmenters 1 thru 16 respectively.
Contig_2:
  Timeslots 16 thru 31 are mapped to Segmenters 1 thru 16 respectively.
Spaced:
  Timeslots 0,1 are mapped to Segmenters 1 and 2 respectively.
  Timeslots 4,5 are mapped to Segmenters 3 and 4 respectively.

Timeslots 8,9 are mapped to Segmenters 5 and 6 respectively.

Timeslots 12,13 are mapped to Segmenters 7 and 8 respectively.

Timeslots 16,17 are mapped to Segmenters 9 and 10 respectively.

Timeslots 20,21 are mapped to Segmenters 11 and 12 respectively.

Timeslots 24,25 are mapped to Segmenters 13 and 14 respectively.

Timeslots 28,29 are mapped to Segmenters 15 and 16 respectively.

3.12.1. Output to the B-Channel Segmenters

The CBR_Byte signal carries a parameter whose value is the 8 bit timeslot data extracted from the TDM frame. The CS PDU Demultiplexer generates 16 of these messages per TDM frame (i.e. every 125 $\mu$S) one to each B-Channel Segmenter.

3.13. Stagger Controller

This block controls each of the 16 CBR B-Channel Segmenters in two ways. Firstly, it provides a signal to a segmenter to change its segmentation process each time a new cell fill size (fill_size may be 16 or 47 bytes) is allocated for the segmenter. Secondly, it issues periodic signals to each B-Channel Segmenter causing them to generate SAR-PDU payloads with the correct amount of fill. These actions result in a "smooth" (i.e. segmenters allocated the same cell fill_size do not simultaneously generate ATM payloads) stream of ATM payloads to flow from each of the SAR Header Adders towards the ATM CBR Cell Header Adders ensuring low backbone access and hence low Cell Delay Variation for the system.

Note: When it is required to change the Fill_Size of segmentation for any channel, that channel (i.e. the corresponding ATM CBR Cell Header adder should be disabled) before the change.

When 2 ATM-TP's are used for coverage of up to 32 timeslots on the L1/N1 interface there is a requirement that the FrNumMod47 counters in the two devices are in the appropriate phases with respect to each other. To achieve this. the First device acts as a master and sends a synchronisation message to the Second device, whereupon the First device's FrNumMod47 counter is set to zero and the Second device's FrNumMod47 counter is set to 46. This creates an effective 1 TDM frame delay of the stagger pattern of the Second device with respect to the First device. The mechanism whereby this is achieved is by delaying (i.e. while waiting in the SCP_SYNC_OUT and SCP_SYNC_IN states respectively) the startup of the FrNumMod47 counters in both devices until the First device has sent an SC_SYNC message to the Second device which occurs between the receiving of the first and second F_Sync_In messages occurring in the First device.

3.13.1. Output to the B-Channel Segmenters

The segmenters are controlled by the signal Send_Payload which cause it to send a SAR Payload of the appropriate size.

3.13.2. Output to the Layer Manager

An SC_SYNC message is sent from the First device's SCP to the Second device's SCP via the Layer Manager.

3.14. B-Channel Segmenter

This component buffers the incoming CBR stream for a particular B-channel and breaks it into 47 or 16 byte (depending on Fill_Size) SAR PDU payloads and then generates the payload. Its timing is controlled by the Stagger Controller which determines when the Segmenter should send a SAR Payload.

3.14.1. Output to SAR Header Adder

A SAR type 1 PDU payload is generated towards the SAR Header Adder.

3.15. SAR Type-1 Header Adder

This component adds the SAR PDU Header (in this case a dummy byte), and in the case of Fill_Size=16, appends 17 dummy Octets, to form a 48 octet cell payload creating a CBR_Payload which it then forwards to the ATM CBR Cell Header Adder.

3.15.1. Output to the ATM CBR Cell Header Adder

See 3.16 below.

3.16. ATM CBR Cell Header Adder

For each ATM payload received from the associated SAR Header Adder component, this component appends the ATM cell header which is provided by the Layer Manager. Note that Octet 5 (the Header Checksum) is not loaded or generated until the CBR_Cell is processed by the CBR Load Sharing Protocol Component.

3.16.1. Output to CBR Load Sharing Protocol component

A stream of CBR cells.

3.17. Layer Manager Component

This component performs various miscellaneous functions, especially in relation to linking the PDU1 interface to the various other components and is not described here.

High speed Extension Terminal

Figure 39:
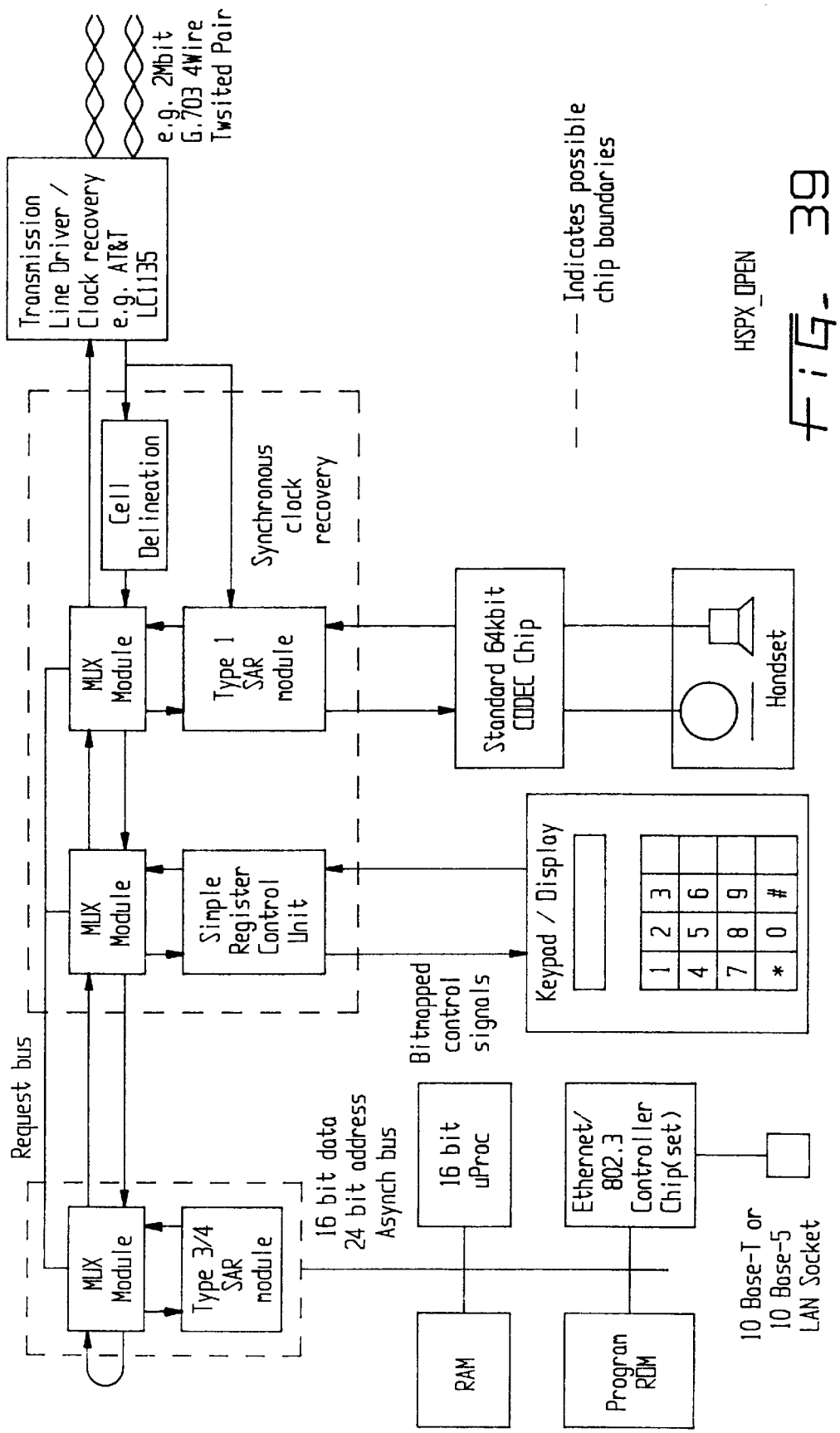
FIG. 39 shows one form of a high speed extension terminal.

FIG. 39 shows the high speed terminal architecture. In FIG. 39, the open chain architecture is shown—all of the transmit sections are connected in a chain connected to the input of the main equipment and all of the receive sections connected to the output. This is the most appropriate configuration for the terminal as all of the traffic generated by the terminal will be sent to the main equipment and so would not have to compete with traffic coming from the main equipment as it would if the transmit and receive sections were mixed as with the 'closed chain' scenario. Only idle cells should be passing around the loopback section of the transmission path.

The transmission line driver and clock recovery functions would be performed by commercially available chips (for example primary rate ISDN or twisted ethernet chips as discussed in the section on the main equipment module could be used). Similarly standard voice codec chips would be used. The larger of the dashed boxes represents the functionality that this terminal has in common with the low speed extension (LSPX) and would conceivably be implemented on one chip. The type 1 (continuous bit rate) SAR functions is considerably less complex than the corresponding type 3/4 module needed for the ethernet port and would thus be easily integrated with other functions on the chip. Synchronous 64 kbits clock recovery could be performed by deriving the clock from the backbone clock rate (which would have to be an integral multiple of 64 kbits).

The clock labelled 'simple register control unit' would consist of a single register storing the state of each function of the telephone handset. Control of every feature (LED's, ringer, LCD, buttons, receiver hook etc.,) of the handset would be centralised in the main processor. Whenever a feature of the station had to change state (e.g. turn on an LED), a signalling cell could be sent to the key station by the CPU and the cell would be latched into the register, each bit of the cell controlling the state of one feature.

Conversely whenever an event occurs in the keystation (key pressed or key released), a cell would be sent to the control processor containing a bit map representing the state of every device on the station.

The performance of this approach requires further study as it is dependent on the ability of the control CPU to respond to all user events (key presses etc.) in real time.

The MUX module on the left-hand side of the figure is identical to that used in the main equipment CPU module and the 'stand alone ethernet interface'. The associated microprocessor and memory is necessary to perform the address translation and buffering of ethernet packets. Also, correct operation of most standard ethernet chipsets presupposes the presence of a 16 bit processor chip. It is suggested that thick or twisted pair ethernet interfaces be supported.

G. Staggering

The mechanism of staggering is, in one form, a mechanism in which all the CBR sources (at least all the sources which are using the same fill factor) at each interface, generate cells at regularly spaced intervals. In addition to this, the adoption of a further mechanism of bit reversal channel numbering ensures that when an interface is only partially equipped (e.g. has only 4 or 8 channel sources but uses a 16 channel interface device), the generation of cells is more optimally spread in the cycle (where cell generation otherwise might be bunched in a manner of 4 or 8 consecutive intervals then 12 or 16, respectively, intervals with no cells transmitted). This further reduces the cell delay variation.

Cell delay variation could also be reduced by increasing the system bandwidth well beyond that which is occupied by the total CBR traffic (and this excess bandwidth may virtually all be used for non-CBR traffic). The use, however, of staggering, partial/mix cells and bit reversal channel numbering has been found to dramatically reduce this requirement.

A preferred embodiment will now be described, with reference to a key communication system adapted to traffic both CBR and non-CBR signals, the subject of co-pending application(s) filed by the present applicant. It is contemplated that the present invention has application in a wide variety of communication systems, adapted to traffic only CBR or non-CBR, or both CBR and non-CBR signals, and should thus not be limited only to the following example.

Even if there is enough bandwidth available on the system backbone for the CBR traffic, it is possible that a CBR transmitter may have to wait some time for an idle slot to become available before it is able to send a cell. CBR sources, by their nature generate periodic sequences of cells, the simplest sequence being where a single cell is generated every period, $t_{pack}$. (In the following discussion, we will refer to the period $t_{pack}$ as the 'metaframe' since it will consist of a whole number of 125 µs TDM frames, the whole number being the number of user octets in a cell.) If a number of CBR interfaces or sources are generating periodic sequences of cells, then the access delay will be dependent on the relative phases of these periodic sequences. In the worst case, all of the sources will be in phase and will all generate a cell at the same instant. One of the sources will have to wait for all of the others to access the backbone before it will be able to do so. In the best case, instead of all the sources generating cells simultaneously, they will generate cells sequentially so that there is always a backbone timeslot immediately available for every cell generated.

The two cases are illustrated in FIG. 16, which shows graphs of the total number of cells attempting to access a backbone for different phase relationships between sources. Every time a CBR transmitter generates a cell the graph steps up by one unit and every time a cell passes along the backbone, the graph steps down by one. Notice that the graph shape is determined by the relative phases of the periodic arrival patterns and is periodic with period equal to $t_{pack}$, (e.g. it repeats every metaframe) if all the sources have the same period. If the sources have different periods, then the period of the graph would be the lowest common multiple of the different periods. A third case is shown the bottom graph of figures, where the source are at random phase with respect to each other. The numbers above the graph represent the number of cells generated at various instants.

If the global access to the backbone was on a first-come-first-served (FIFO) basis, then the maximum height of the graph would be directly proportional to the maximum access delay. This is because the maximum height of the graph would represent the maximum depth of the conceptual FIFO queue. If, as is actually the case, there is no FIFO access, the worst case access delay is actually the length of the longest busy (non idle) period. This is because a cell could conceivably be generated at the beginning of a busy period and not be served until the end of that period, even though some of the cells that were served during that busy period were generated after the first cell. Therefore, without FIFO access, there is no guarantee that a cell has been sent until the idle period on the backbone occurs.

Below, we propose to discuss access delay with reference to a number of embodiments.

Staggering

The present invention utilizes staggering to provide sources on a backbone that are not all in phase with each other by forcing a fixed phase difference between different sources. Each source coupled to the system can be thought of as a group of n segmenters (n=1,2,3 . . . ), each generating cells once every packetisation delay, $t_{pack}$. Those n segmenters could be expected to have a fixed phase relationship because they would share a common local synchronisation scheme. It is also conceivable that the source device(s) on a backbone might have a fixed phase relationship, however this would require additional signals to ensure that the device(s) are synchronised. A local staggering scheme would involve ensuring that the n segmenters on a chip generate their cells at evenly distributed points within the metaframe. A global staggering scheme would involve ensuring that all of the segmenters across the system generate cells at evenly distributed points within the metaframe.

Figure 17:
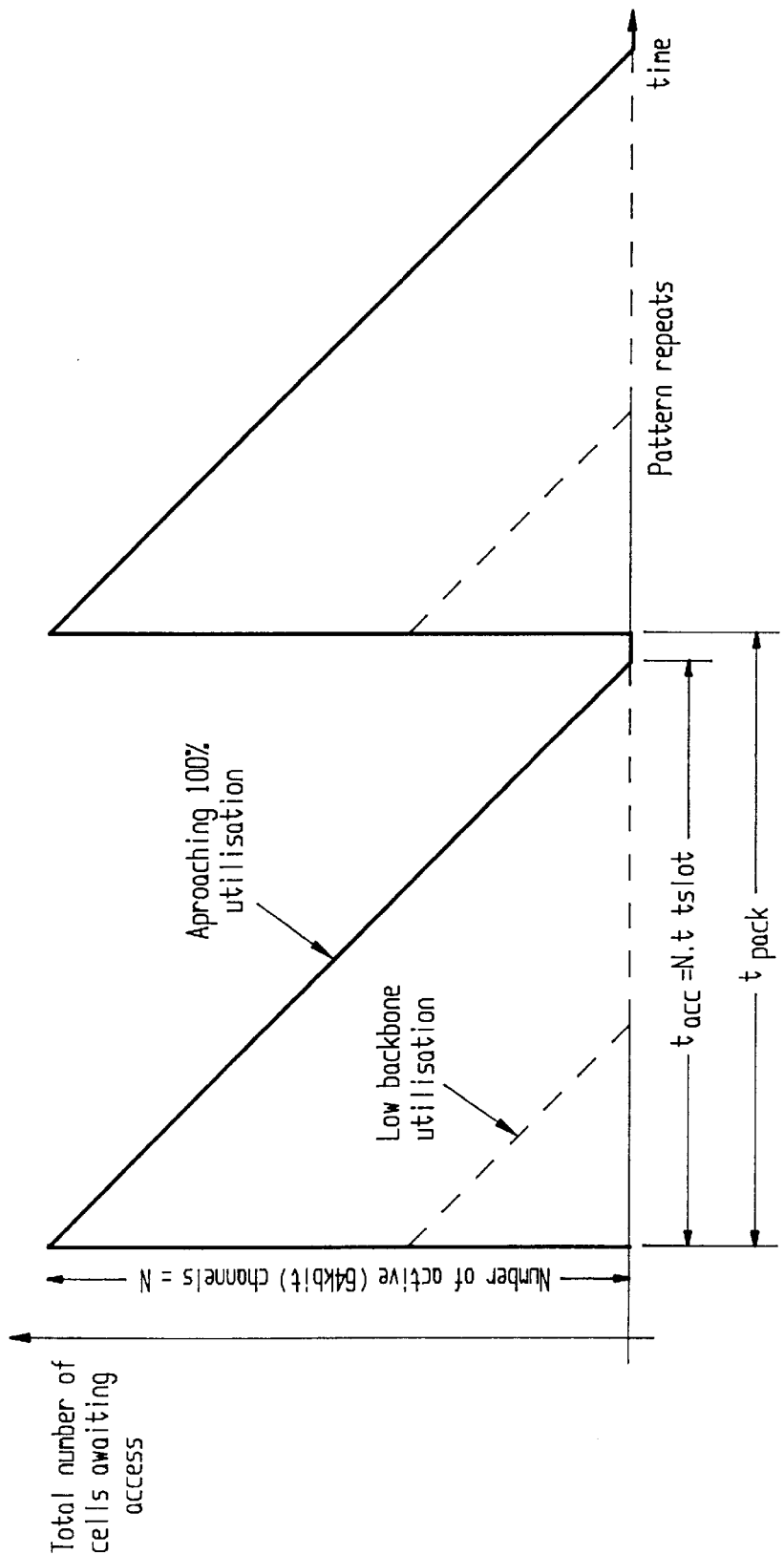
FIG. 17 shows a worst case, no staggering for active channels.
Figure 18:
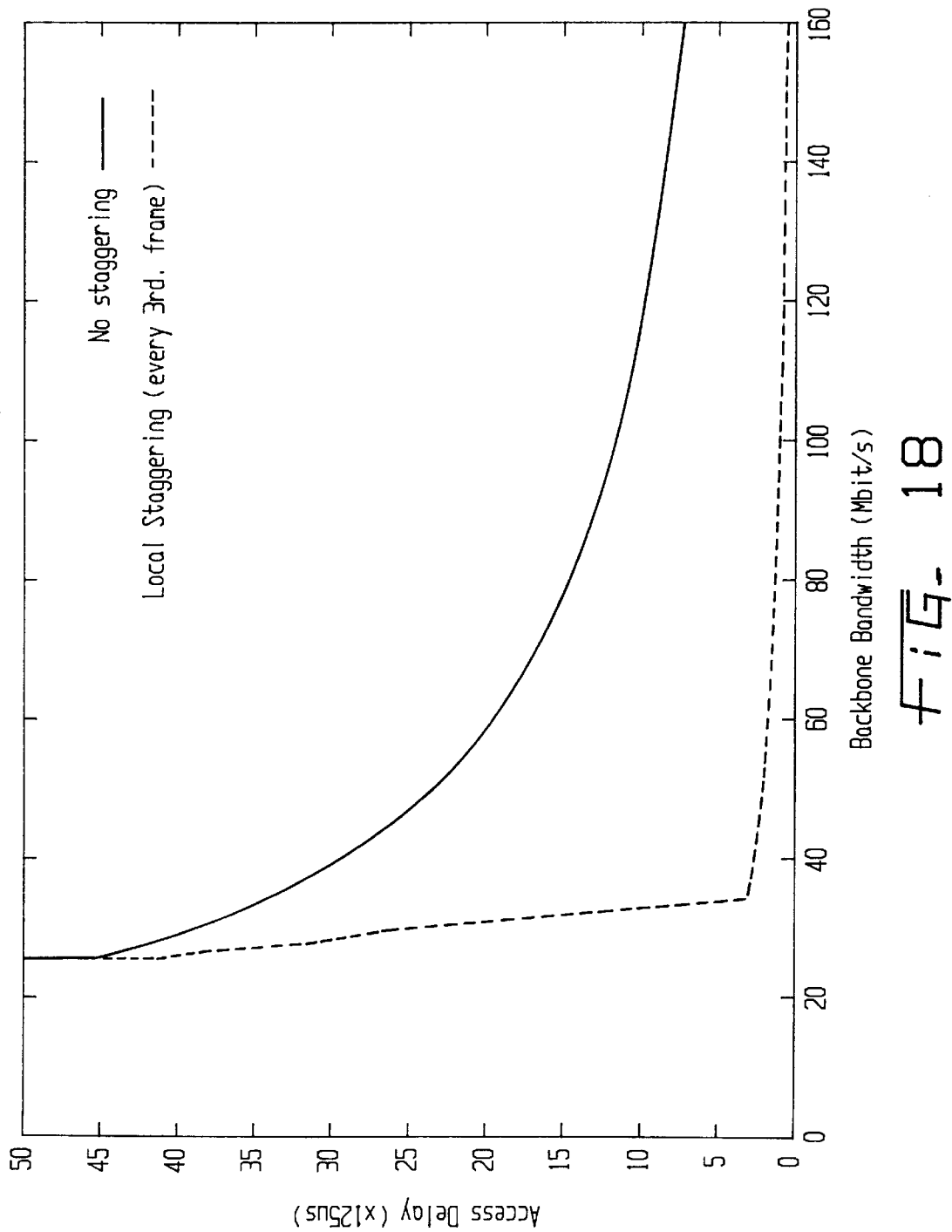
FIG. 18 shows a simulated staggering scheme compared to a non staggering scheme.

If only local staggering is implemented, then the possibility of the worst case phase relationships between different sources on a backbone must be considered. This is also true when no staggering is implemented, and each device generates a burst of n cells at the beginning of each metaframe. The worst case is where the length of the largest busy period is maximised, and hence the access delay is maximised. Where no staggering is used, this worst case would be when all of the bursts are aligned and the metaframe consists of only one busy period and only one idle period. As the utilisation of the backbone bandwidth approaches 100%, the busy period will approach the full metaframe time and the idle period will approach zero, and hence $t_{acc}$ will approach $t_{pack}$. Note that in the description examples which follow, n is given a value of 16. FIG. 17 shows the non-staggering case for two different backbone utilisations and shows $t_{acc}$ approaching $t_{pack}$ as the utilisation approaches 100%. The size of the (worst case) burst at the beginning of the cycle is equal to the number of 64 kbit/s channels that are active as one cell is generated per channel per metaframe. Hence we can calculate the maximum access delay given the backbone bandwidth, the number of active channels on a backplane and the overhead per cell (due to headers and padding for partially filled cells). Let $T_{tslot}$ be the length of a backbone timeslot, R be the backbone bit rate and $N_{ch}$ be the number of active 64 kbits channels. Then, $$t_{tslot} = 424/R,$$

and $$t_{acc} = N_{ch}.424/R$$

since there are 424 bits in a cell. FIG. 18 shows a plot of calculated access delay values for both this (non staggered) case and one of the other staggering schemes to be discussed below.

Local staggering, as stated before, is where the segmenters in a particular module generate their cells at evenly distributed points in the metaframe. Note that (at least on a single source device) the cell generation times can only fall on certain instants within the metaframe because the segmenters receive octets of information once each 125 µs frame. Since by definition a cell is generated once the last octet of data has been collected in the buffer, the cell generation times must fall on one of the octet arrival times. The number of arrival times in a metaframe is equal to the number of information-carrying octets of the cell, $L_{cell}$, since the metaframe length=$L_{cell} \times (125 \mu s)$.

The upper diagram in FIG. 4 shows a local staggering scheme where each source device generates cells at times within the metaframe separated by 3 TDM frames. The arrows represent the arrival times of cells from each of the segmenters in the device. Notice that since there are 47 TDM frames in a metaframe and this is not a multiple of 3, the spacing at the end of the metaframe is only 2 frames. This discontinuity represents a slight increase in the instantaneous arrival rate at that point, and causes a maximum in the graph of cells waiting, though not as severe as when all cells are generated at the beginning of the metaframe as in the non-staggered case.

Figure 19:
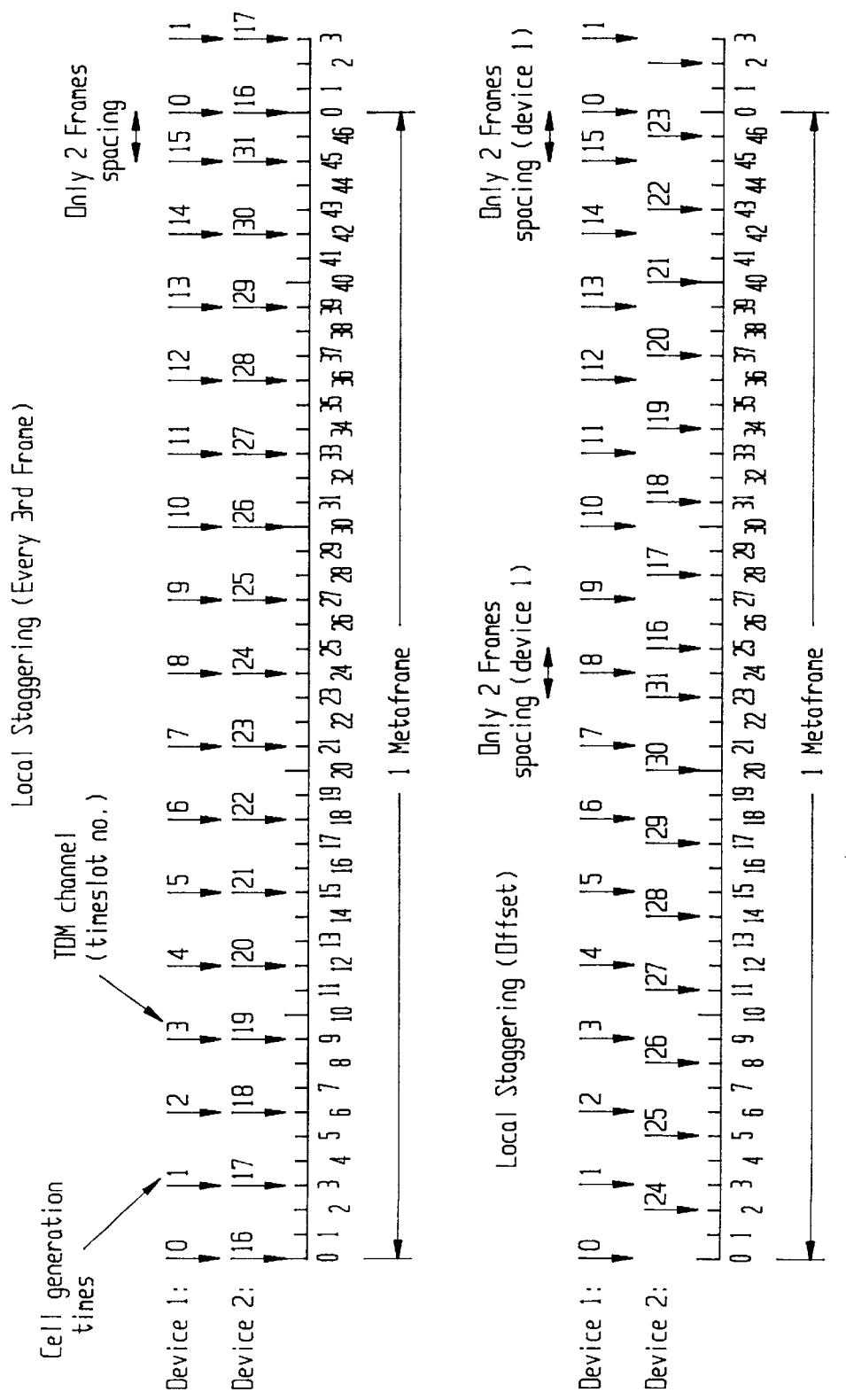
FIG. 19 shows two alternative local staggering schemes.

Cells arriving from two devices are shown to illustrate the fact that two devices can be paired so that they interface to a single 32 channel TDM highway in the system. In this case the devices may be expected to have a fixed phase relationship because they are effectively behaving as one device. The optimal relationship for these two devices is shown in the lower half of the FIG. 19. Here the discontinuities mentioned in the previous paragraph for the two devices are separated as much as possible across the metaframe in order to allow the system to recover from them as much as possible before the next one.

The phase separation between the devices is thus as close as possible to half a metaframe without allowing cells from the two devices to arrive simultaneously, namely 25 frames.

Figure 20:
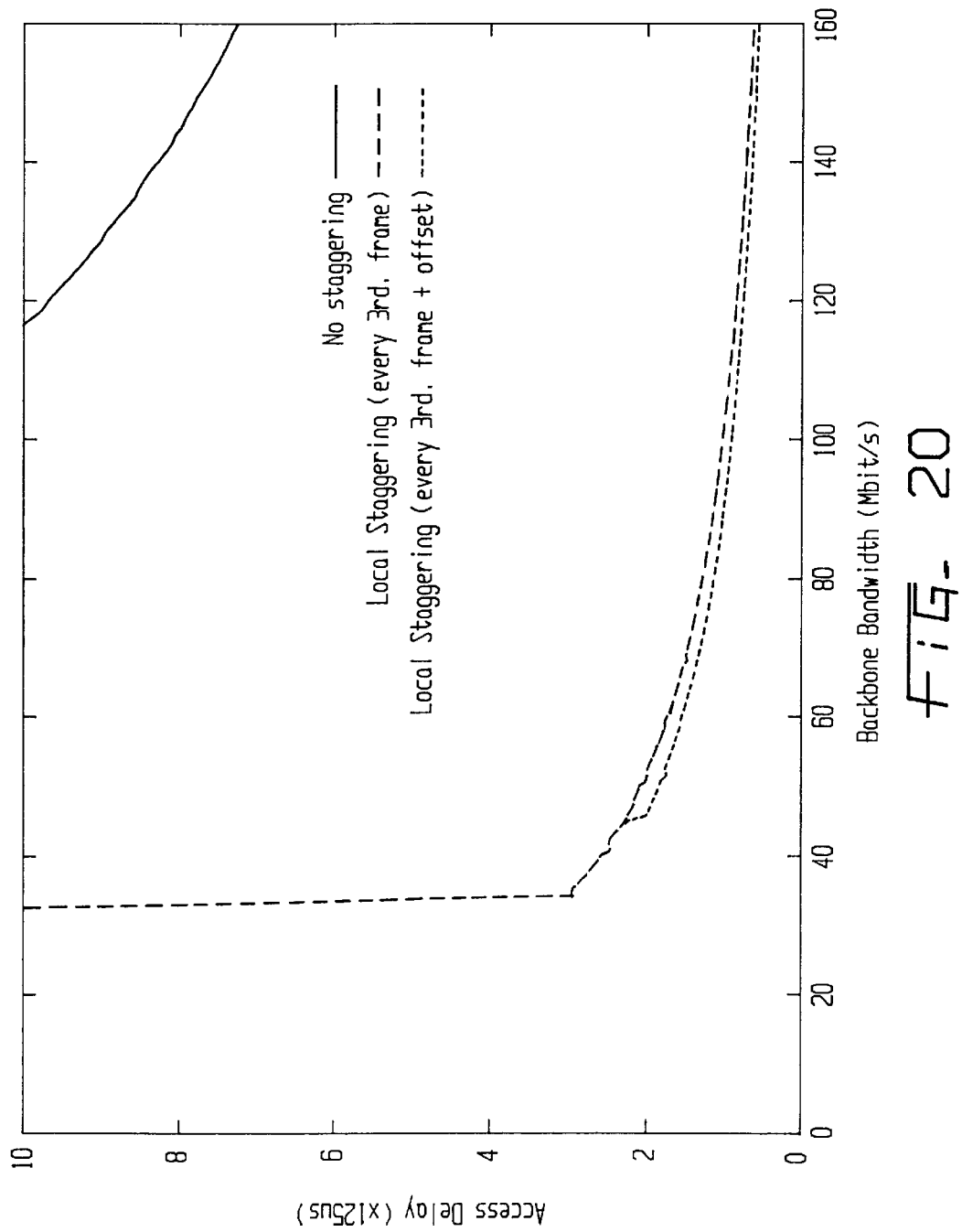
FIG. 20 shows performance comparison of the staggering of FIG. 19.

The access delay performance of the first scheme is plotted in FIG. 18 in order to compare it with the non-staggered situation. These access delays were calculated by evaluating the function plotted in FIGS. 18 and 19 for a typical fully loaded system and measuring the maximum busy period for different backbone bit rates. The 'fully loaded system' is summarised in table 2. In this table, where the number of channels per module is greater than 16, this implies that the module is actually a pair of modules linked to the same 32 channel TDM highway as is the case of primary rate ISDN cards. FIG. 20 compares the two staggered cases (with and without the 25 frame offset) on a different scale to reveal that in this fully loaded configuration, there is only a small advantage in having the offset even though nearly one third of the backbone traffic arises from Primary rate ISDN modules which are paired in the manner described. However, if the system is configured so that most of the CBR sources were coupled via interfaces, each servicing 32 sources, then the implementation of an offset would result in some advantage.

Bit Reversal Channel Numbering

In the staggering schemes above, when an source module only uses a small number of the available channels these have been assumed to be numbered consecutively from channel 0 (e.g. the PSTN card only uses channels 0–8). This means that the phases of these channels are not spread as evenly across the metaframe as they could be. In fact they are separated by only 3 TDM frames when they could be separated by a greater amount since there is less than 16 channels. If the channel numbers were not allocated consecutively, then a better spread could be found. For example, if only two channels are required, then channels 0 and 7 could be chosen instead of 0 and 1.

Unfortunately, the choice of channel number is probably forced by hardware considerations since this is often the default when TDM devices use a daisy-chained frame sync. line. A solution to this problem is proposed in the form of re-numbering the 16 positions in the metaframe such that if the channel numbers are successively allocated, the phases are still reasonably well separated. This could be achieved most easily by representing the channel number as a binary number from 0000 (0) to 1111 (15) and reversing the order of the bits to generate a new binary number which is used to select the appropriate position in the meta frame. Thus 0001 (1 dec.) becomes 1000 (8 dec.) and 0010 (2) becomes 0100 (4). The resulting sequence of numbers is (in decimal):

| 0 | 8 | 4 | 12 | 3  | 10 | 6  | 1 |    |
|---|---|---|----|----|----|----|---|----|
| 4 | 1 | 9 | 5  | 13 | 3  | 11 | 7 | 15 |

If (for example) channels 0–7 are allocated, the phases would be separated as follows:

| 0 | • | 4 | • | 2 | • | 6 | • | 1 | • | 5 | • |
|---|---|---|---|---|---|---|---|---|---|---|---|
| 3 | • | 7 | • |   |   |   |   |   |   |   |   |

Figure 21:
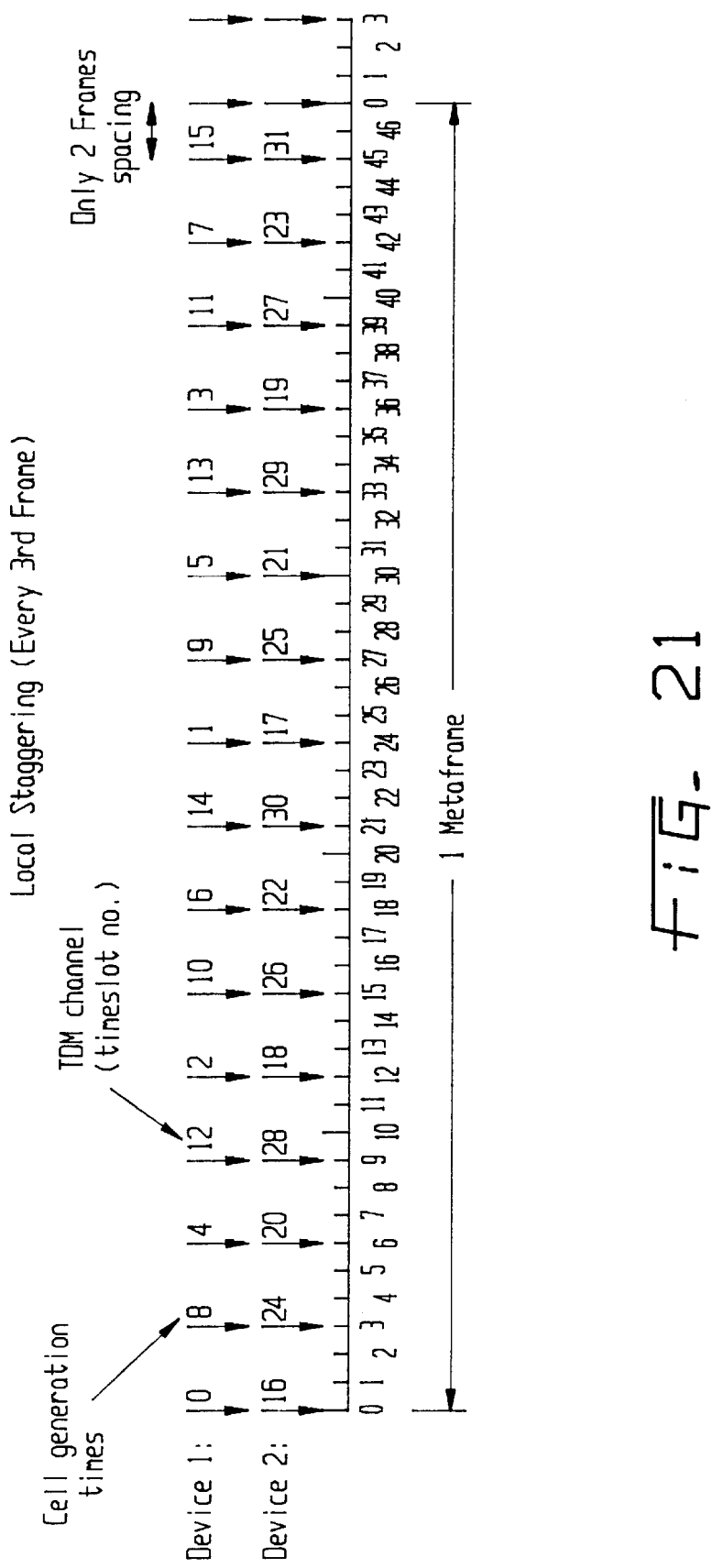
FIG. 21 shows the renumbering of staggering positions according to bit-reversal.

Notice that the spaces between the already allocated numbers are successively divided in half as new numbers are added in between. FIG. 21 shows this numbering scheme applied to the non-offset staggering scheme.

Figure 22:
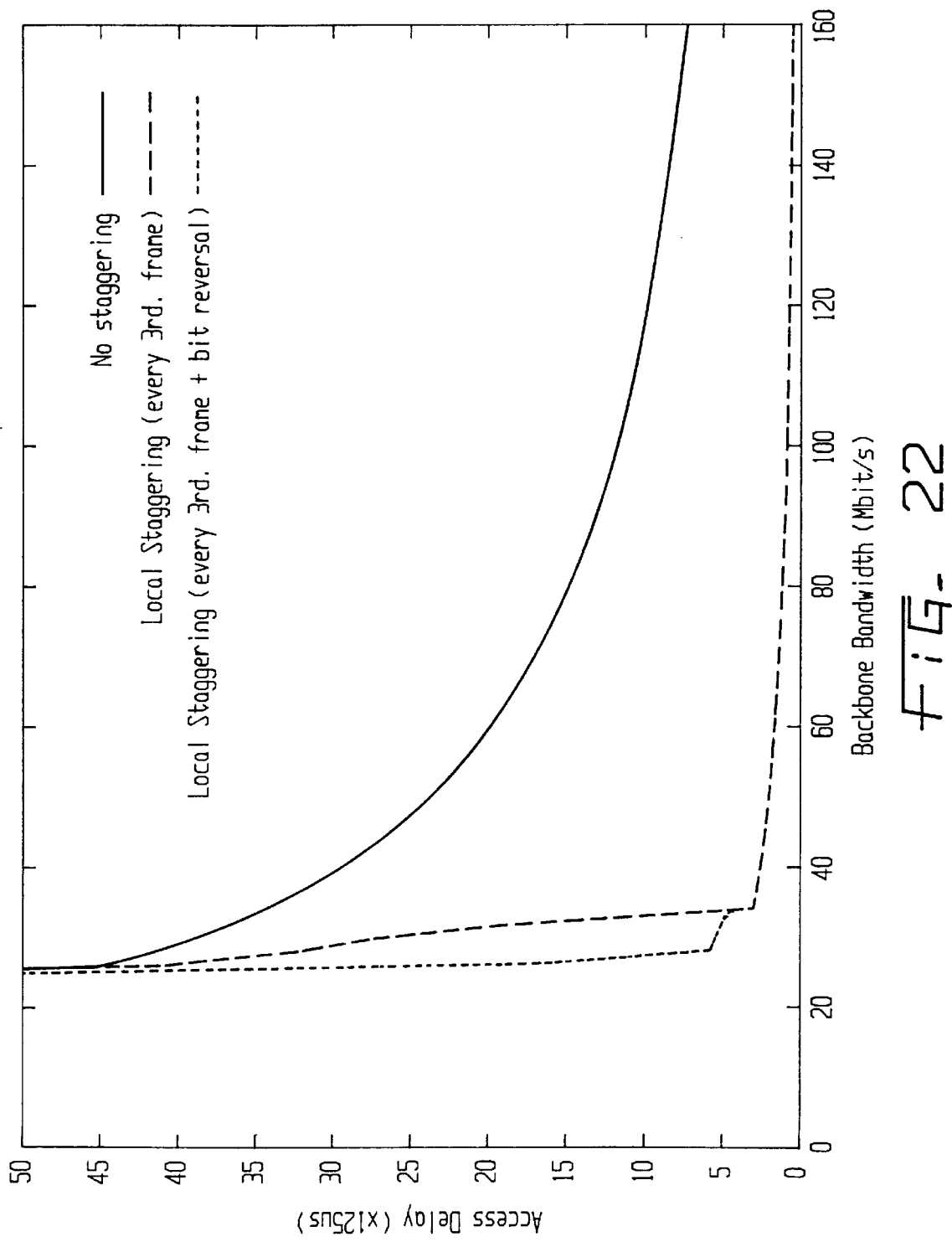
FIG. 22 shows the performance of bit-reversal.

The performance of the bit reversal scheme is plotted in FIG. 22 which shows that considerable improvement is achievable in the heavily loaded region to the left of the plot. Little improvement is achieved in the lightly loaded case (high backbone bandwidths) because then the system has enough remaining bandwidth to transmit all queued bursts of cells before the next burst, even when they are closer together in non-bit reversed case. When bursts start to merge together, the advantage of having bit reversal and the channels further separated does have greater effect.

Partially Filled Cells

In the above discussion, the cell fill value has been assumed to be 47 octets (i.e. full cells). This results in a 47×(125 μs) metaframe period. In order to reduce packetisation delay from approximately 6 ms to 2 ms, it is proposed to allow connections in the system which use partially filled cells which only carry 16 octets. This results in a 16×(125 μs) metaframe period as well as increasing the backbone bandwidth required by these connections by a factor of approximately 3. The staggering pattern for 16 channel ATM-TDM modules using the 16 possible positions in this metaframe is shown in FIG. 23.

Figure 24:
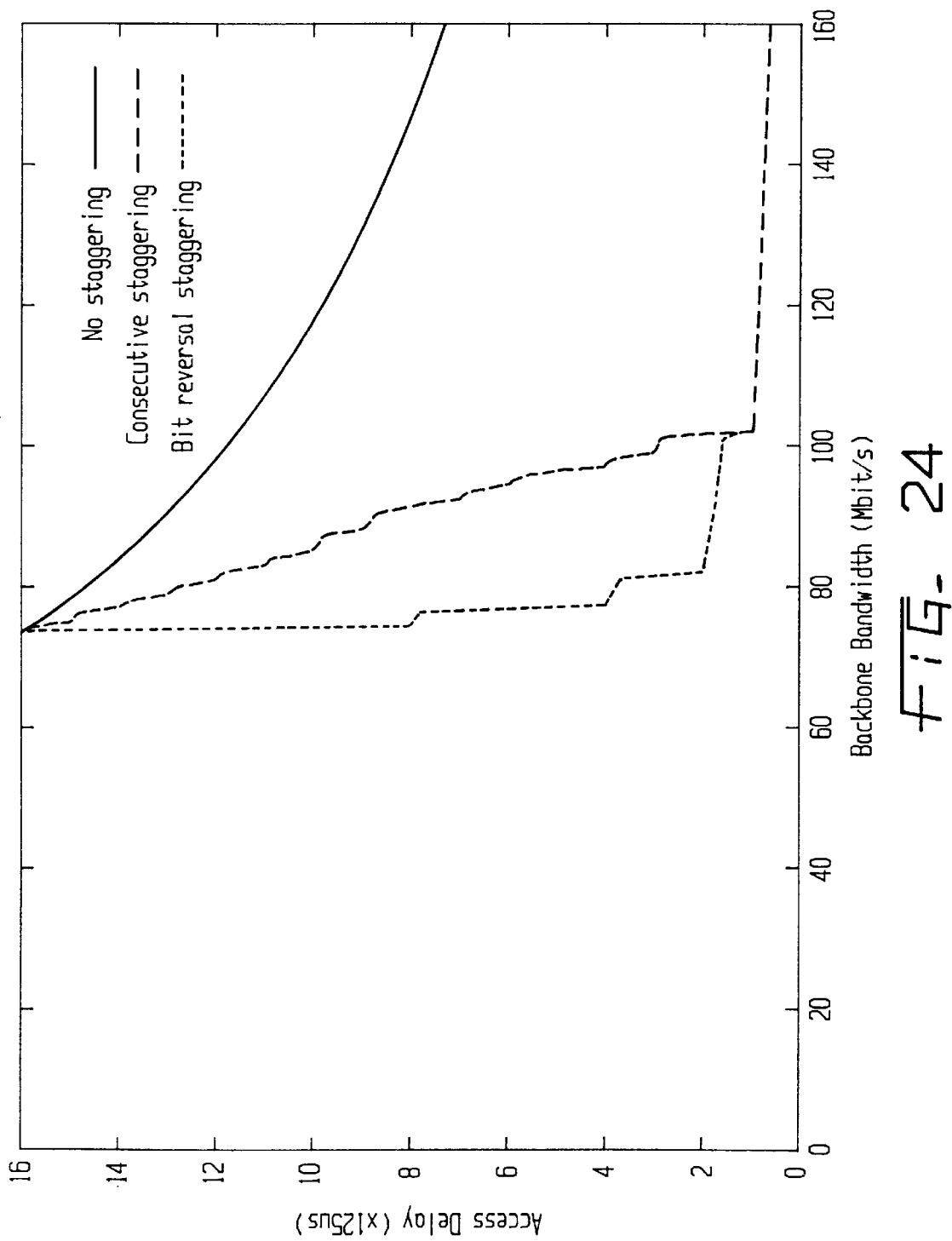
FIG. 24 shows the performance of partially filled staggering.

The performance of these partially filled staggering schemes is plotted in FIG. 24. Notice that the partially filled approach requires at least 3 times the backbone bandwidth before reasonable access delays are obtained but that the delays are less than 16 frames (the metaframe period) once the minimum bandwidth has been satisfied. This coupled with the reduced packetisation delay considerably reduces the overall delay of the system.

Mixed Partially Filled_Full Cells

We have so far considered the cases where the information field contains either 16 or 47 octets (i.e. partially filled and full cells). We have noted that the access delay variation for partially filled cells can be made equal to or less than that for full cells provided that the backbone bandwidth is approximately 3 times that for full cells. Only certain long distance voice calls would need to have the packetisation delay reduced by partially filling cells. In one form, it would appear that the bandwidth could be more efficiently used by using partially filled cells only for those calls. We consider here worst-case the performance of a system employing a mixture of 16 and 47 octet cells.

Figure 25:
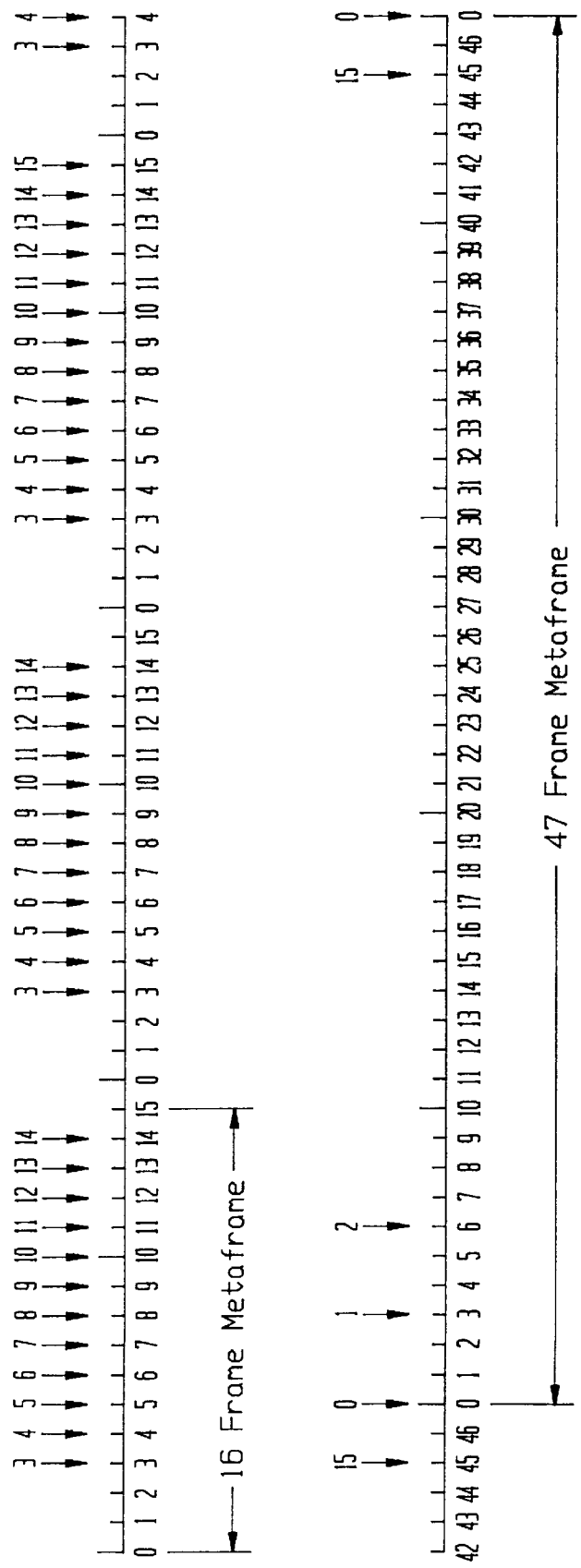
FIG. 25 shows a worst case mixed partially filled/filled staggering.

Mixing two cell fill values gives rise to two metaframes of different lengths, one 16 TDM frames long and another 47 frames long. Since 3 of the 16 frame metaframes is one frame longer than the 47 frame metaframe, during the length of a call, the 16 frame metaframes will phase slip with respect to the 47 frame ones and hence every relative phase will have occurred after 47 of the larger metaframes has passed. Therefore it is unlikely to ensure a favourable phase relationship between two segmenters using 16 and 47 octet cells and the worst case phase relationship must be considered, even when the segmenters are in the same source module. A worst case situation would be where those channels using the 16 frame metaframe are grouped together and the remaining channels are grouped together in the 47 byte metaframe around frames 45 and 0 (which are closer together than the other points in the 47 frame metaframe). This would result in the maximum burst of cell arrivals and hence the longest busy period. FIG. 25 shows the worst case described above in a module with 16 channels active. In modules with less than 16 channels active, a similar process is used to determine the worst case except that the worst case separation in the staggering pattern is 3 frames instead of 2 since channel 15 is assumed not to be active.

Figure 26:
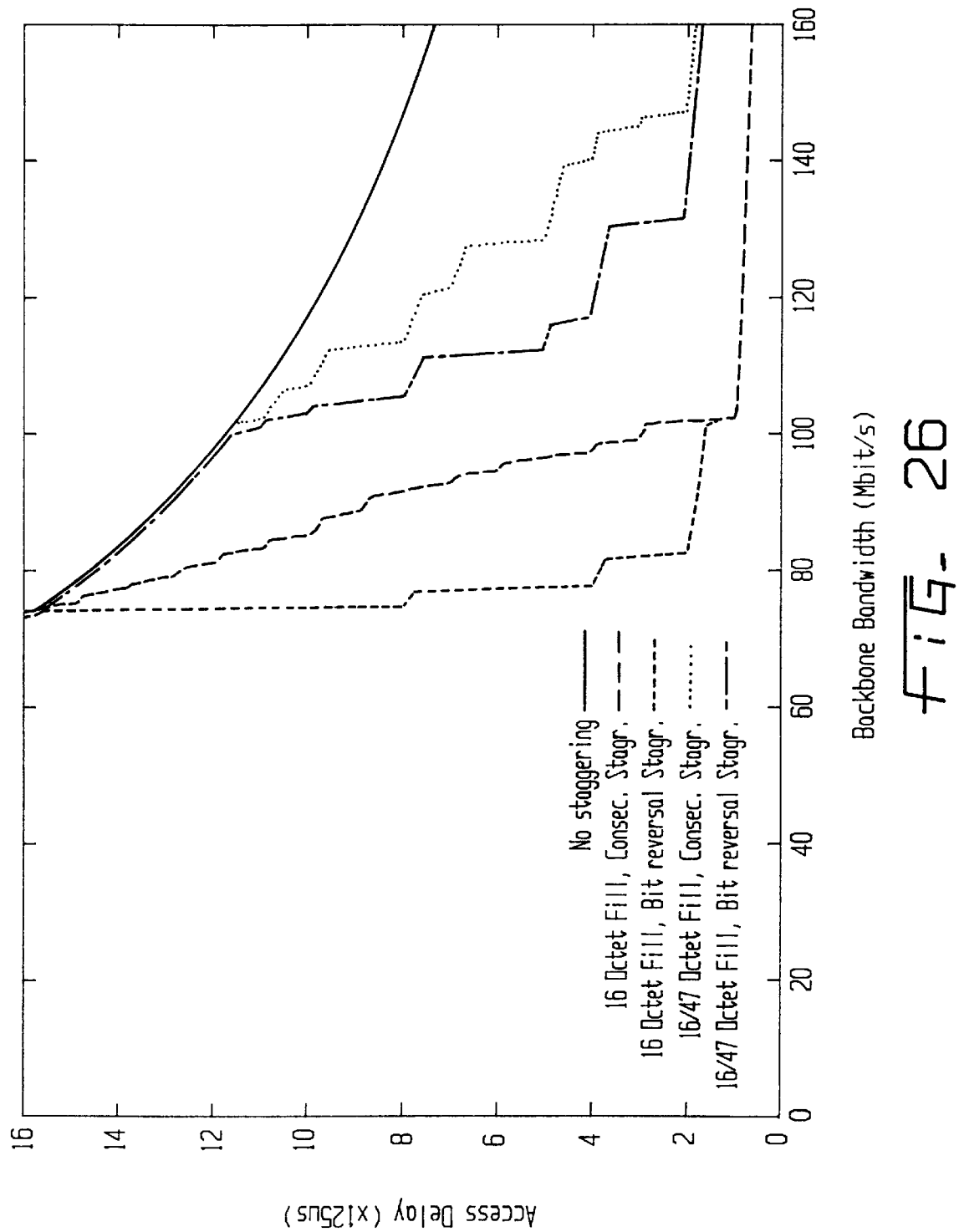
FIG. 26 shows a comparison of mixed 16/32. vs. 16 octet cells.

The performance of the above worst case mix of traffic is plotted in FIG. 26 for both consecutive and bit reversal channel numbering. As can be seen better performance can be obtained when only 16 octet cells are employed. This implies that where a large percentage of the traffic consists of partially filled cells, it is preferable to use partially filled cells for all channels. (Where 87 channels are using full cells and 258 are using partially filled cells, so 258/345=75% of the input traffic consists of partially filled traffic). In situations where only a small number of channels are using partially filled cells, it may be preferable to use a mix, however.

The performance of the differing staggering schemes can be summarised by quoting the backbone bandwidth required to ensure access delay variation is less than 1 ms given the offered load of a fully configured system as described in table 2. The total offered traffic is 345×64 kbit/s=22 Mbit/s. Given the header overhead of 53/47, this translates to 24 Mbit/s. For partial filled cells with an overhead of 53/16 it corresponds to 73 Mbit/s. Note that 1 ms may be too great in the presence of a 'switch' which may contribute an additional component of cell delay variation as well and so that the access delay variation would need to be decreased by reducing the load on each switch port.

TABLE 2

| Cell Size | Staggering Method | Bandwidth required | Reference |
|---|---|---|---|
| 47 Octets | No Staggering | 145 Mbit/s | FIG. 20 |
| 47 Octets | Every 3rd. Frame | 35 Mbit/s | FIG. 22 |
| 47 Octets | Every 3rd. Frame + Offset | 35 Mbit/s | FIG. 22 |
| 47 Octets | Every 3rd. Frame + Bit reversal | 28 Mbit/s | FIG. 24 |
| 16 Octets | No Staggenng | 147 Mbit/s | FIG. 26 |
| 16 Octets | Consecutive | 92 Mbit/s | FIG. 26 |
| 16 Octets | Bit reversal | 75 Mbit/s | FIG. 26 |
| 16/47 Mix | Consecutive | 113 Mbit/s | FIG. 26 |
| 16/47 Mix | Bit reversal | 105 Mbit/s | FIG. 26 |

In conclusion, there is considered to be an advantage in using offset staggering as it has a relatively small effect on the access delay and requires additional I/O and control. Also, using bit reversal numbering of the channels, while adding virtually no hardware can reduce the access delay by approximately 20% (depending on the number of modules using less than 16 active channels). Using a combination of channels with 16 and 47 byte cells can in the worst case result in little reduction in access delay as compared to using 16 byte cells only when most of the traffic is using the 16 byte cells. Therefore, the combination is considered most effective in systems where the bulk of devices are using 47 byte cells and a few delay sensitive channels are using 16 byte cells.

H. Channel Aggregation

A preferred embodiment of the present invention will now be described. The example is made with reference to a system as shown in FIG. 4a, for exemplary purposes only. In the system shown, there is provided a n×64 kbits TDM channel, where n=2 to 32, thus allowing 2.048 Mbit/s streams. The present invention nevertheless is adapted to channels of any band width. The streams are preferably CBR, but the invention is found to equally apply to CBR and/or non-CBR signals. The following embodiment is made with reference to CBR services, without meaning to exclude application of the present invention to non-CBR or CBR/non-CBR services.

Channel aggregation in accordance with the present invention provides the ability to carry a group of n×64 kbit/s TDM channels from source to destination as if they were a single n×64 kbit/s channel thus allowing a system or device in which the present invention is implemented for exemplary purposes to carry up to 2.048 Mbit/s CBR streams. The set of n channels (n=2 to 32) referred to as an aggregate group.

Figure 27:
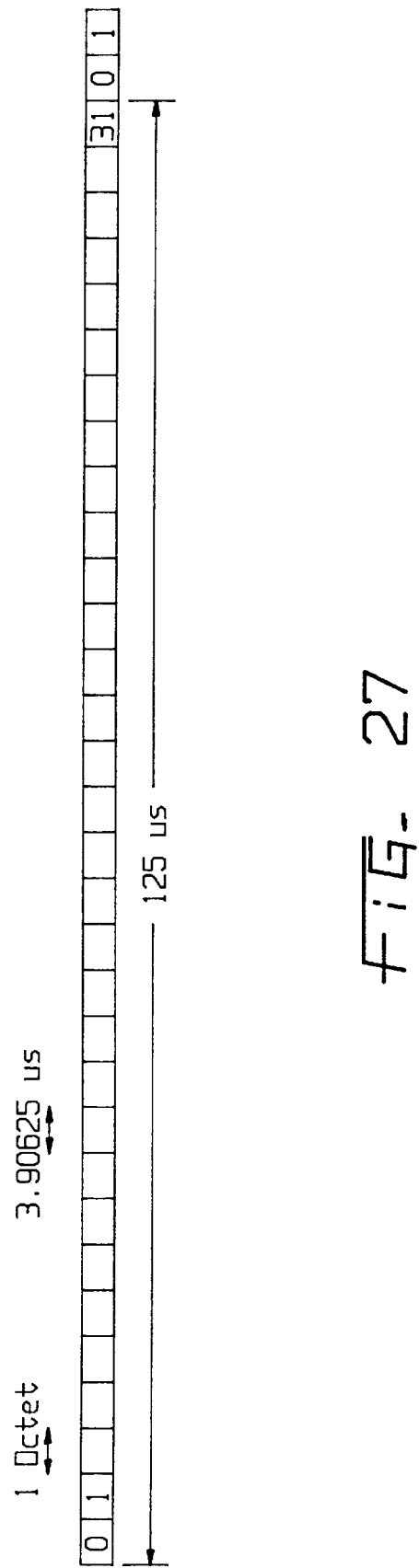
FIG. 27 shows a TDM frame format.
Figure 28:
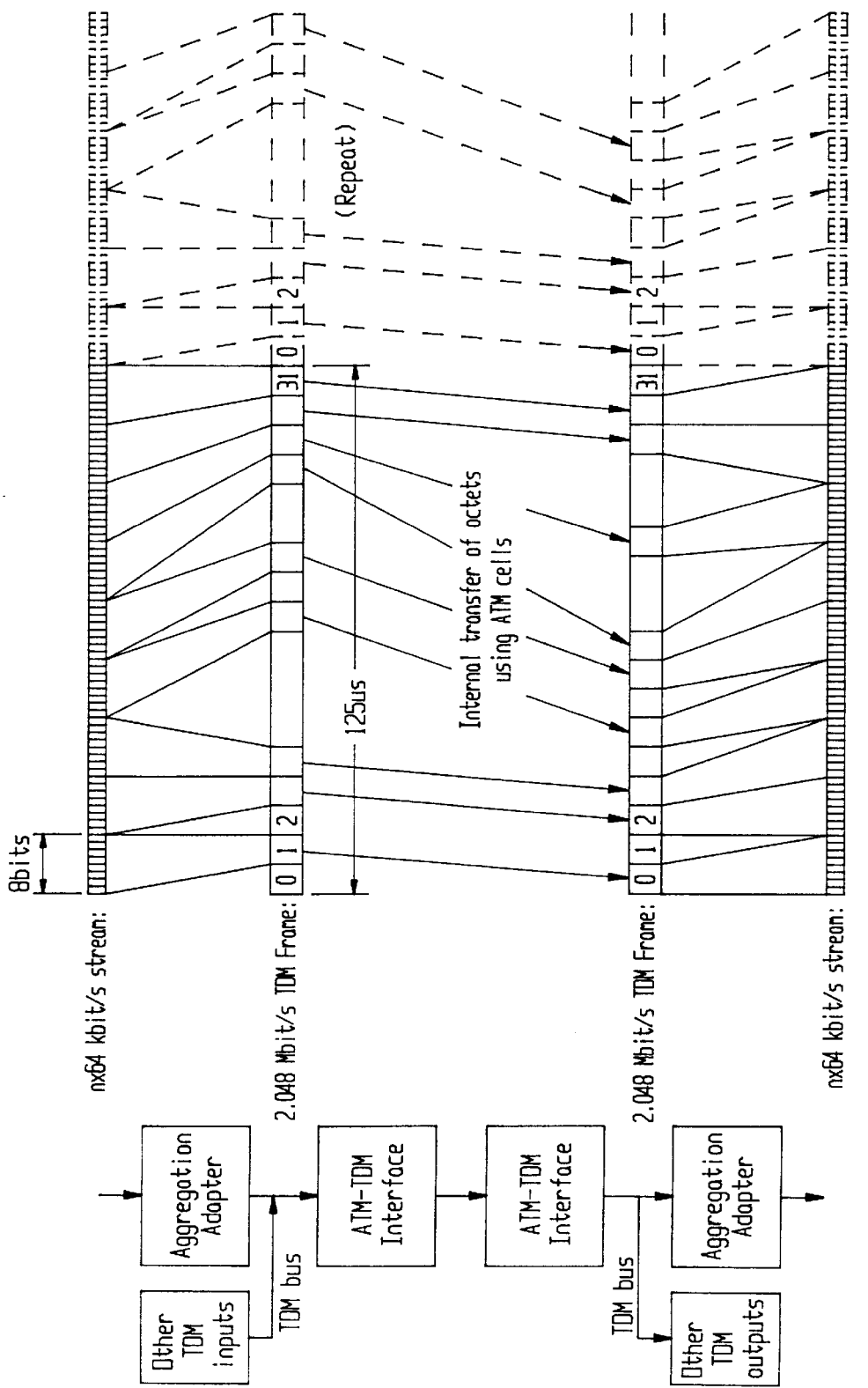
FIG. 28 shows the use of aggregated group TDM slots to transport an n×64 kbit/s stream. n=9 in the example shown.

The TDM side of the system mode utilizes a 32 octet frame which repeats every 125 μs as shown in FIG. 27. Each octet or timeslot carries a single 64 kbits constant bit rate (CBR) channel, however the total capacity of this interface is 32×64 kbits or 2.048 Mbit/s. In order to accommodate an n×64 kbit/s CBR source, it is necessary to collect the bits from the source and insert them into an appropriate group of octets in the TDM frame. The backbone would then transport the aggregated group of octets in that frame to an output and place them in order into an out-going TDM frame. These octets would then be collected together and inserted into the outgoing 64 kbit/s stream. This process is shown in FIG. 3 where the upper n×64 kbit/s stream is broken into octets and inserted into the shaded octets of the TDM frame. The octets are transferred to the output frame using the ATM techniques described the other related applications. Note that the ATM transfer actually causes a relative delay which has not been shown in the figure, but the important aspect is that the octets forming a particular input aggregated group arrive at the output TDM stream in the same order. This is necessary to ensure that the octets from the output TDM frame can be inserted consecutively into the outgoing n×64 kbits stream as shown in the lower part of FIG. 28.

Note that the unshaded octets in the TDM frame may be used by other services on the TDM bus. Note also that it is not necessary that the same set of timeslots be used on the output as on the input. It may be simpler for the aggregation adaptor shown in FIG. 28 to use consecutive timeslots instead of the arbitrary group of slots as shown in the figure. Indeed in practice this may be the case because each aggregation adaptor may be allocated a fixed group of consecutive timeslots, however on a shared network interface such as an ISDN primary rate card where timeslots are allocated to connections as they are set up and cleared down, an aggregated group may be formed out of the group of available channels.

Implementation Schemes

The following discussion, by way of example, discloses two preferred techniques for enabling octets making up an aggregated group to arrive together in the same order at the output, i.e. to 'regain sync':

a) One ATM Connection per Group

Figure 29:
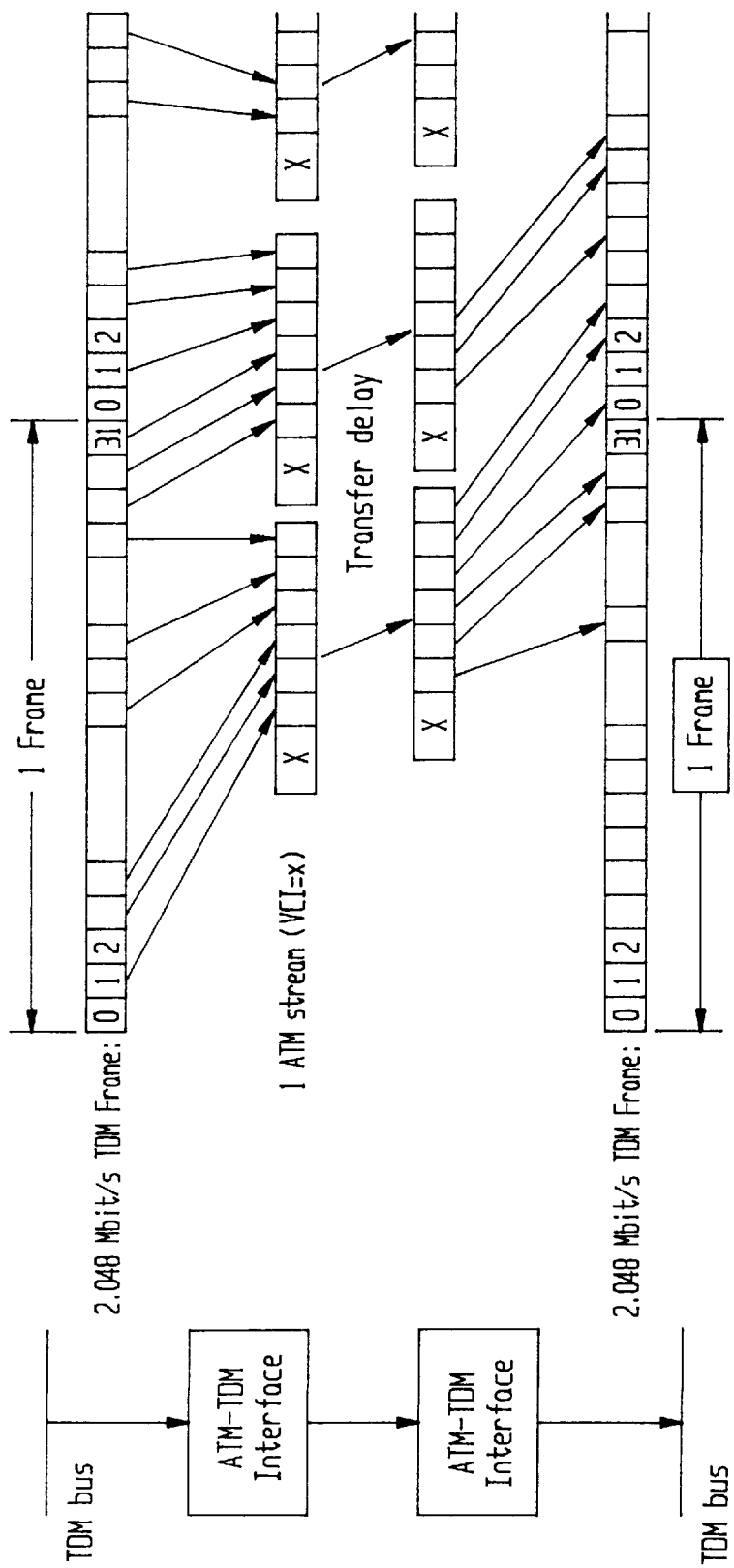
FIG. 29 shows an implementation by inserting all octets for a particular group into one ATM cell stream (ATM connection)

All of the octets in an aggregated group may be carried over a single ATM connection as shown in FIG. 29. Preservation of the order of octets is provided because they are placed in the cells in particular order and the order of arrival of cells is substantially preserved by the system.

Figure 30:
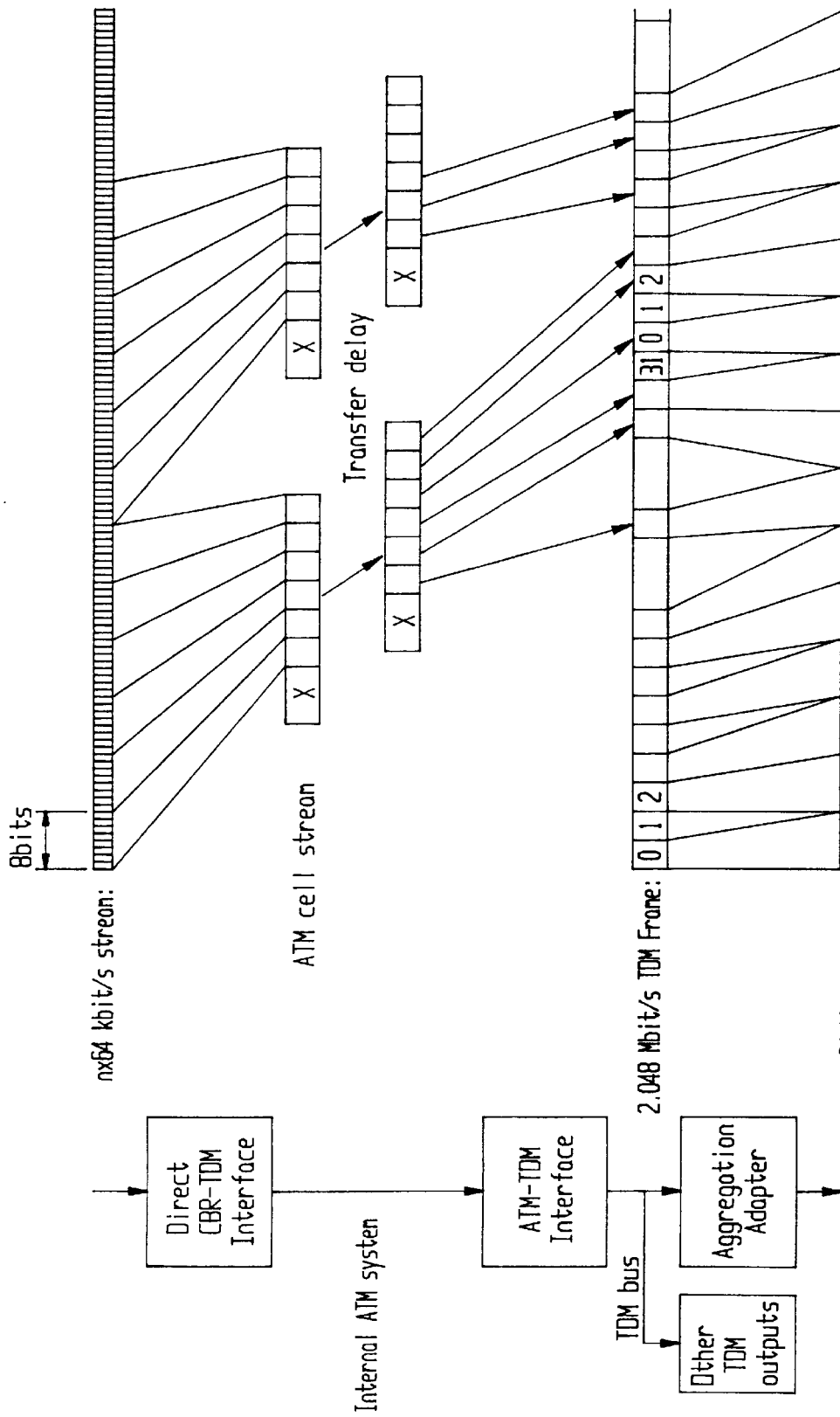
FIG. 30 shows the interworking in FIG. 28 with a direct CBR-ATM interface.

This implementation advantageous enables direct CBR-ATM connections to operate in this way. This can imply easy interworking between these two types of interfaces over one ATM connection as shown in FIG. 30.

Reduced packetisation delay resultant from the following technique may also be provided advantageously. The packetisation delay is the time it takes to fill up a cell with input date. In this technique, the packetisation is reduced by a factor of n (where n is the number of channels in the group) because the input date rate is increased by a factor of n. This may be the most significant of the advantages, particularly in the case of large aggregated groups.

A single buffer for the aggregated channel would be also preferably be required. The required size of this buffer may increase with the total bit rate of the aggregate channel (for a given access delay variation). The length of the segmentation buffer is given by:

$$L_{buf} = L_{cell} + r \cdot t_{acc}$$

where $t_{acc}$ is the access delay and r=n×64 kbit/s is the rate of the aggregated channel and $L_{cell}$, is the length of the cell.

This is calculated in the exemplary system to be $L_{cell}+8$ octets when $t_{acc}=1$ ms and r–64 kbits. With an aggregated channel, however, r could be up to 2.048 Mbit/s or more, and the buffer would need to be $L_{cell}+32\times8$ octets=$L_{cell}+256$ octets. To allow this amount of additional space in every buffer would represent a significant increase in the total buffer space (if $L_{cell}$–47 octets, then 311 octets would be required vs. 55 octets for non-aggregated channels). One possibility to reduce this increase in space would be the grouping together of several buffers by providing more complex control (especially if the buffers were not consecutively located in the memory block). Also, the system card may be split into two 16 channel devices operating in parallel.

The same buffer sharing would also be encountered at the receiver end, except that the buffer size is:

$$L_{buf} = L_{cell} + 2r \cdot t_{CDV} \text{ Bits}$$

where $t_{CDV}$ is the cell delay variation (consisting of the access variation $t_{acc}$ and any other variable cell delay component such as switch buffer delays). Since the maximum value of $t_{CDV}$ is also 1 ms, the maximum buffer requirement would be $L_{cell}+2\times32\times8=L_{cell}+1024$ octets where it would only be $L_{cell}+2\times8=L_{cell}+16$ octets for a single channel.

Another aspect of this approach is that it does not guarantee that octets from a particular timeslot will arrive in the same octet of the outgoing frame. This would not normally matter but could be important if the whole 2.048 Mbits stream was aggregated and the framing of the stream was important.

b) One ATM Connection per Channel

Figure 31:
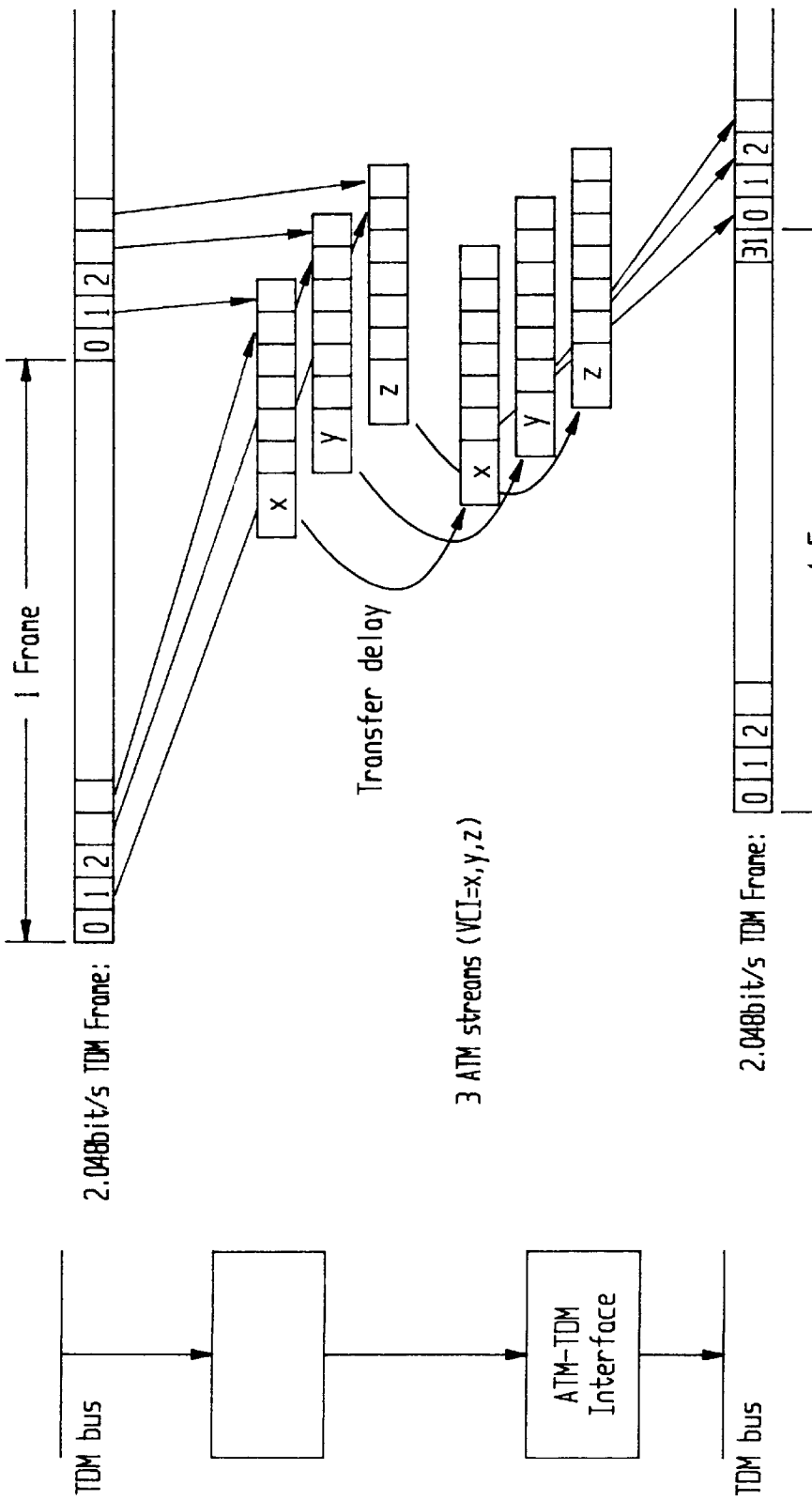
FIG. 31 shows an implementation using separate ATM connections per 64 kbit/s channel in the aggregate group.

A more preferred approach to the problem is to use a separate ATM connection per 64 kbit/s channel within the aggregated group, instead of using a single ATM cell stream for the whole aggregated group as described in FIG. 31. This would be the same situation as when the channels were not aggregated but just happen to be going to the same output. The only difference is that it is necessary to make the delay experienced by each of the channels equal to the same number of frame periods in order that the octets from one input frame arrive at the same output frame. This would not be guaranteed in the normal case because the end-to-end delay is dependent on the arrival time of the first cell in each of the channels, as this is used to determine the start of the reading out of information in the smoothing buffer (re-assembly). Since the delay of the first cell in each channel may differ by several frame periods, some special provision may be required for aggregated channels.

A way of providing that the end delays in a group are substantially equal is to reference the start of re-assembly for each channel to the arrival of a cell in one channel only out of the group instead of starting each re-assembly process independently. [The arrival of the first cell, along with a knowledge of the maximum cell delay variation, may be used in the re-assembly process to determine the appropriate start time for the read clock on the smoothing buffer such that the buffer will not under-flow].

Figure 32:
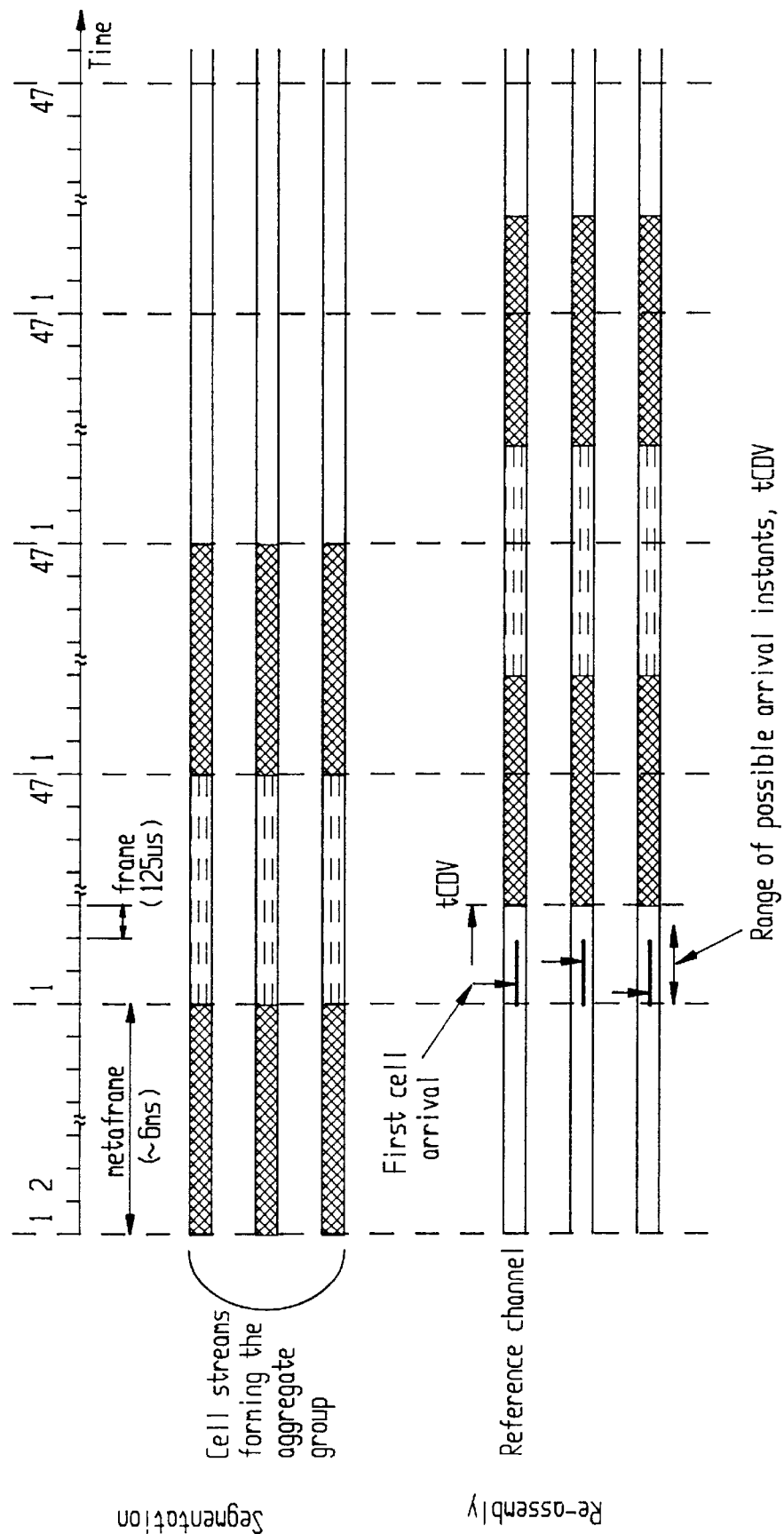
FIG. 32 shows a use of a reference channel to ensure the same end-end delay in each channel (no staggering case)

Ignoring the use of staggering initially it can be seen from FIG. 32 that use of a single 'referenced channel' to determine the start time will ensure the same delay between the generation of the cell payloads in each ATM stream and their subsequent playing out at the output. Since the cells (in this non-staggered case) are generated at the same instant, the range of possible arrival times will be the same for each channel. (In the figure, the delay for ATM cells is assumed to range from 0 up to the maximum cell delay variation, $t_{CDV}$, although in practice there would be a fixed delay component also). Thus any channel out of the group could be used as the reference for the start time of the read clocks in all of the channels without fear of the buffers in any of the channels either underflowing or overflowing.

Figure 33:
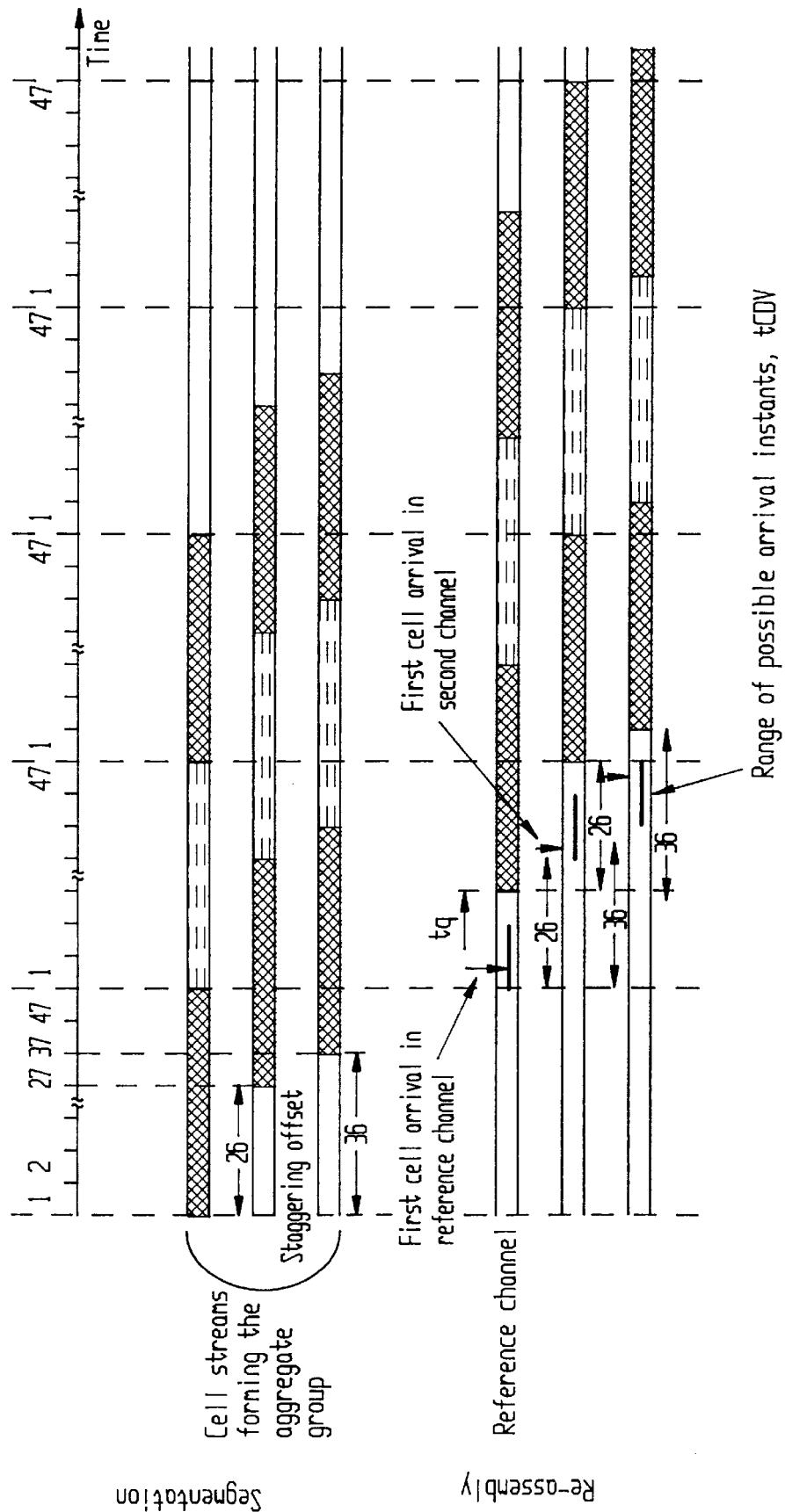
FIG. 33 shows the use of a reference channel with staggering.

The situation is complicated somewhat when the staggering technique is used to reduce the access delay variation. In this case the cells for each of the channels in the group are not generated at the same time and so the range of possible arrival times at the receiver is not the same for each channel. However, if the channel numbers are known, and a fixed staggering pattern is used, the relative start times for segmentation in each channel may be calculated. The staggered situation is shown in FIG. 33. Since the delay for cells in each ATM circuit are composed of the same fixed and variable component, the ranges of possible arrival times for each channel are offset by the same amounts as the segmentations. Therefore, if the read clocks for the slave (non-reference) channels are started with the same offsets, their corresponding buffers would not underflow or overflow. This would also ensure that the end to end delay for each channel would be the same (guaranteeing that the order of the octets in the original CBR stream is preserved).

b) i) Aggregated Channel set-up procedure

A preferred order of events for setup for an aggregated channel using the technique described in the b) above would be as follows:

(a) The TDM channel numbers for the input group would be chosen (possibly fixed by the hardware connections on the TDM bus). Segmentation in these channels would be started in the usual way by signalling to the microprocessor controlling the input ATM-TDM interface.

(b) One of the channels would be designated as the reference channel and the staggering offset for each of the slave channels in the group would be calculated relative to the reference channel using the channel numbers and a knowledge of the staggering pattern.

(c) The slave channels in the output card would be set up in the normal way except that they would be programmed with a fixed offset for their re-assembly start times relative to the reference channel start time. This could be achieved by inserting a number of dummy fill octets in the smoothing buffers equal to the offset into each of the slave channels and starting the receive clocks for each of them when a pulse is received from the reference channel indicating that it had started re-assembly. Slave channels would discard any cells received before the reference channel had started re-assembling.

(d) The reference channel would then be set up at the receiver. It would wait for the arrival of the first cell and start re-assembly at a time $t_{CDV}$ after the arrival of the first cell in the normal way. Once it started re-assembling, it would send a pulse to each of the slave channels.

Note a variation of this implementation would be to have the reference channel send a pulse as soon as it received a cell. The slave channels could then delay $t_{CDV}+t_{offset}$ from this pulse arrival time. This would have the advantage when the delay was implemented by inserting dummy fill value into the receiver smoothing buffers—in which case there would be no special event at the actual start time of the re-assembly to trigger the pulse.

c) Tandem Operation

Figure 34:
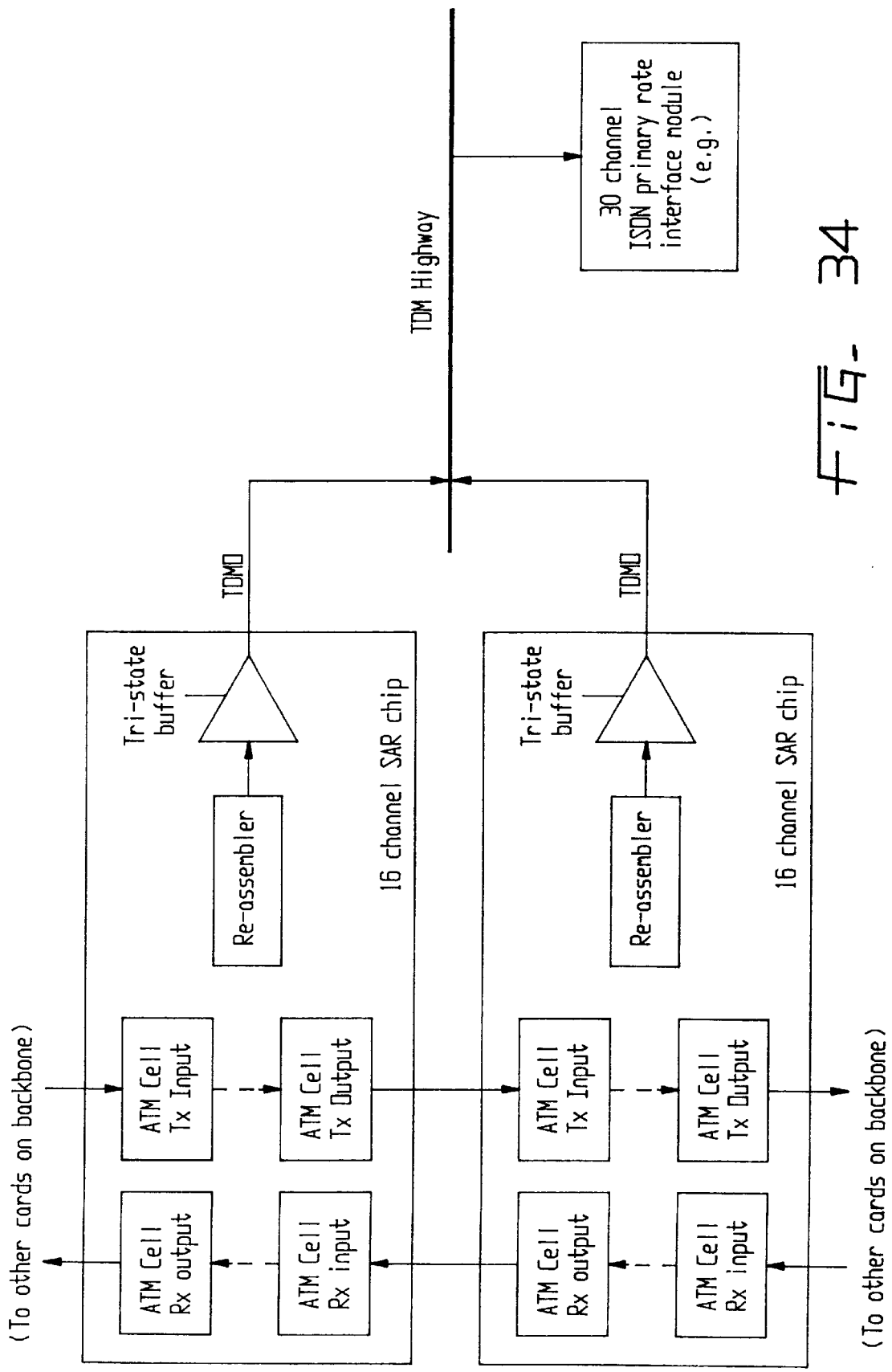
FIG. 34 shows the tandem operation of two 16 channel ATM-TDM chips behaving as one 32 channel module, FIGS. 35 and 36 each show one form of the present invention applied to an open chain architecture.

Another preferred embodiment uses 16 channel line and network interface cards where only half of the 32 octets in the TDM frame shown in FIG. 27 are required. In order to reduce the overall cost of the system, it is advantageous to partition the card into two identical chips each capable of supporting 16 TDM channels. In cases where 16 or less channels are required, only one chip would be used whereas two could be used in parallel to support the full 32 channels in those few applications requiring it (e.g. Primary rate ISDN interface Cards). FIG. 34 shows the situation where the two chips operate in tandem on a single card driving the one TDM highway. A hardware pin or programmable register would be used to distinguish between the two chips such that one chip controls channels 0–15, for example, and where the other drove channels 16–31. Tri-state buffers on the TDM outputs would allow the chips to drive the same line, each driving it while the other is in a high impedance mode.

For the purposes of channel aggregation where the groups span both devices, it will be necessary to ensure that the staggering metaframes of the two segmentation sections be synchronised. This is necessary in order to allow the relative offsets for each channel in the group to be calculated. This could be achieved by using a common reset line for both devices. Also, a means for broadcasting the reference pulse from the reference channel on one device to slave channels on the other would be required to allow aggregation across the two devices. This would require an additional pin on each device.

I. By-Pass

Figure 35:
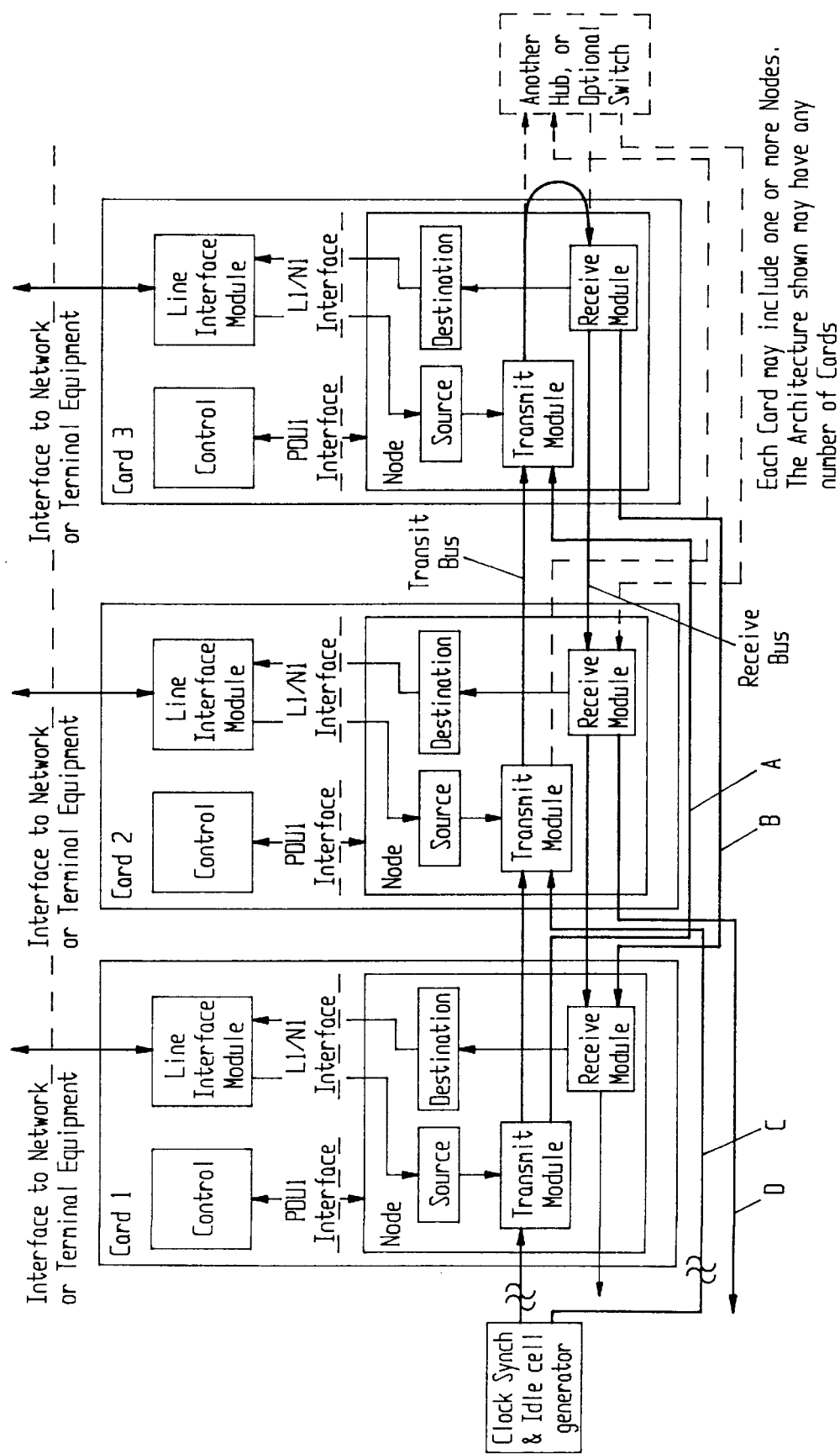
Figure 36:
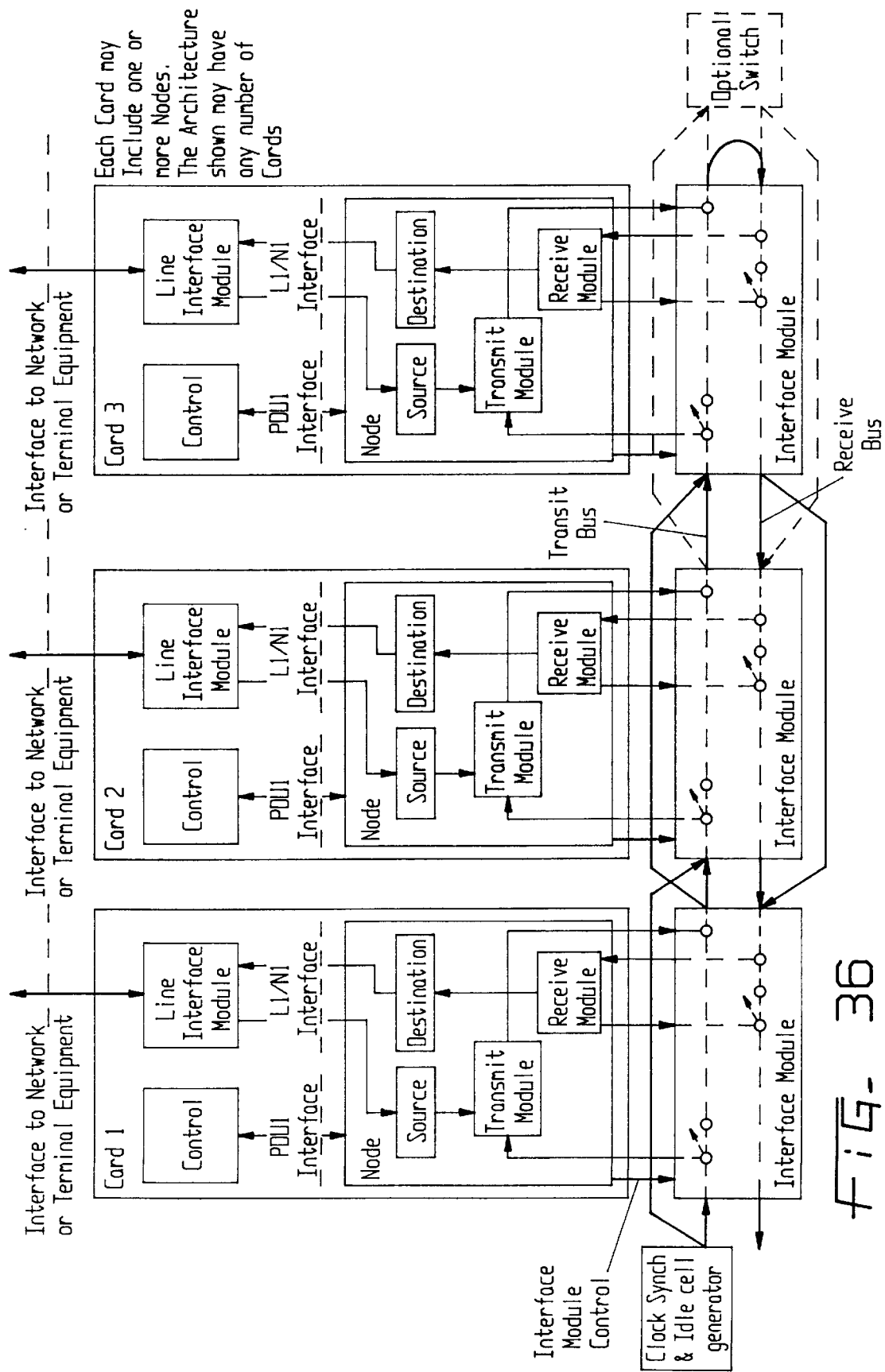
Figure 37:
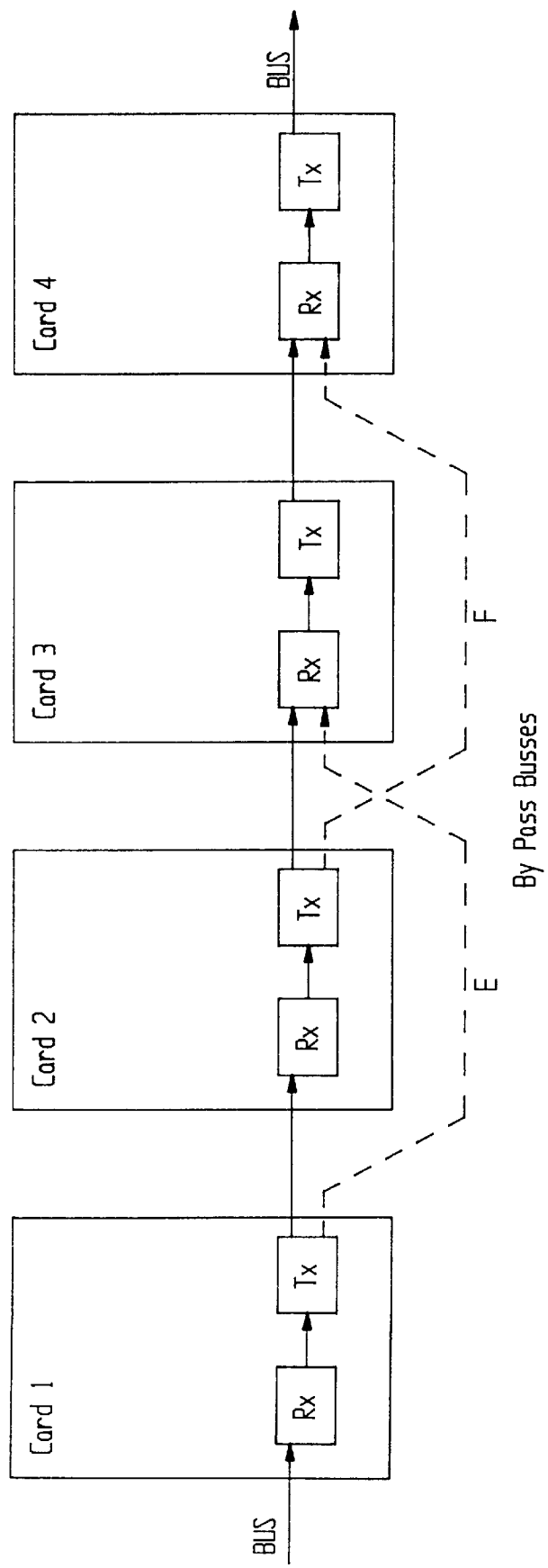
FIG. 37 shows one form of the present invention applied to a closed chain architecture.

With reference to FIGS. 35 to 37, basic chain architectures are shown. Any of the architecture shown are exemplary only to illustrate how the by-pass architecture of the present invention can be provided in a communication system.

In general, the by-pass feature allows for the by-pass of a connected card and/or node, provision of externally controlled loopback, backplane bus overflow error indicator, resynchronization to the master clock, selectable master clock (e.g. from backplane or local card), lower clock speed (preferably <=80 MHz), and significant capacity (preferably 320 Mbps).

With reference to FIG. 35, each of cards 1, 2 and 3 have a transmit (TX) bus and a receive (RX) bus. Empty, idle or cells having user or control information therein flow on the TX and RX busses, when the system is in use.

If, for example, card 2 fails, in accordance with the present invention, by-pass busses A and B can be brought into service (manually or automatically, switched). In bringing busses A and B into service, transmit and receive bus outputs of card 2 are isolated from the system as a whole, thus enabling the system (other than card 2) to operate otherwise normally with the addition of busses A and B.

The by-pass feature is brought into service by switching initiated at either side and/or downstream of the failed or isolated card. For example, the transmit bus of card 3, which is normally switched to the transmit bus output of card 2, would in by-pass mode change to select the transmit bus output of card 1. The receive bus of card 1, normally switched to the receive bus output of card 2, would in by-pass mode change to select the receive bus output of card 3.

Any particular terminal equipment or networks coupled to card 2 may remain 'down' for a period of time until card 2 is again fully operational. Alternatively, the card 2 coupled equipment or networks may be otherwise connected to another card (manually or automatically, switched). In this alternative, although card 2 is not operational, terminal equipment or networks usually coupled to card 2 may access the system via other cards.

Busses C and D, likewise, enable card 1 to be by-passed, and in FIG. 36, bus C needs only to be implemented to by-pass card 1.

Busses A, B, C and D may be implemented by way of a suitable cable or optical connection, track or other suitable transmission medium. In FIG. 36, the interface modules may be provided on or coupled to a mother board.

In a similar manner to the open chain of FIGS. 35 and 37, by-pass busses E or F serve to provide an alternate coupling between cards, thus enabling one card to be isolated, if necessary, without substantially hindering performance of the remainder of the system. Cards 1, 2, 3 and 4 are denoted by broken lines. In this closed implementation, approximately half the amount of by-pass busses are required.

The switch to implement by-pass operation in one form may be triggered by use of cells flowing in the system. A 'by-pass' maintenance cell may be generated periodically, and if not passed through the system or if corrupted by the system, may trigger cards immediately downstream of the suspect card to switch to its by-pass buss(es) so that the suspect card is then by-passed.

If a card is to be replaced, for example for maintenance, substantially without corruption of cells flowing in the communication system, the operation of a by-pass architecture as noted above can be modified to reduce corruption of cells during the switching operation. This may entail the provision of a switch operation synchronisation circuit, which when armed by command from a local μP, causes the switch to change within the payload period of a synchronisation cell designed particularly to enable switch operation with minimal cell loss or corruption.

As a synchronisation cell passes to one card, that card may be switched to its transmit by-pass bus. The synchronisation cell may continue on the system transmit bus, and return on the system receive bus. When the synchronisation cell is received by another downstream card, switch operation to the receive by-pass bus can be made.

Figure 38:
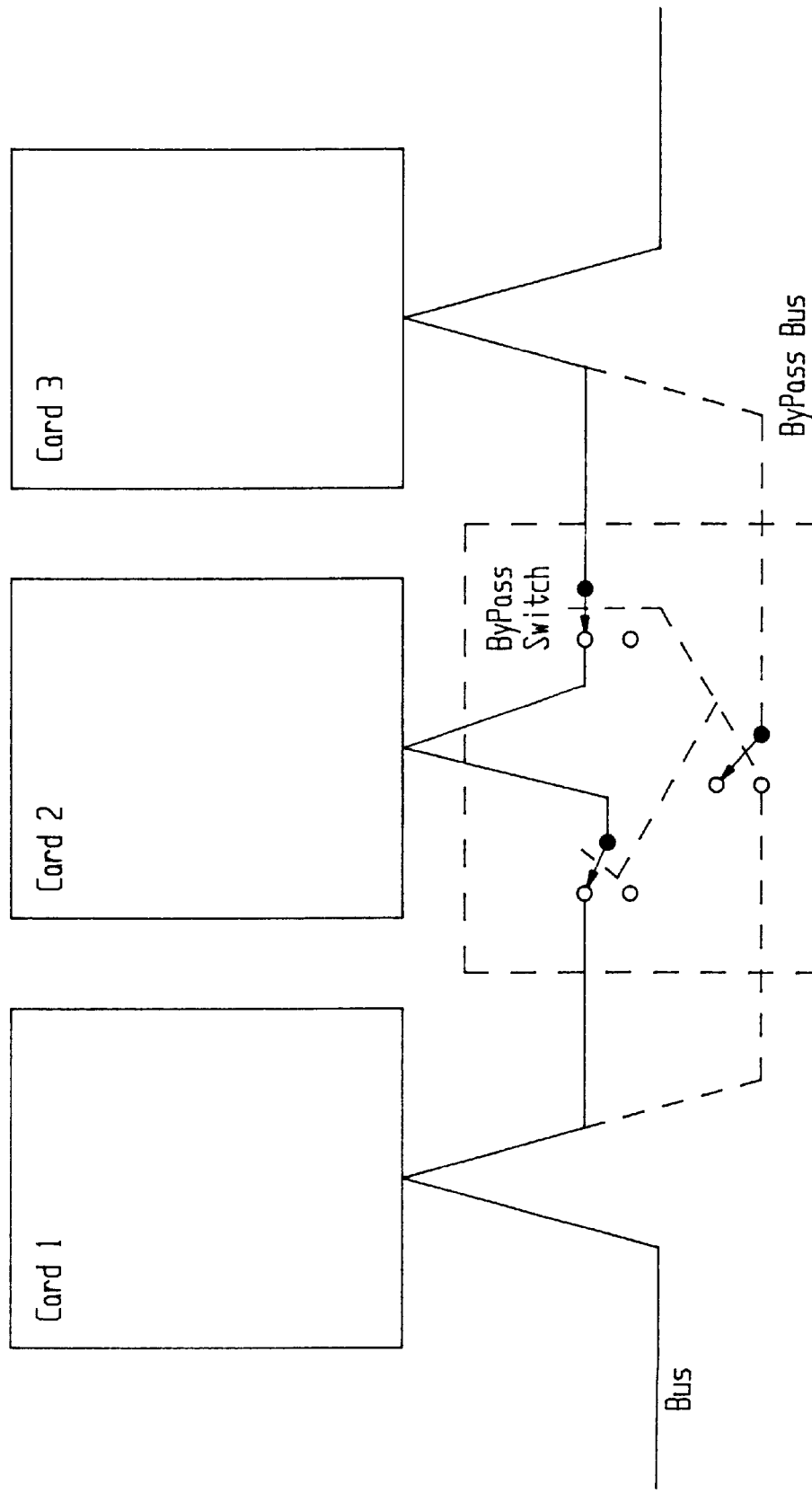
FIG. 38 shows an exemplary form of the by-pass architecture imposed on a bus architecture.

FIG. 38 shows an exemplary form of the by-pass architecture imposed on a bus architecture.

Localised Apparatus

The types of apparatus or mediums which can embody the present invention in product form may vary in different shapes and sizes, dependent on the particular application or environment in which the "communication system" is placed. With regard to FIG. 3 and FIG. 3a, the hub #1 and hub #n as referred therein, respectively, may be a PABX, "system" as noted in the field of invention of the present specification or may be a relatively localised data, voice, and/ or video apparatus or medium. Such a "localised" apparatus or medium may be a broadband terminal adaptor. Terminal adaptors vary in complexity according to their application or environment. One type of terminal adaptor is a small broadband terminal adaptor, sometimes also referred to as a "set-top unit".

For cost reasons, a Set-Top Unit is Physically much smaller than the Key System as described above and, may be designed to sit on or near existing furniture (i.e. home or office). The Software of the Desk Top Unit is a small subset of the Software of the Key System described above. In keeping with the size requirement described, the Backbone of the Set-Top Unit is not implemented with a separate Backplane, but rather all circuit modules (including ATM-TP's, ATM-HP's etc and their interconnections are mounted on one or a small number of boards.

The set-top units are intended to be used by the domestic and small business market segments.

Set Top units will be used by the Domestic and Small business market segments. The following is an example of the "Network" and "User" Connection mix that a commercially successful Set-Top unit may have.

(i) Network Connections
  An interface that is compatible with a B-ISDN Network
(ii) User Connections
  Standard analogue telephone interface (also called POTS)
  ISDN
  EtherNet
  Token Ring
  X.21
  Video (either Broadcast or Conference quality)

The Set-Top Unit will be used either connected to a B-ISDN Network or an ATM LAN. Utilising the special characteristics of the FPDX technology it will be able to connect non B-ISDN equipment in a very Cost Effective and competitive way.

Some abbreviations are used in the following description, namely:

ISDN—Integrated Services Digital Network.

N-ISDN—Narrowband ISDN.

B-ISDN—Broadband ISDN as defined by the ITU and/or the ATM Forum.

Local Area—This encompasses one or more buildings that are located in the same geographic region.

B-ISDN Network—Either a Public or Private Network that provides B-ISDN connection capabilities between User Equipment. This Network is assumed to be based on ATM technologies.

ATM-LAN—A Private Network that spans a Local Area and provides B-ISDN connection capabilities between User Equipment.

TE2—Terminal Equipment Type 2. Equipment that a provides a specific function to a user (eg: telephone, data adaption, router, etc) that cannot be directly connected to a B-ISDN Network.

B-TE2—Broadband TE Type 2 Equipment that has a Broadband interface that doesn't comply with the interface used by the B-ISDN Network. (Refer to the ITU Recommendation, ITU-T 1.413).

B-TE—Broadband ISDN TE A TE can be connected to a B-ISDN Network. (Refer to the ITU Recommendation, ITU-T 1.413).

B-TA—Broadband ISDN Terminal Adaptor A device that allows the connection/use of TE2 (non B-ISDN TE) or B-TE2 equipment with a B-ISDN Network. (Refer to the ITU Recommendation, ITU-T 1.413).

Set-Top Unit—A term used to refer to a B-TA small enough in physical size to fit comfortably on top of an item of furniture, for example; a T.V. set or a desk.

Desk-Top Unit—Another term for Set-Top Unit.

POTS—Plain Ordinary Telephone Service.

Set Top Unit (Broadband TA) Functional Description

The following Functional Description is applicable to both a Set-Top United and a BroadBand TA.

Definitions

Figure 41A:
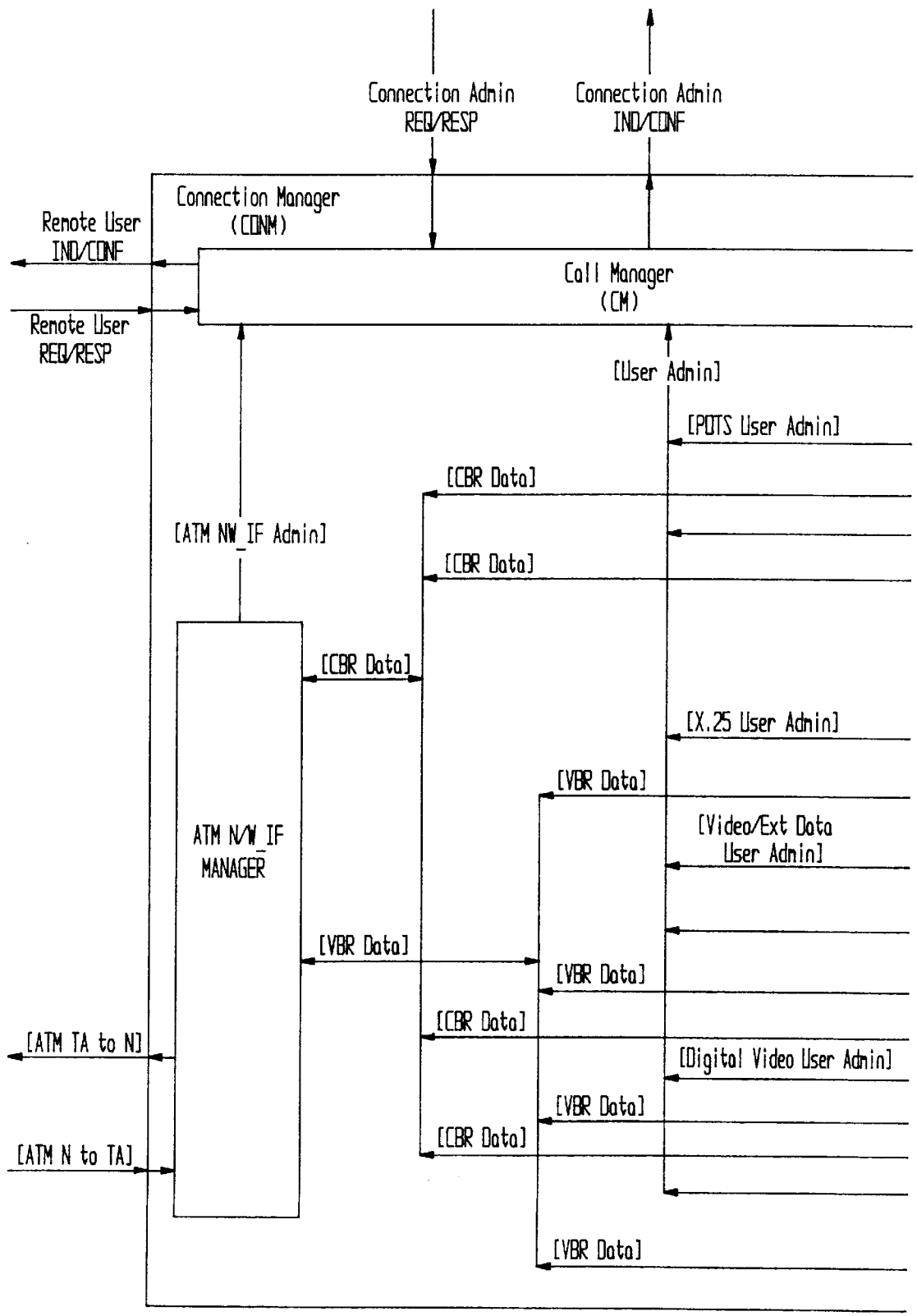
Figure 41B:
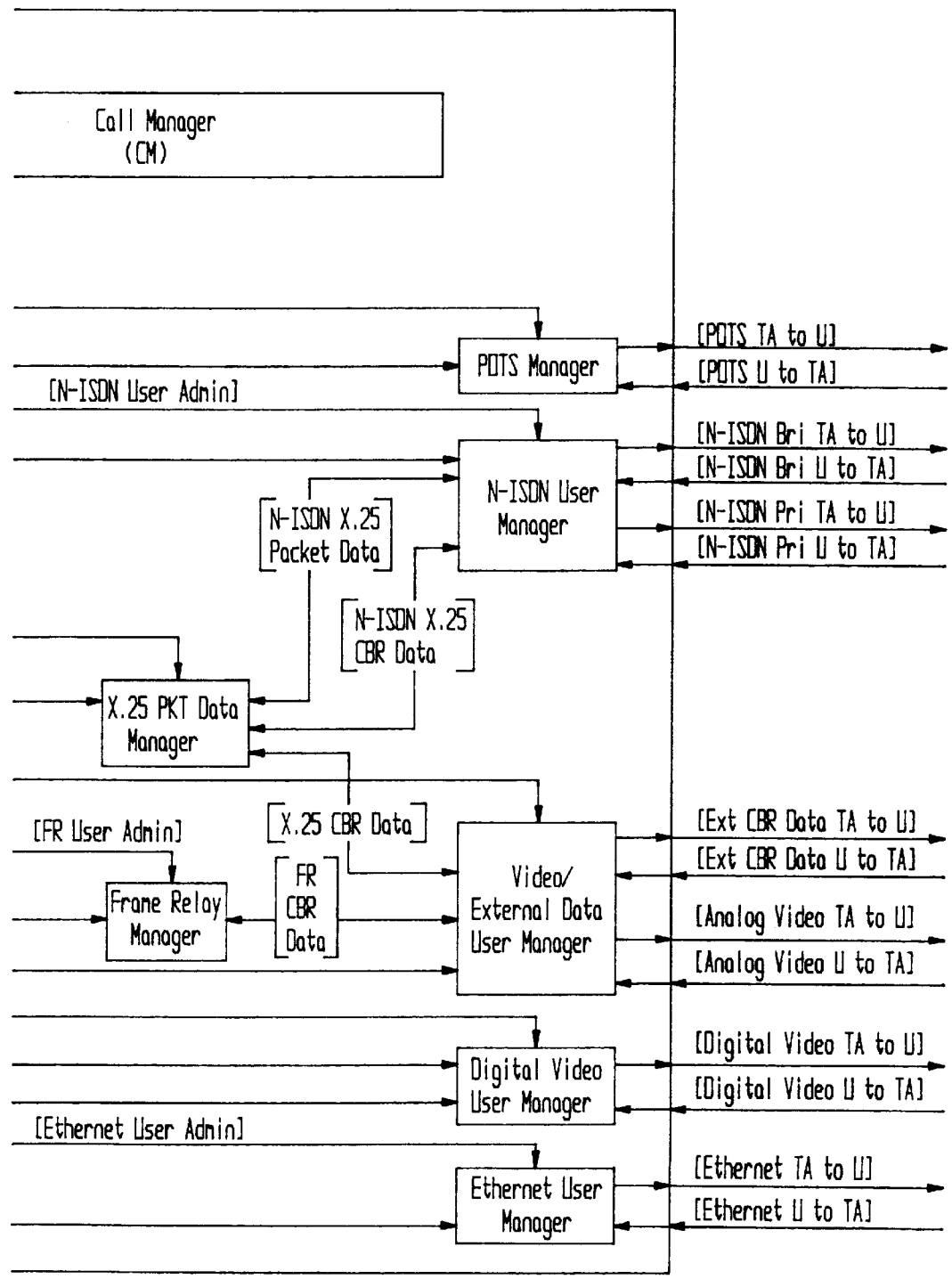
Figure 42:
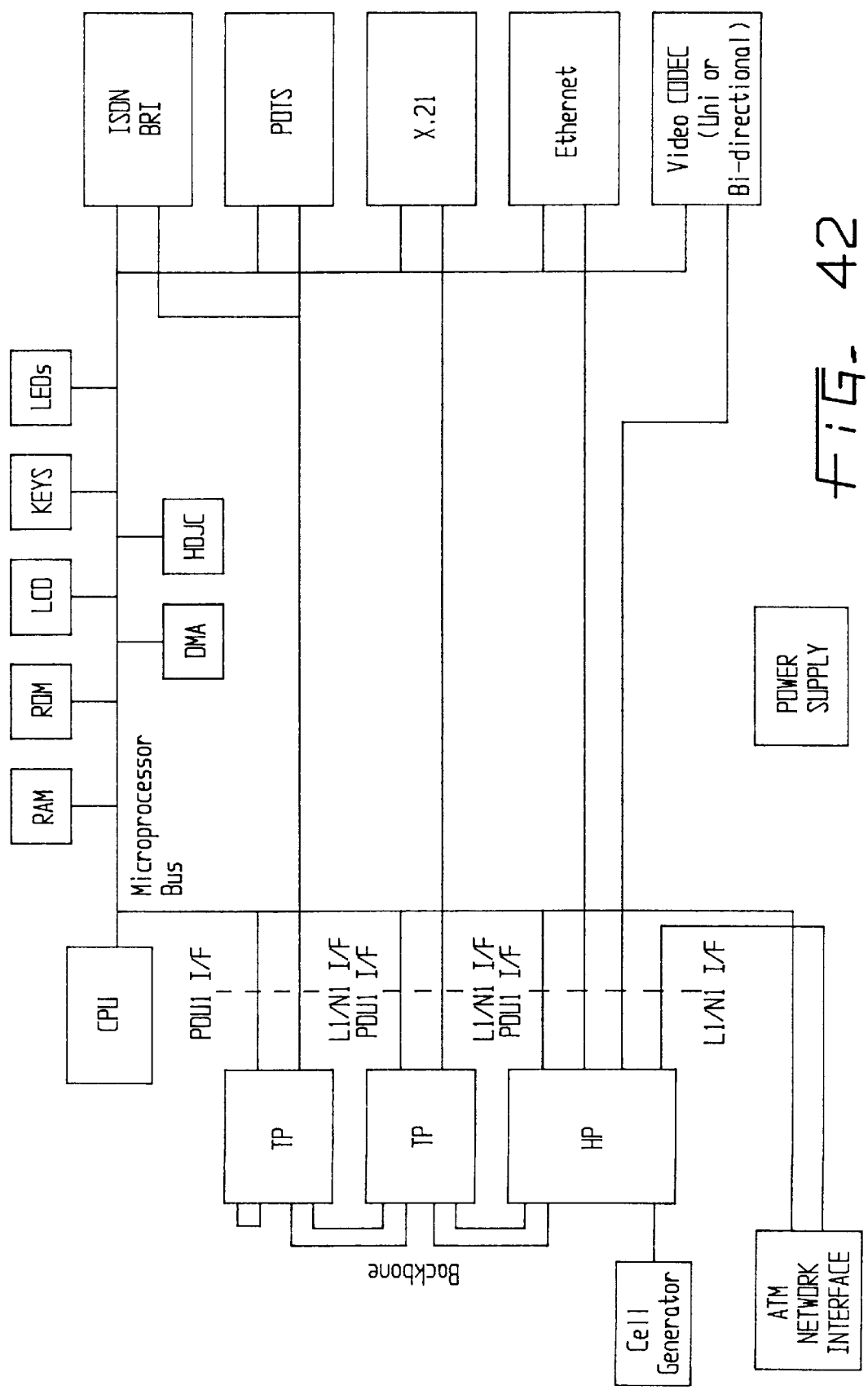

FIG. 41 provides a Functional view of a Broadband ISDN Terminal Adaptor (SetTop Box). FIG. 42 provides a hardware example of a broadband ISDN Terminal Adaptor (or Set-Top box). This is a device which is used to interface/connect B-TE2 (non-B-ISDN TE) equipment to either a B-ISDN (Public) or an ATM LAN (Private) network.

In both cases, the B-TA must support the following:

The facilities supported by the network for the non B-ISDN equipment.

Provide a MUX/DEMUX facility and use the network (i.e. the B-ISDN or the ATM-LAN, depending on which one the equipment is connected to) as only high capacity transport medium between 2 B-TAs.

Medusa is a device which is understood to be a B-ISDN terminal adaptor. The following are example interfaces. An actual unit may have none or several of each of these interfaces.

Network Interfaces

These are the interfaces that allow the unit to connect to a B-ISDN or ATM-LAN. "Network Connections" are made via these interfaces.

ATM network interface (ATM Forum/ITU UNI).

2 Mbs CBR network interface.

User Terminal Interfaces

These are the interfaces that allow the unit to connect to User Terminals via "User Connections".

POTS interface.

BA N-ISDN interface.

PRA N-ISDN interface.

2 Mbs CBR interface.

Video interface, Broadcast and/or Conference quality.

Ethernet interface.

Packet interface (eg X25).

CBR Data interface (eg X.21).

Frame Relay interface.

DXI interface.

ATM interface.

Description of Functional Blocks of FIG. 41

Connection Manager (CONM)

The Connection Manager translates information from the ATM network into one or more of the supported protocols.

The CONM provides the ATM network to terminal conversion.

Call Manager (CM)

The CM provides call control functions for each of the supported interfaces.

ATM Network Interface Manager

This block handles all interfacing and communications with the B-ISDN Network or ATM-LAN. It provides the physical interface between the FPDX Backbone technology and that required by the B-ISDN Network or ATM-LAN. It provides the ATM Signalling functionality for the administration of connections between the Set Top Unit and the B-ISDN Network or ATM-LAN.

POTs Manager

The POTs Manager provides the physical interface to Plain Old Telephone Service equipment and the necessary functionality to transfer the data to/from the ATM Network interface.

N-ISDN Manager

The N-ISDN Manager implements the adaption of N-ISDN voice, X.25 (on a B-Channel) and Packet data to the FPDX ATM backbone. It handles both the Basic Rate Interface and Primary Rate Interface standards of N-ISDN. This block also contains the functions necessary to convert PRI or BRI Layer 3 messages to and from X.25 Packet format.

EtherNet User Manager (ETHM)

This block provides the functionality of interfacing LAN type equipment (eg. EtherNet, Token Ring, etc) to the FPDX Backbone technology. It provides the physical interface equipment required and the functionality to handle the LAN data and transferring it to other LAN interfaces or the ATM Network interface.

This block can support the ATM Forum's LAN Emulation specification. Please refer to the ATM Forum's LANE ("LAN Emulation over ATM specification").

It is important to note the need for duplicate AAL5/SSCF stacks for each data path. This signifies the need for multiple logical connections. If the VPI/VCI is a unique connection identifier then the duplication represents multiple reconstruction buffers.

Pkt Data Manager

If required, the X.25 Pkt Data Manager us used to convert VBR and/or CBR data to/from X.25 format.

Frame Relay Manager

The Frame Relay Manager is similar in concept to the X.25 Manager. The ITU-T have specified Frame Relay interworking (Q.2933) which may remove the need for any X.25 interworking. Again, this may remove the need for a LAP-F/FR-SSCCS layer.

Digital Video I/F Manager

The Digital Video Interface Manager provides high quality video services across the FPDX physical layer. One example of video coding is MPEG-2.

Video/External Data User Manager

The Video/External Manager is able to transfer video or raw data on either X.25, Frame Relay, or as FPDX CBR data via real time coding of the video signal. This provides low end (video conferencing) quality video services.

Hardware Block Descriptions (FIG. 42)

CPU and Memory

The Central Processor Unit (CPU), in conjunction with the memory devices, controls the interaction of all the major functional blocks.

The control software initialises the different interfaces according to either program or user selection, to ensure correct operation and functionality.

For example, under software control, a user can establish a link, through the B-ISDN or ATM-LAN, to another Set-Top Unit.

DMA Controller

The Direct Memory Access (DMA) controller is used by the CPU to quickly move data from one hardware device to another.

The DMA controller is programmed under software control with the source and destination for the flow of data, and once set in motion, the DMA controller takes control of the Microprocessor Bus until the transfer of information is complete.

HDLC Controller

The HDLC Controller is used to transfer information in packets, according to a particular protocol. Under software control, the HDLC controller is initialised with its operational modes, and then accepts blocks of information, to which it adds other information to ensure correct and reliable transfer of data to its destination.

ATM-TP

The ATM-TP is an implementation of a Node. See FIGS. 3a and 15.

ATM-HP

The ATM-HP is an implementation of a Node. See FIG. 3a.

LCD Display

The Liquid Crystal Display (LCD) is used to display messages such as instructions and status information.

Once initialised under software control, the CPU writes display and control information to the LCD controller so as to place the various characters on the LCD at the required location.

LED Display

The LEDs are used to show status information to the user. This includes normal operational status and alarm conditions.

Keyboard

The keyboard (when present) provides a data entry facility, for the purposes of entering initial setup, and operational data.

ATM Network Interface

The ATM Network Interface block provides for the physical and electrical connection to the B-ISDN or ATM LAN.

ISDN BRI

The ISDN Basic Rate Interface (BRI) provides for connection of up to two ISDN Terminals giving access to the 2B+D ISDN channels.

POTs

The "Plain Old Telephone Service" (POTS) provides for a connection of a normal telephone to the unit. This enables incoming and outgoing calls to be made in the normal way.

The hardware must provide appropriate interfacing for both Decadic and DTMF dialling, and provide and transmission hybrid interface for connection to a codec for integration of the voice information into a digital stream. A Ring Generator so that a connected telephone will ring, and is switched under software control.

X.21

The X.21 interface provides for connection of data equipment complying to CCITT recommendation X.21.

The X.21 interface provides a "bit-pipe" style interface such that the incoming isochronous data is converted into multiple short bursts of data transmitted in 64 bps timeslots to and from the ATM-TP.

EtherNet

The Ethernet Interface provides for a LAN connection in accordance with IEEE 802.3. This interface provides packetised information to the HP device for transmission to and from the ATM network interface. The combination of LAN and ATM Network interfaces provides the user with high speed WAN capability.

Video

One example of the Video interface is a one way interface for the decoding and subsequent multicast of "Broadcast Quality" video information to various user video terminals.

FIG. 43 shows a fully loaded system configuration.

Summary

Implementation of idle cells in accordance with the characteristics disclosed to various systems, including small business customer switching systems and LAN networks, provides a technology base which can be used far into the future. Cost effectiveness and flexibility may be provided, in part, by integration of control and user data.

Figure 40:
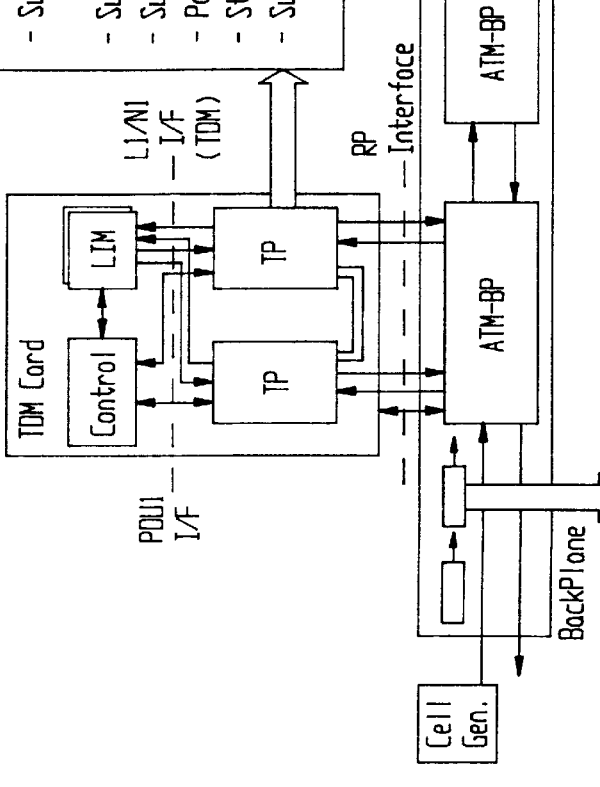
FIGS. 40, 41a, 41b and 42 show, as a summary, some of the features provided in a preferred embodiment of the system as disclosed.

FIG. 40 illustrates a summary of some of the features of the preferred embodiment of the present system as herein before disclosed Compare this to existing time division multiplexed (TDM) solutions which needed a different switch plane for each new service with different traffic characteristics, and normally separate data and control transport mechanisms. This TDM technology does not allow for expandability nor for rapid and relatively cheap new service requirements. Prior art systems currently cannot traffic both CBR and non-CBR signals without degradation of the quality of service. The prior art technology is considered not allow for expandability nor for rapid and relatively cheap new service requirements.

TABLE 1

FP-DX SERVICES CLASSIFICATION

| BASIC | | ADVANCED |
|---|---|---|
| Mandatory | Optional | High Speed Data |
| *Voice | *High Speed Data | CAD/CAE/CAM |
| - interactive, | (e.g. Ethernet) | - interactive, |
| conversationai | - interactive | conversational |
| - 64 Kbps peak | conversational | - 8 Mbps peak |
| - time constrained | - 0.5 Mbps peak | - non critical time |
| (<8 ms packetisation | - non critical time | - low error rate req'd |
| delay, end to end | req'mt | - bursty |
| delay <100 ms) | - low error rate req'd | *Distributed |
| - tolerates errors | - bursty | Processing |
| (cell loss ratio | *Surveillance, | -interactive, |
| <10**-3) | conversational | conversational |
| - constant | - interactive, | *Electronic |
| - 1.35B, CCITT G. | conversational | Publishing |
| series | - *Security | - interactive, |
| *Low speed data | - interactive, | conversational |
| - interactive, | conversational | - 0.2–2 Mbps |
| conversationai | | - low error rate |
| - 64 Kbps | | - bursty |
| - non critical time | | *LAN interconnection |
| req'mt (<50 ms | | - interactive, |
| - 100, error rate req'd | | conversational |
| (service dependant, | | |
| cell loss ratio | | |

TABLE 1-continued

FP-DX SERVICES CLASSIFICATION

10-6-10-8)
- bursty
- V.24, etc ?

ADVANCED

| Image | Still | VIDEO<br>Full Motion | Computer |
|---|---|---|---|
| *Medical Imaging: | *High Resolution fax | *Video telephony | *Mail |
| X Ray | - interactive, | - interactive, | - Interactive, |
| - interactive, retrieval | conversational | conversational | messaging |
| - 12 Mbps peak | *Photovideotex | - 64–2048 Kbps | |
| - non critical time | - interactive, retrieval | - time constrained | |
| *Medical: Ultra-sound | - >= 64-Kbps | - CCITT H 261 | |
| - interactive, retrieval | | (2406 Kbps) | *Simulation |
| - 0.2 Mbps peak | | *CATV | - interactive, |
| - non criticai time | | - distribution | conversational |
| *Modical: CT Scan | | - 34–45 Mbps | |
| - interactive, retrieval | | - time constrained | |
| - 4 Mbps peak | | *HDTV | |
| - non critical | | - distribution | |
| *Medical: Mag. | | - 100–140 Mbps | |
| Resonance | | - time constrained | |
| - interactive, retrieval | | - not available | |
| - 1 Mbps peak | | *Remote Medical | |
| *EDI | | - interactive, | |
| - interactive, | | conversational | |
| conversational | | *Shopping/ | |
| | | Advertising | |
| | | - interactive, retrieval | |
| | | *Surveillance | |
| | | - interactive | |
| | | conversational | |

We claim:

1. A communication system comprising a plurality of nodes coupled to a common bus, said plurality of nodes comprising at least one node adapted to communicate CBR traffic and at least one other node adapted to communicate non-CBR traffic on said common bus, each of said plurality of nodes having an access controller operative to control transmission of data on said common bus such that said CBR traffic has priority over said non-CBR traffic, wherein said common bus comprises a transmit path and a return receive path, traffic on said common bus being carried in cells each having an active bit for indicating whether said cell is in an empty or idle state or in an active state, and a request priority field for indicating a priority of request for transmission access to said common bus by one of said nodes, and wherein said access controller of said one of a said nodes requests transmission access on said common bus by writing a priority value into a cell on said receive path, wherein said access controller transmits data on said common bus by writing into a payload field of an empty or idle cell on said transmit path, a cell on said receive path at one of said nodes requesting transmission access having a priority value equal or greater than the priority of said one node is passed unchanged, and wherein a cell on said receive path at said one node requesting transmission access having a priority value less than the priority of said one node is overwritten by said access controller in the request priority field to the priority value of the node.

2. A communication system as claimed in claim 1, wherein said common bus has an open-loop architecture.

3. A communication system as claimed in claim 1, wherein said common bus has a closed-loop architecture.

4. A communication system as claimed in claim 1, wherein said access controllers of said nodes coupled to said common bus operate to control transmission of data on said common bus according to a round robin control scheme.

5. A communication system as claimed in claim 1, further comprising a plurality of common busses which are coupled in a star configuration to a switching hub for directing data between said common busses.

6. A communications system as claimed in claim 1, wherein said access controllers of said nodes are effective to dynamically allocate bandwidth on said common bus between CBR and non-CBR traffic with guaranteed bandwidth allocation on demand for said CBR traffic.

7. A communication system as claimed in claim 1, wherein data transmitted on said common bus is substantially in the form of ATM cells.

8. A communication system as claimed in claim 7, including a cell generator for generating empty or idle cells at one end of said common bus, and wherein said nodes along said common bus compete with one another to utilize said empty or idle cells for transmission of data.

9. A communication system as claimed in claim 8, wherein each said cell includes an activity bit to indicate whether said cell is in an empty or idle state or in an active state.

10. A communication system as claimed in claim 7, wherein each said cell includes a request priority field to indicate a request for transmission access to said common bus by one of said nodes, and a priority of said request.

11. A communication system as claimed in claim 7, wherein said access controller of each said CBR node includes means for partially filling cells for transmission on said common bus.

12. A communication system as claimed in claim 1, wherein said access controller of said one node which has requested transmission access writes data into a payload field of an empty or idle cell on said transmit path if no cell with a priority valve equal or greater than the priority of said one node has been received on said receive path.

13. A communication system as claimed in claim 1, wherein each said CBR node is adapted for connection to a plurality of CBR sources.

14. A communication system as claimed in claim 13, wherein said plurality of CBR sources include telephone terminals and a telephone network connection.

15. A communication system as claimed in claim 13, wherein said plurality of CBR sources include a video data source.

16. A communication system as claimed in claim 1, wherein each said non-CBR node is adapted for connection to at least one non-CBR source including a computer network or server.

17. A communication system as claimed in claim 1, wherein each said non-CBR node is adapted for connection to at least one non-CBR source including a computer terminal.

* * * * *